(12) United States Patent
Haddadin

(10) Patent No.: US 10,730,186 B2
(45) Date of Patent: Aug. 4, 2020

(54) METHOD AND DEVICE FOR OPEN-LOOP/CLOSED-LOOP CONTROL OF AN ACTUATOR-DRIVEN ROBOT JOINT

(71) Applicant: Kastanienbaum GmbH, Munich (DE)

(72) Inventor: Sami Haddadin, Hannover (DE)

(73) Assignee: Kastanienbaum GmbH, Munich (DE)

( * ) Notice: Subject to any disclaimer, the term of this patent is extended or adjusted under 35 U.S.C. 154(b) by 365 days.

(21) Appl. No.: 15/576,244

(22) PCT Filed: May 21, 2016

(86) PCT No.: PCT/DE2016/000219
§ 371 (c)(1),
(2) Date: Nov. 21, 2017

(87) PCT Pub. No.: WO2016/184451
PCT Pub. Date: Nov. 24, 2016

(65) Prior Publication Data
US 2018/0169864 A1 Jun. 21, 2018

(30) Foreign Application Priority Data

May 21, 2015 (DE) .......... 10 2015 108 097

(51) Int. Cl.
*B25J 9/16* (2006.01)
*G05B 9/03* (2006.01)

(52) U.S. Cl.
CPC .......... *B25J 9/1674* (2013.01); *B25J 9/1653* (2013.01); *G05B 9/03* (2013.01); *G05B 2219/24182* (2013.01); *G05B 2219/39001* (2013.01)

(58) Field of Classification Search
CPC ..................................... G05B 9/03
(Continued)

(56) References Cited

U.S. PATENT DOCUMENTS 7,053,579 B2 * 5/2006 Moridaira ............ B25J 9/1674
180/8.6
7,443,124 B2 10/2008 Bischoff et al.
(Continued)

FOREIGN PATENT DOCUMENTS

DE 102004026185 A1 12/2005
DE 102008054312 A1 5/2010
(Continued)

OTHER PUBLICATIONS

Zhu, Xiaolu; Written Opinion; Intellectual Property Office of Singapore; 7 pages; 11201709621T; dated May 15, 2018.
(Continued)

*Primary Examiner* — David Luo
(74) *Attorney, Agent, or Firm* — Nexsen Pruet, LLC; Todd A. Serbin

(57) ABSTRACT

A method and device for the open-loop/closed-loop control of a robot joint that is driven by an electric motor are provided, wherein the robot joint has a current sensor that comprises first sensor electronics for detecting a first operating current of the electric motor, a first position sensor for detecting a drive position of a drive train of the robot joint, a second position sensor for defecting an output position of an output train of the robot joint, and a first torque sensor for detecting a torque in the output train, wherein the electric motor is controlled by open-loop/closed-loop control on the basis of a pre-determined target control variable. The method comprises: providing measured values; checking for the presence of a fault by the first fault detector when the measured values and/or time derivatives thereof fail to satisfy first threshold values; and checking for a fault with further fault detectors.

14 Claims, 34 Drawing Sheets

(58) Field of Classification Search
USPC .................. 318/568.11, 568.1, 567, 560
See application file for complete search history.

(56) References Cited

U.S. PATENT DOCUMENTS

| | | | |
|---|---|---|---|
| 8,036,776 | B2 | 10/2011 | Hellberg et al. |
| 2013/0245825 | A1 | 9/2013 | Vicentini et al. |
| 2014/0067124 | A1 | 3/2014 | Williamson et al. |
| 2014/0201571 | A1 | 7/2014 | Hosek et al. |

FOREIGN PATENT DOCUMENTS

| | | |
|---|---|---|
| DE | 102013016019 B3 | 3/2015 |
| EP | 1600833 A2 | 11/2005 |
| JP | H09297614 A | 11/1997 |
| JP | 2009500767 A | 1/2009 |
| JP | 2013004099 A | 1/2013 |
| JP | 2013233614 A | 11/2013 |
| WO | 2007008940 A2 | 1/2007 |
| WO | 2007057390 A2 | 5/2007 |
| WO | 2014036138 A1 | 3/2014 |
| WO | 2014148068 A1 | 9/2014 |

OTHER PUBLICATIONS

Nettesheim, Johannes; International Search Report; 4 pages; PCT/DE2016/000219; dated Oct. 6, 2016.
Liebschner, Mario; Examination Report; German Patent and Trade Mark Office; 3 pages; 11 2016 001 832.2; dated Jan. 31, 2019.
Tamura, Kosaku et al.; Japanese Office Action 2017-560790; 12 pages; dated Apr. 11, 2019.

* cited by examiner

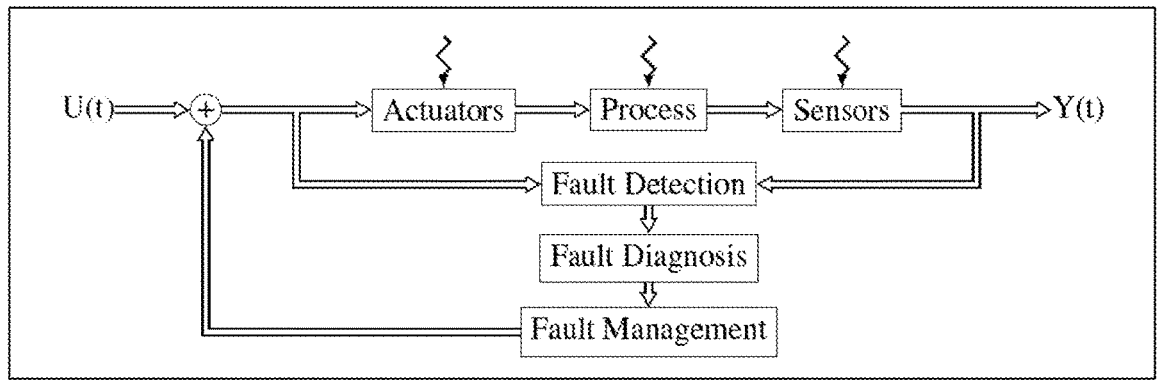
Fig. 1.1
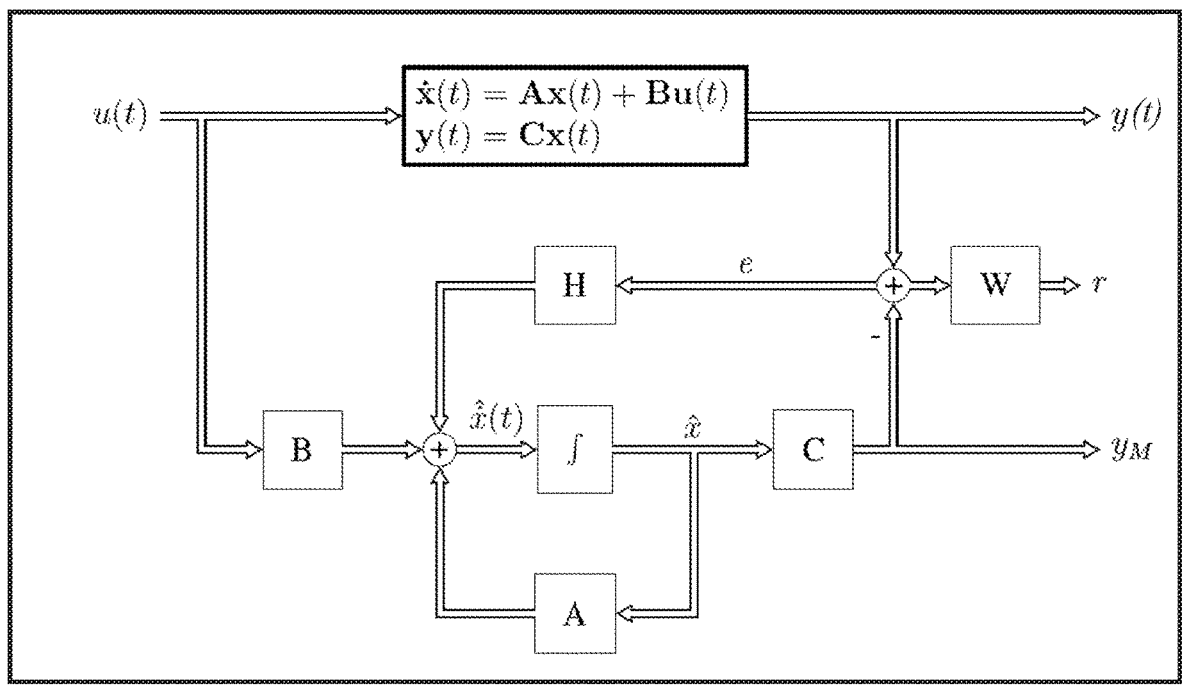
Fig. 1.2

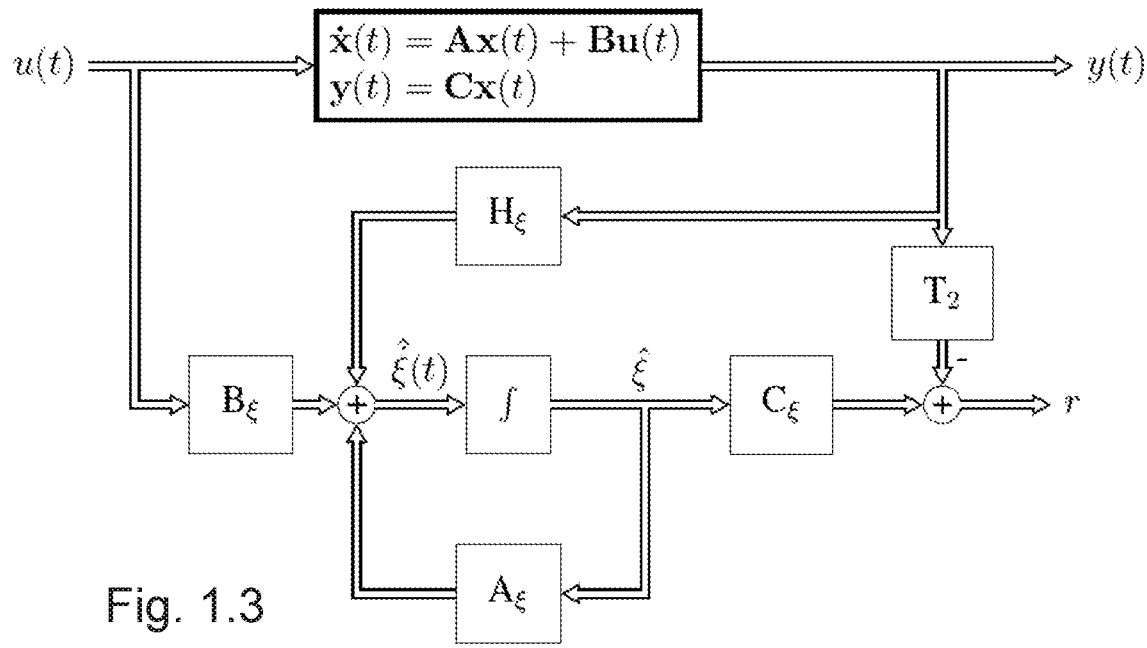
Fig. 1.3
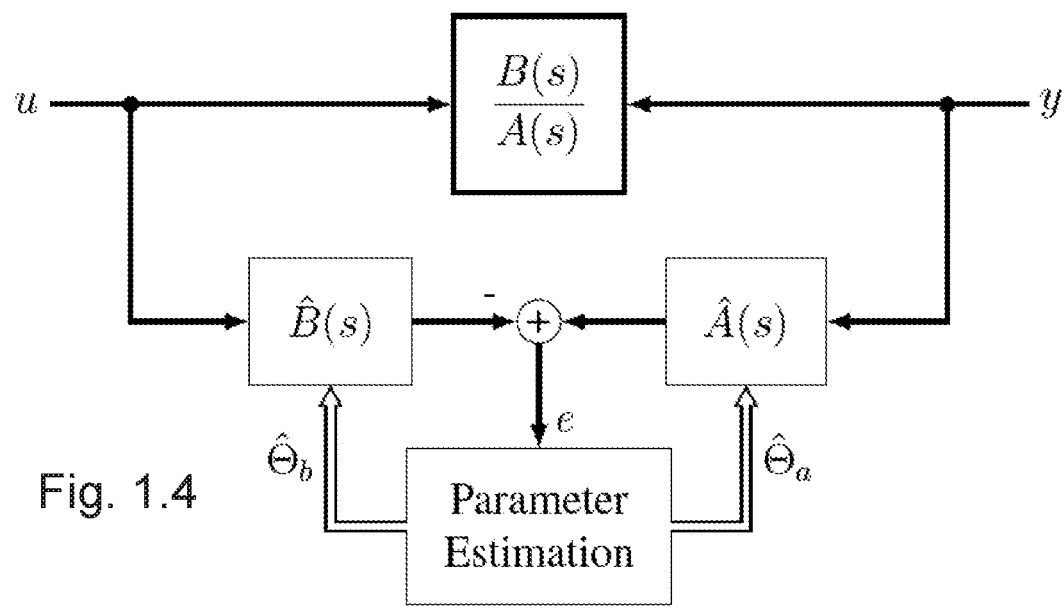
Fig. 1.4

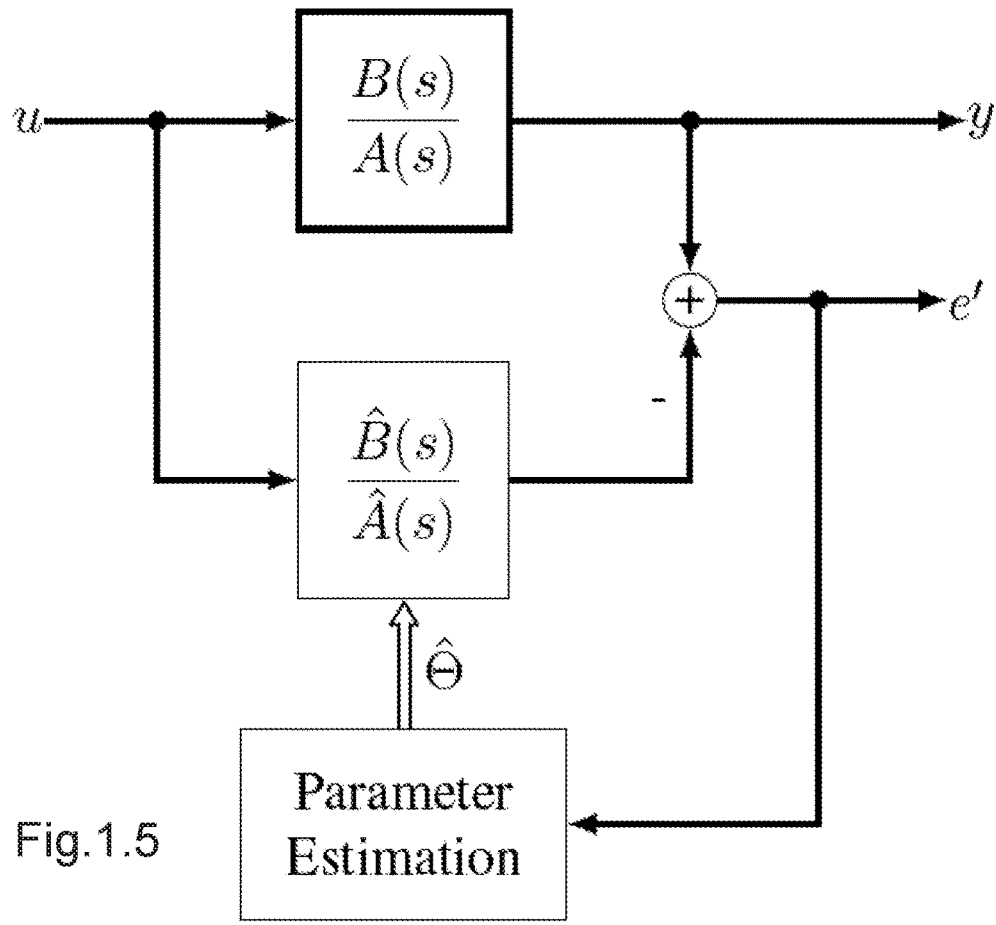
Fig.1.5
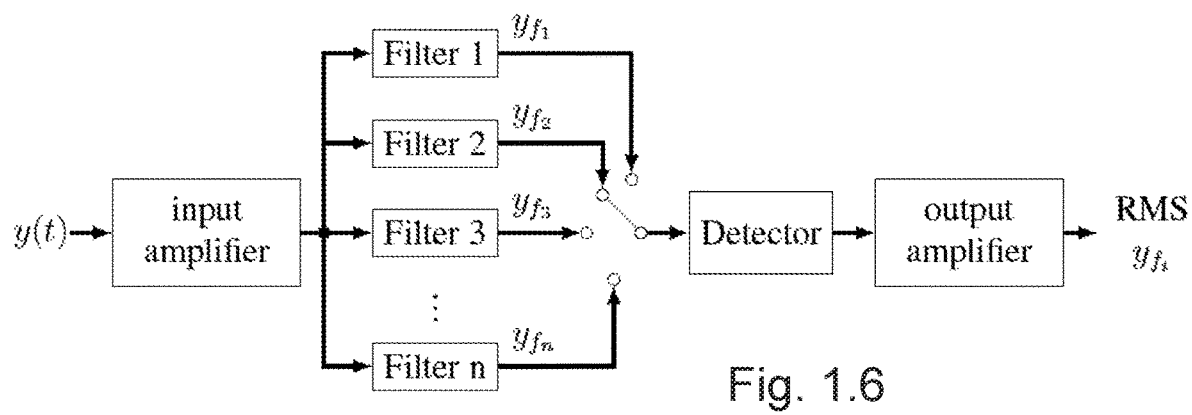
Fig. 1.6

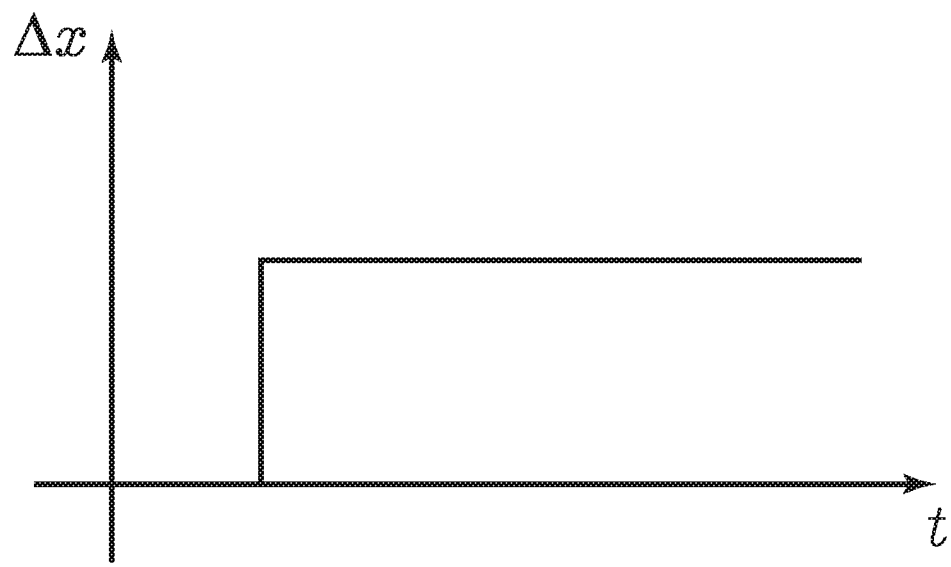
Fig. 2.1
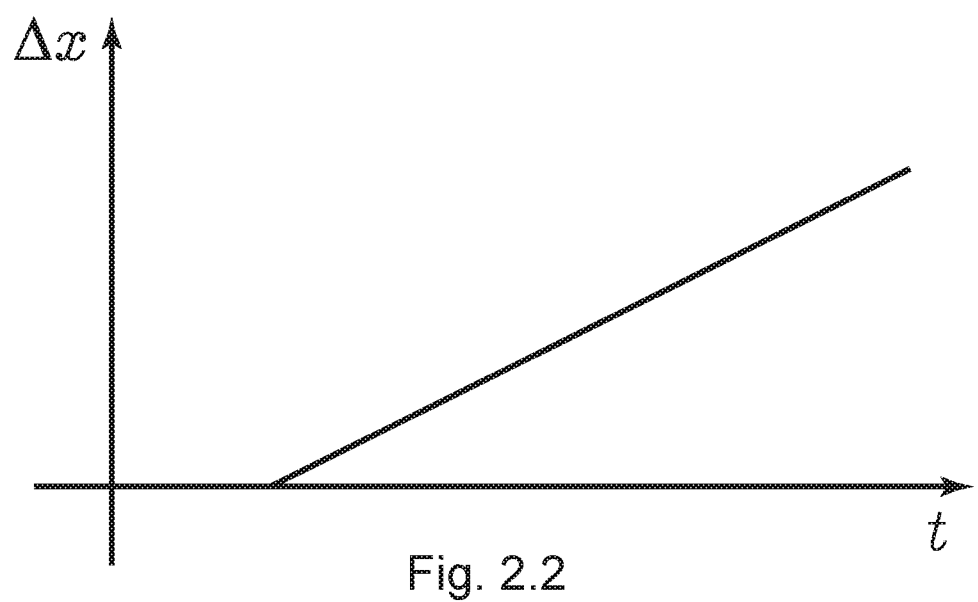
Fig. 2.2

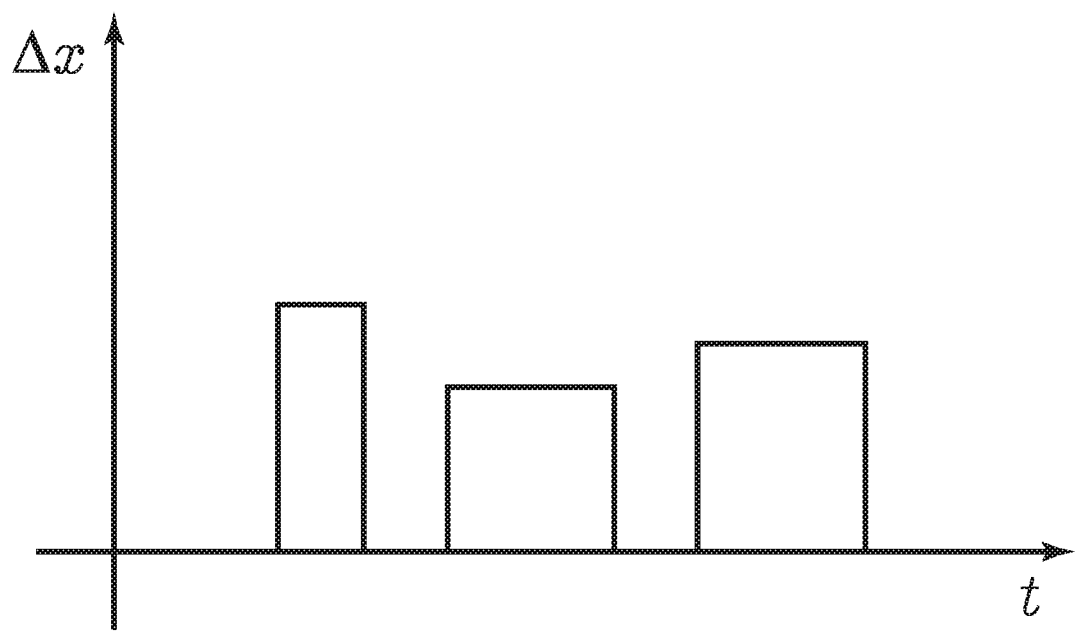
Fig. 2.3
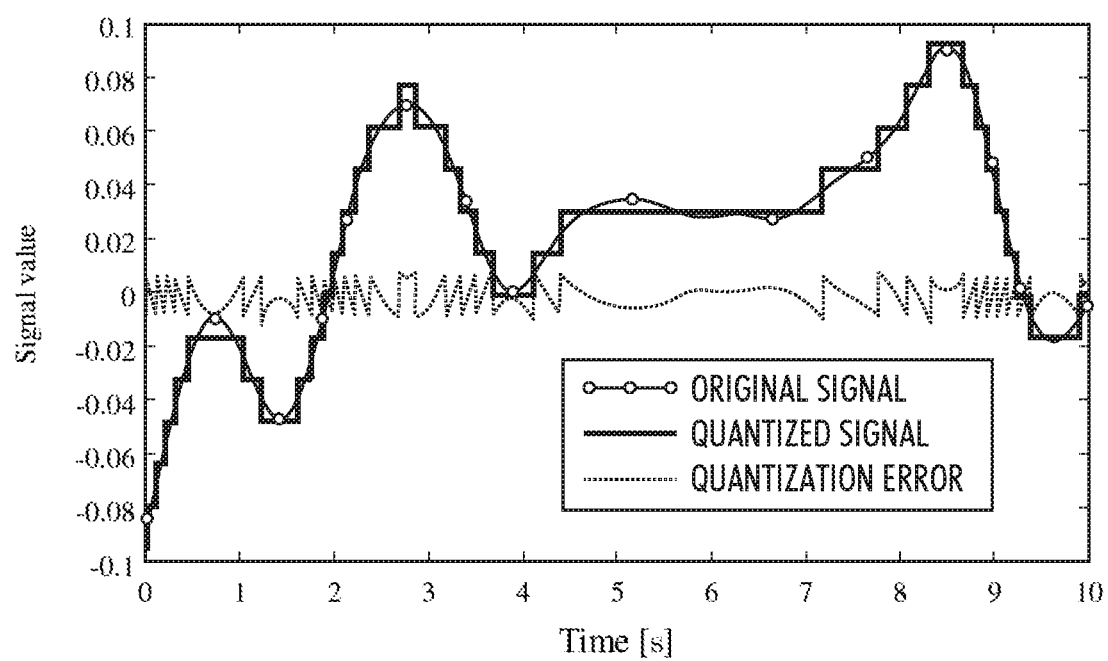
Fig. 2.4

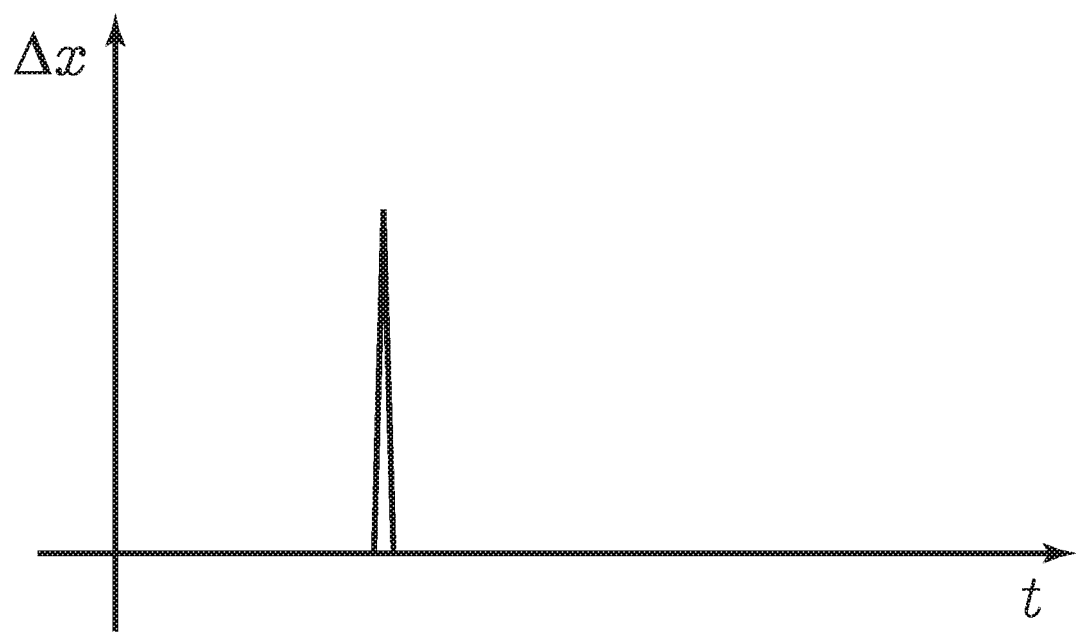
Fig. 2.5
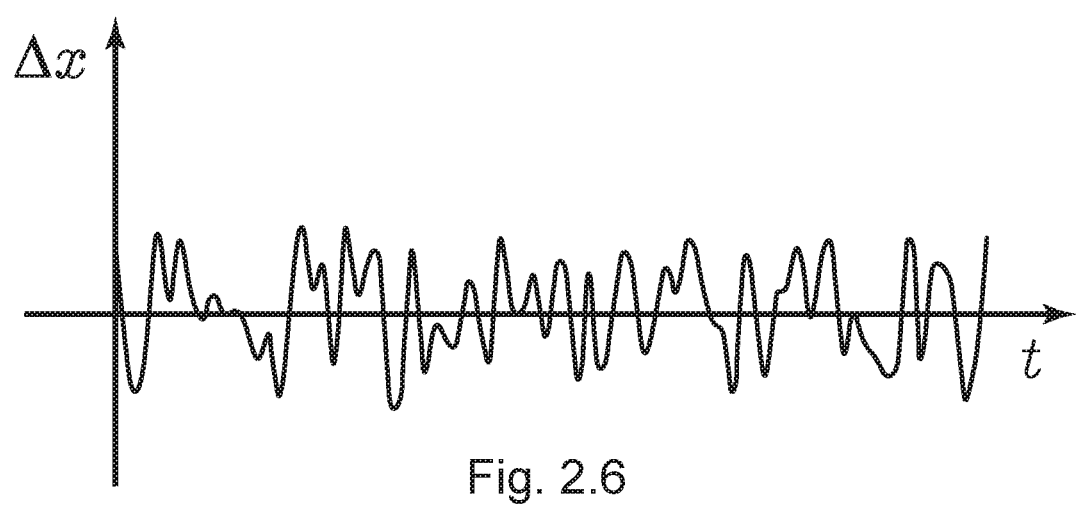
Fig. 2.6

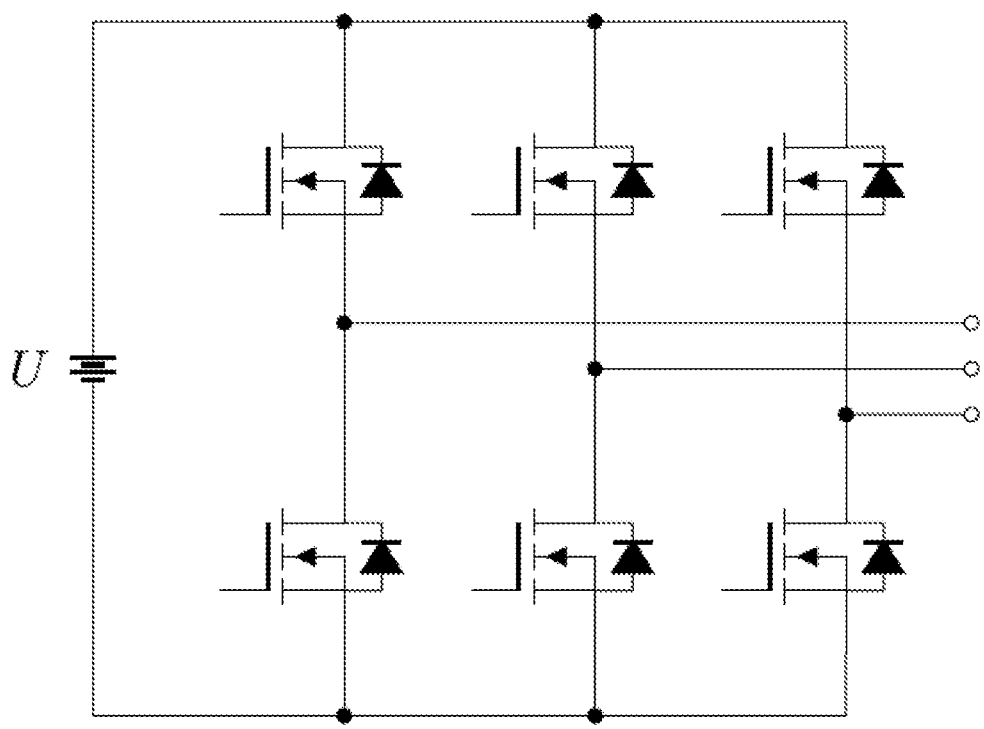
Fig. 2.7

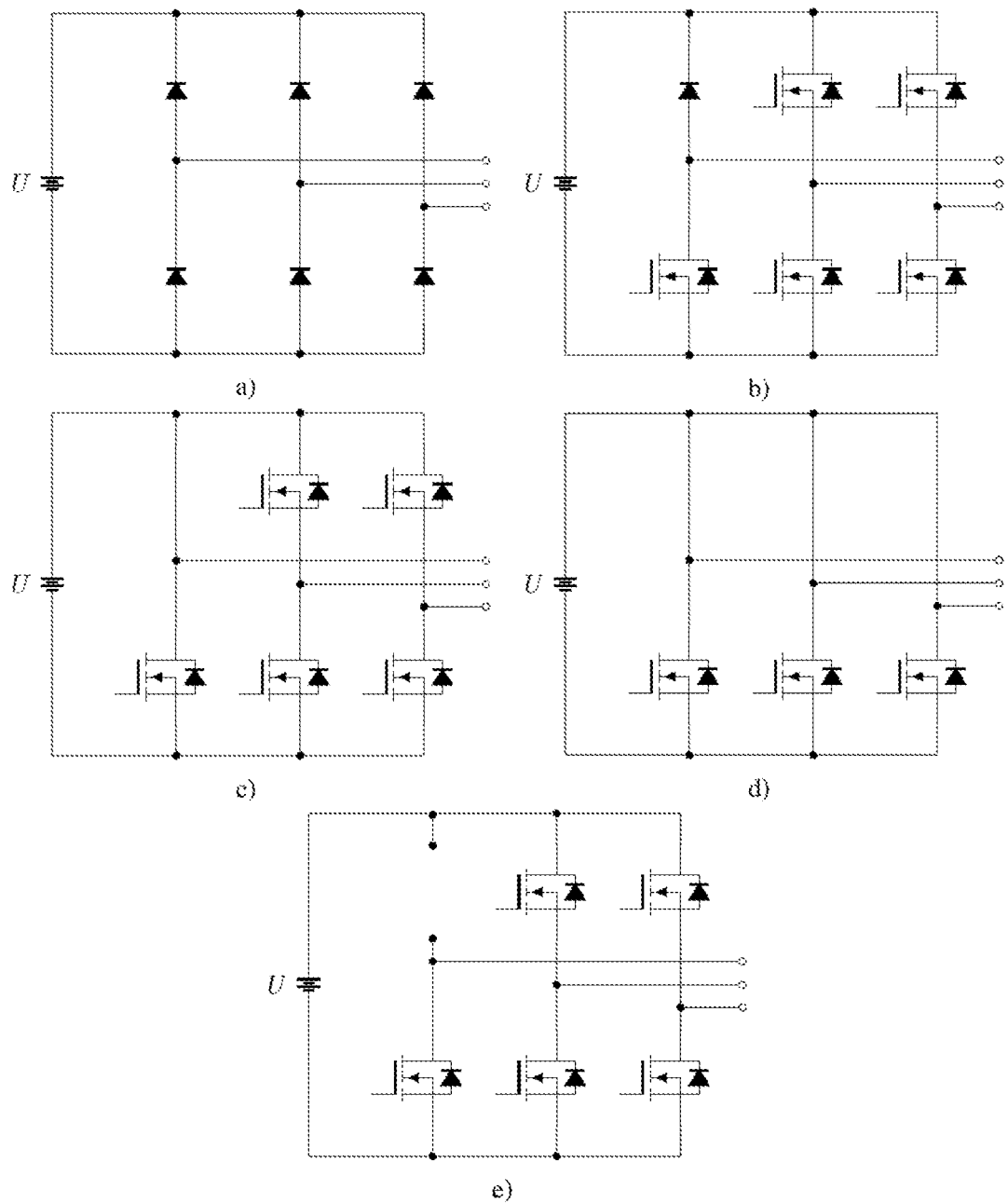
Fig. 2.8 a-e

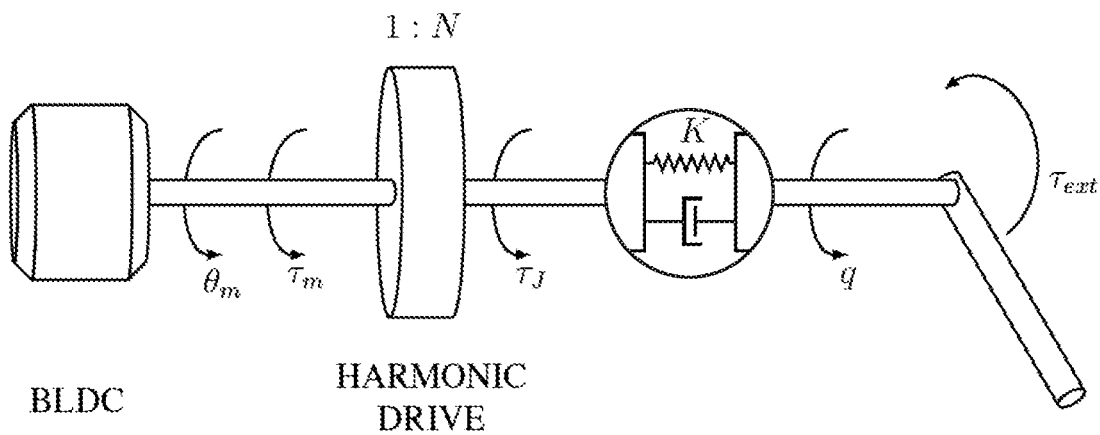
Fig. 3.1
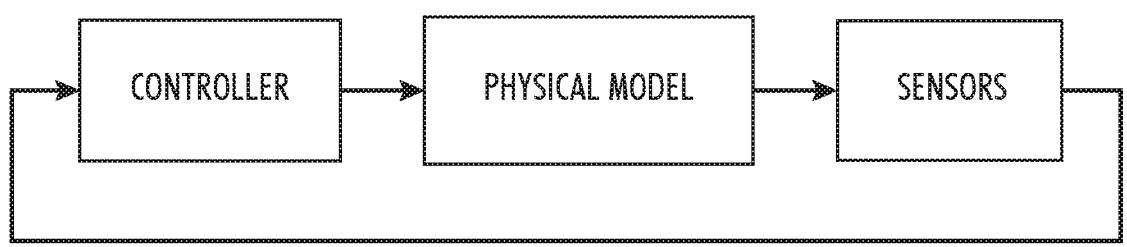
Fig. 3.2

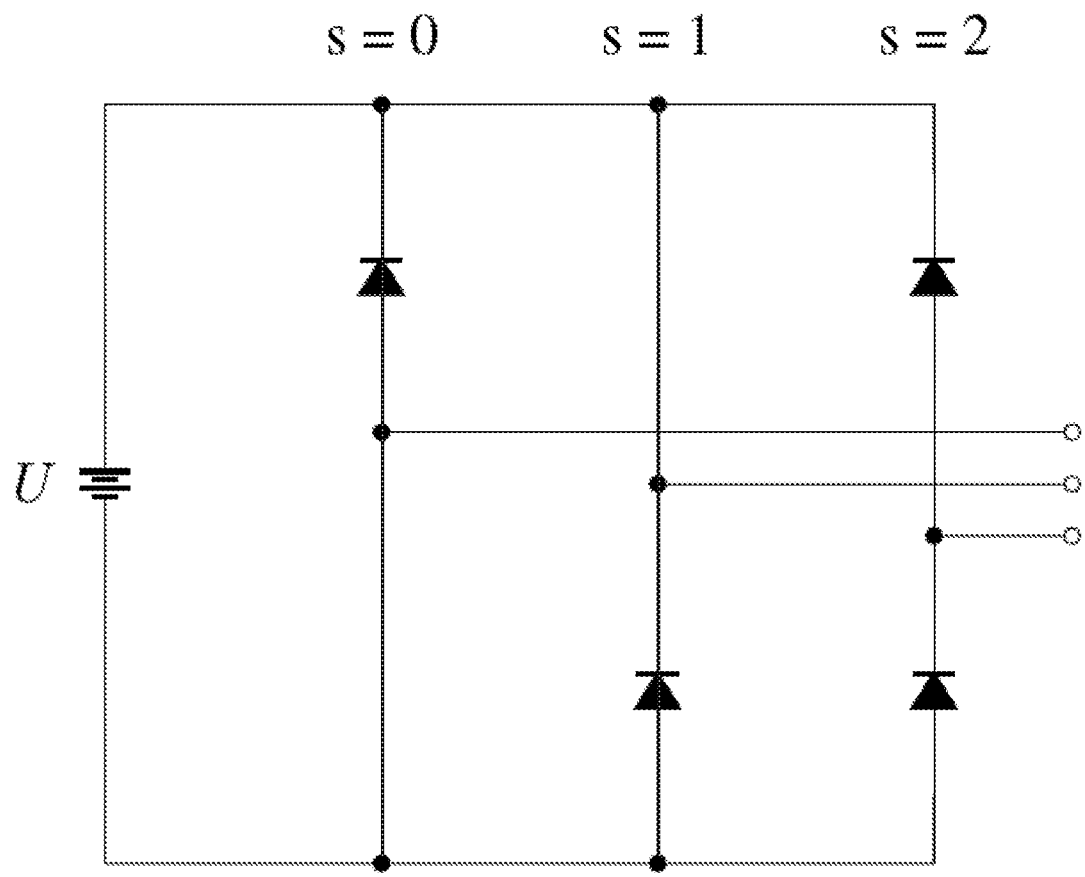
Fig. 3.3
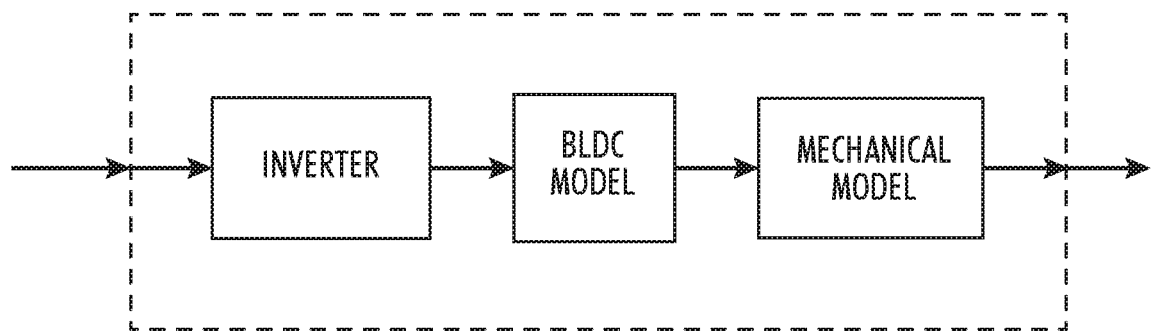
Fig. 3.4

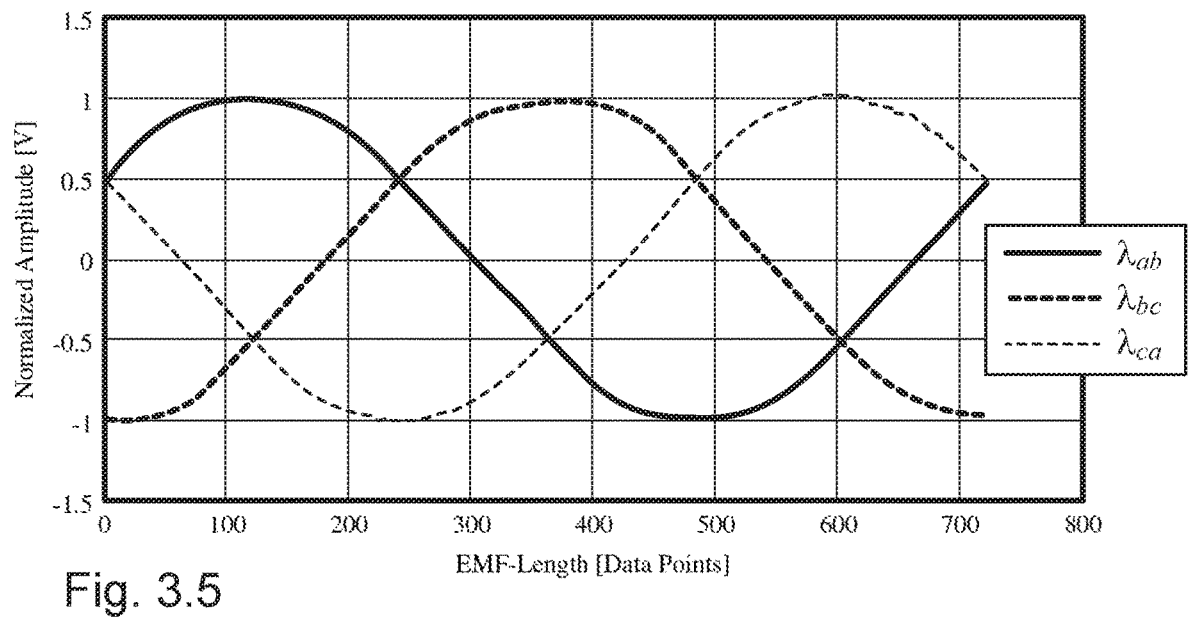
Fig. 3.5
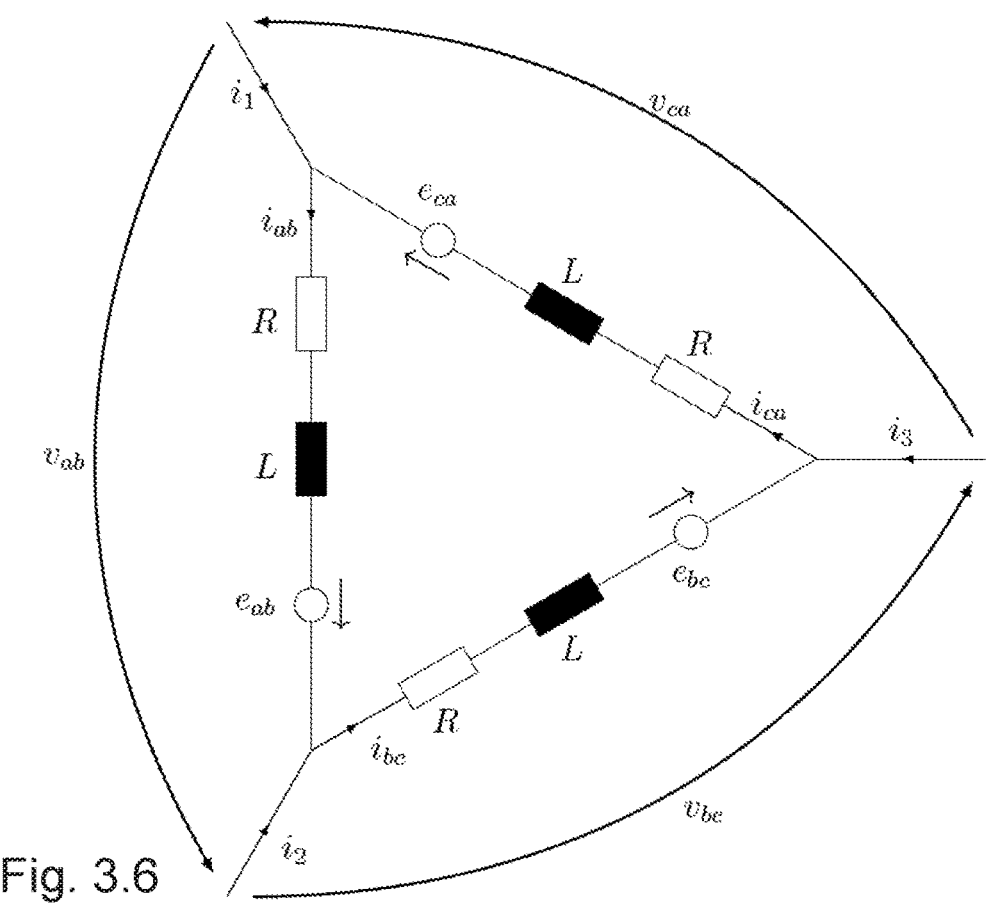
Fig. 3.6

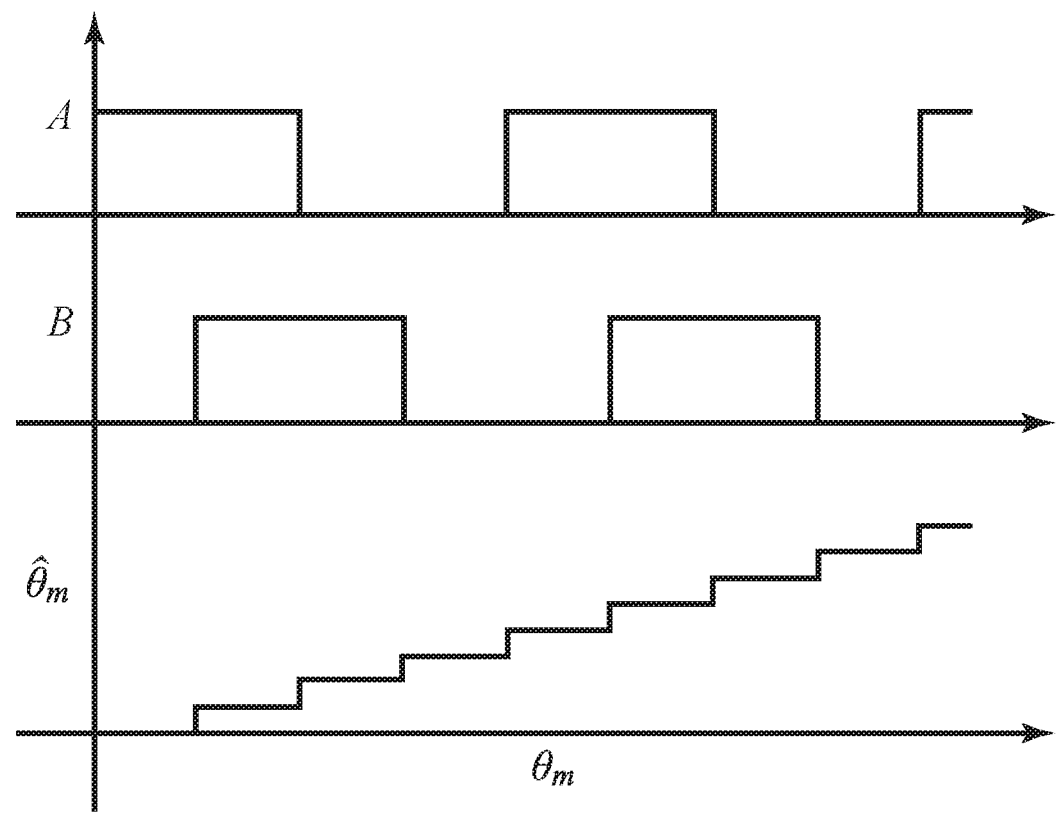
Fig. 3.7
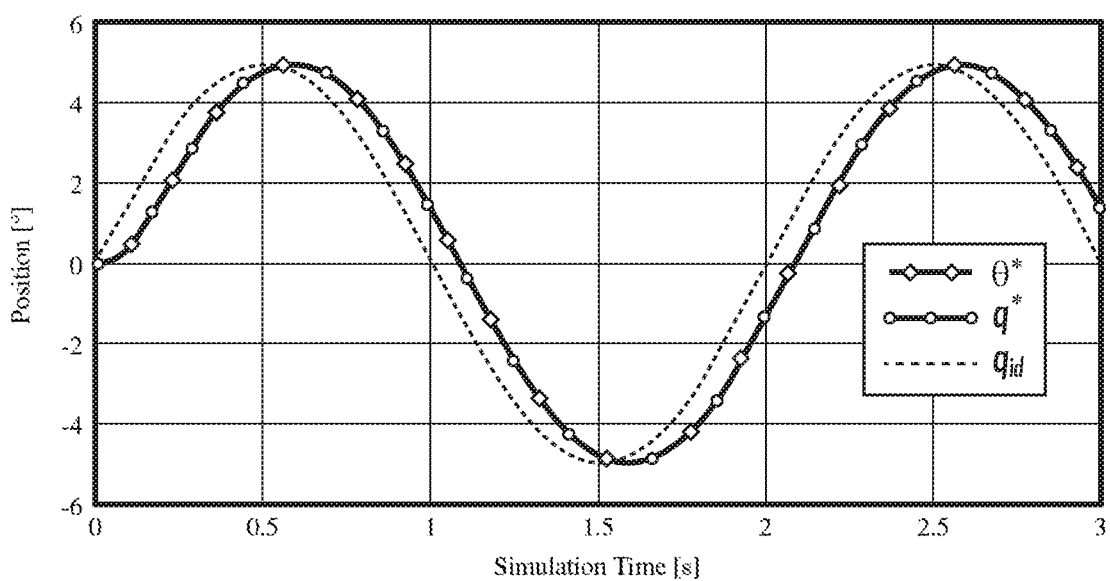
Fig. 3.8

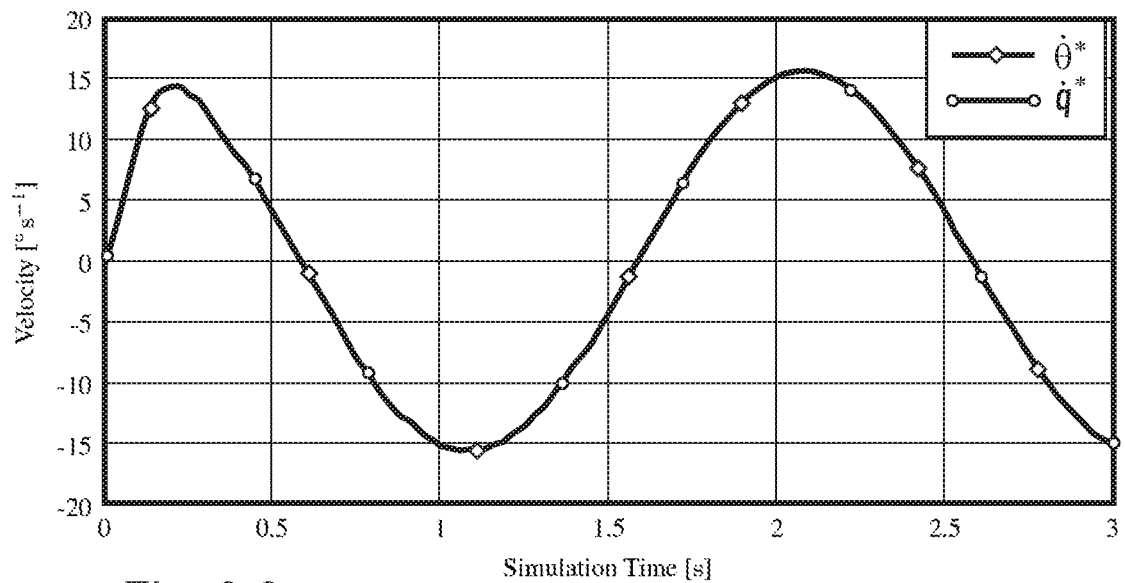
Fig. 3.9
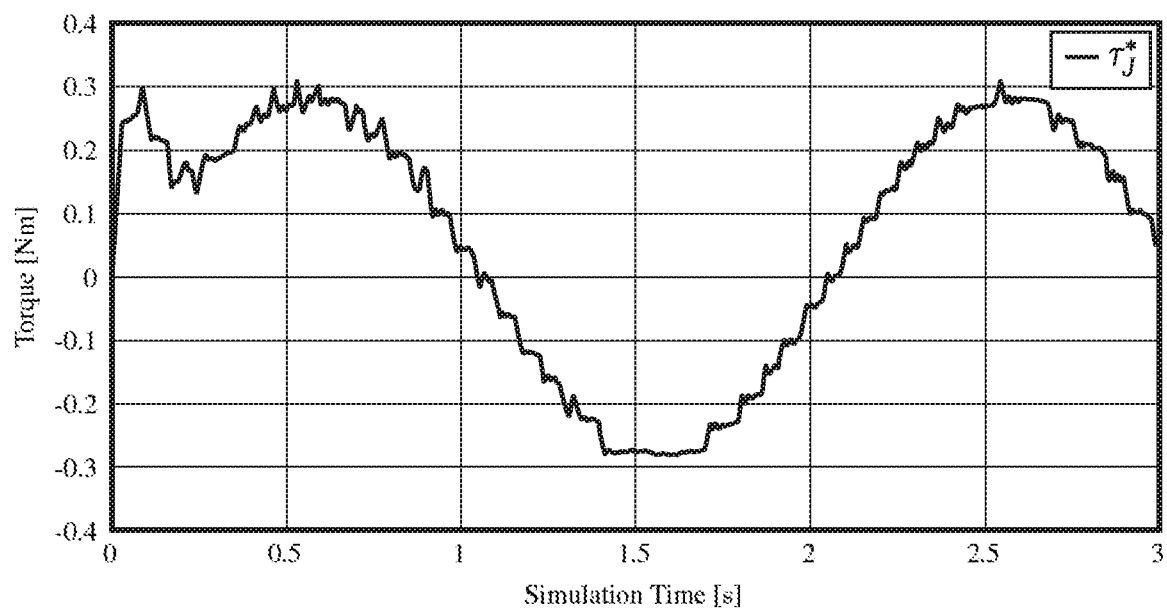
Fig. 3.10

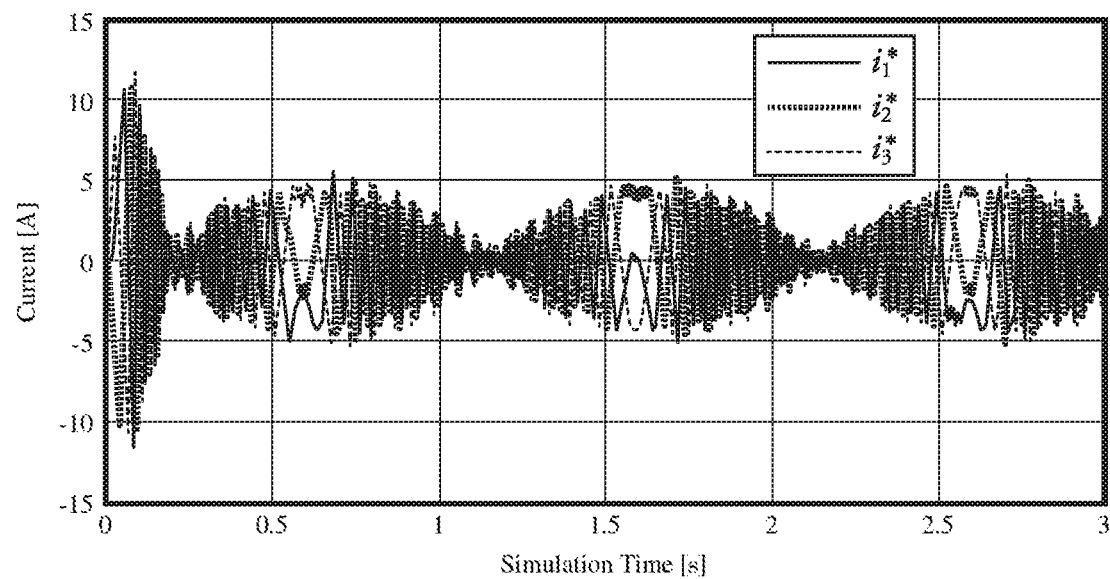
Fig. 3.11
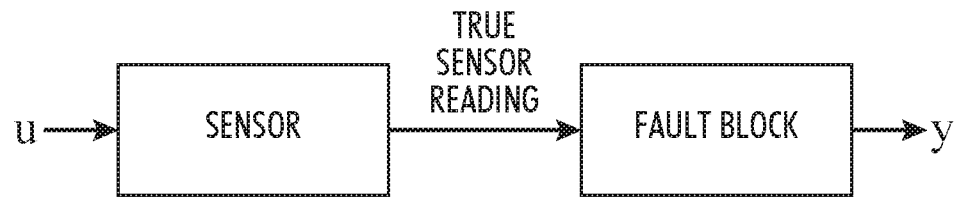
Fig. 3.12
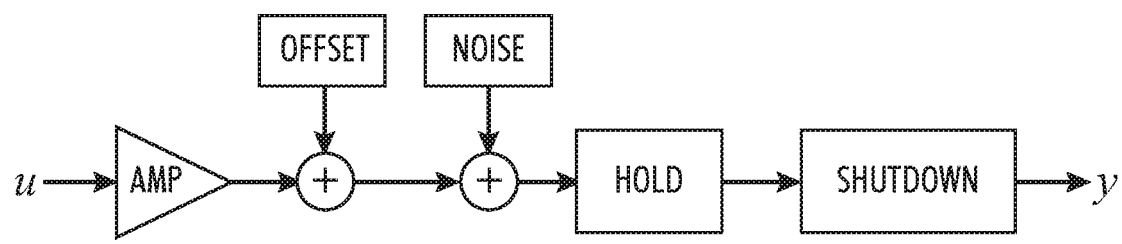
Fig. 3.13

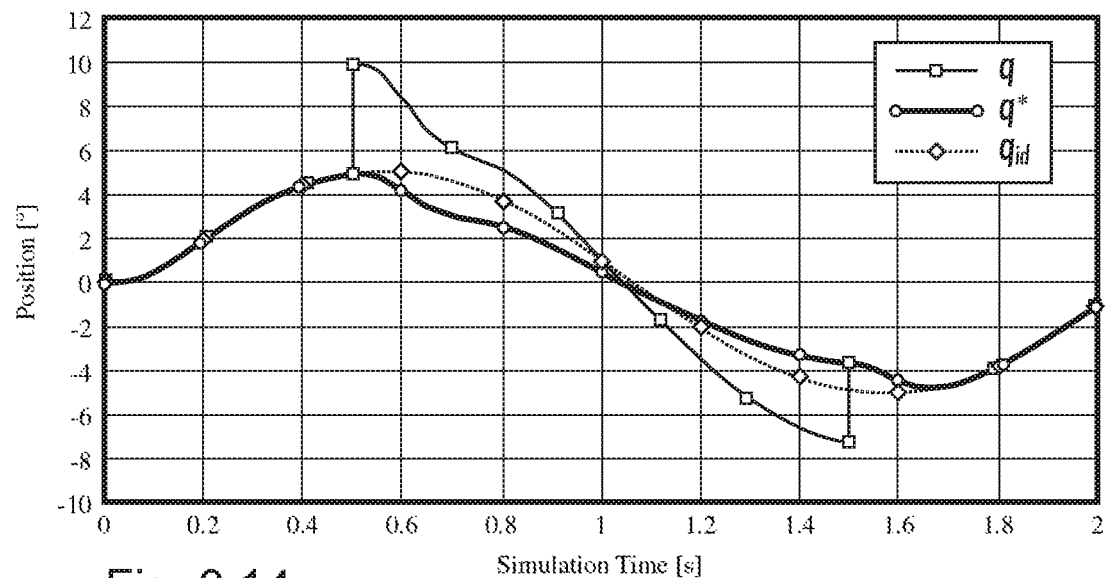
Fig. 3.14
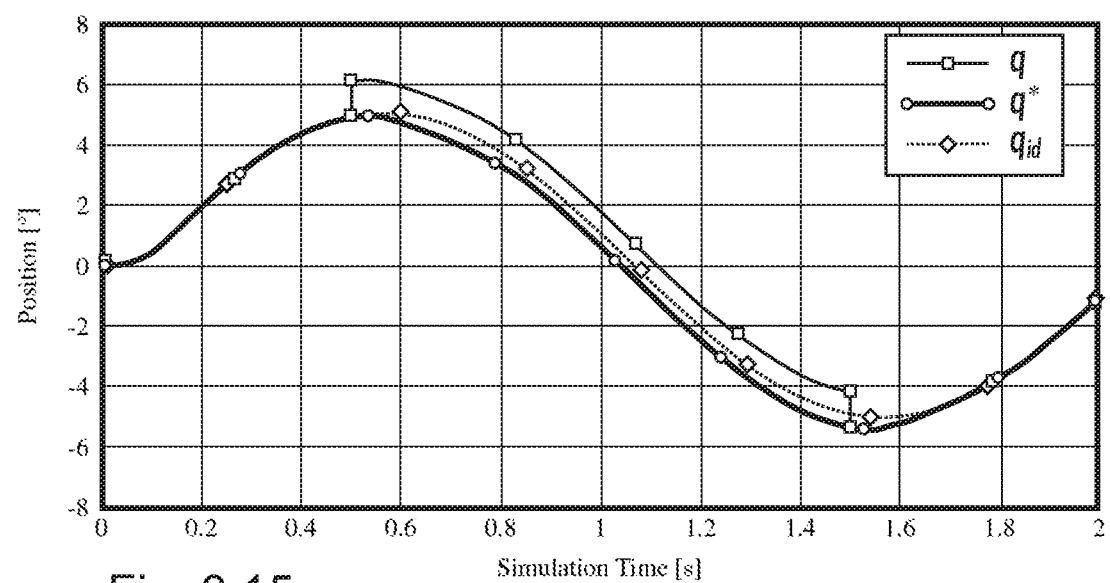
Fig. 3.15

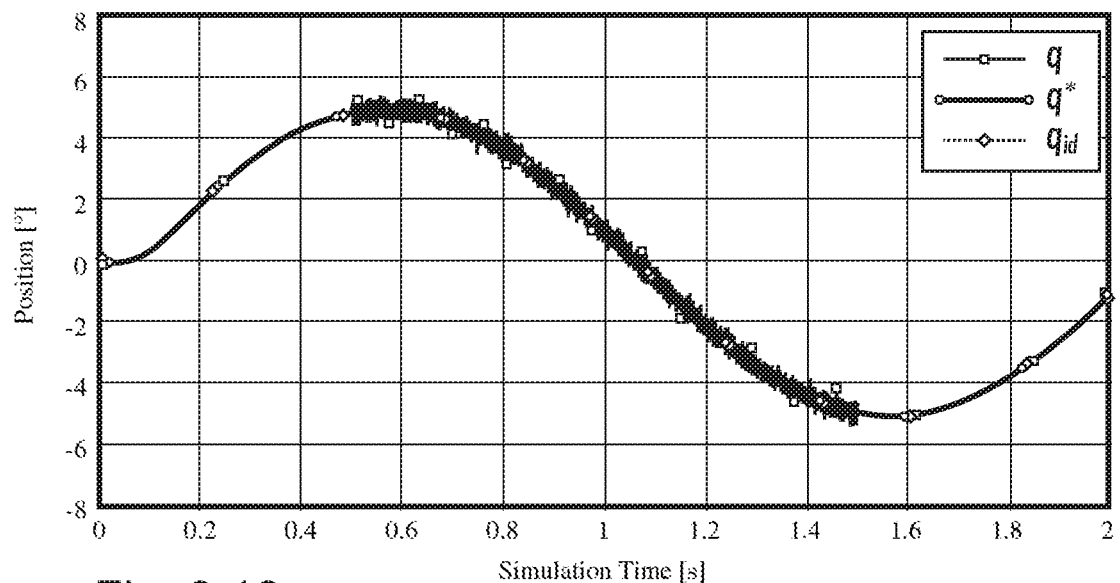
Fig. 3.16
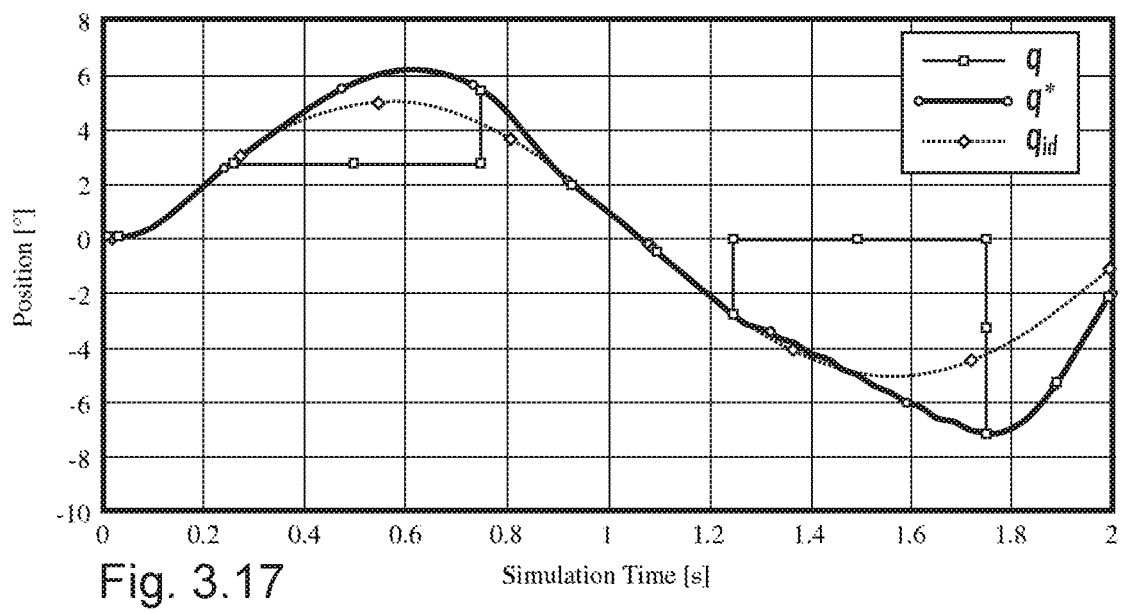
Fig. 3.17

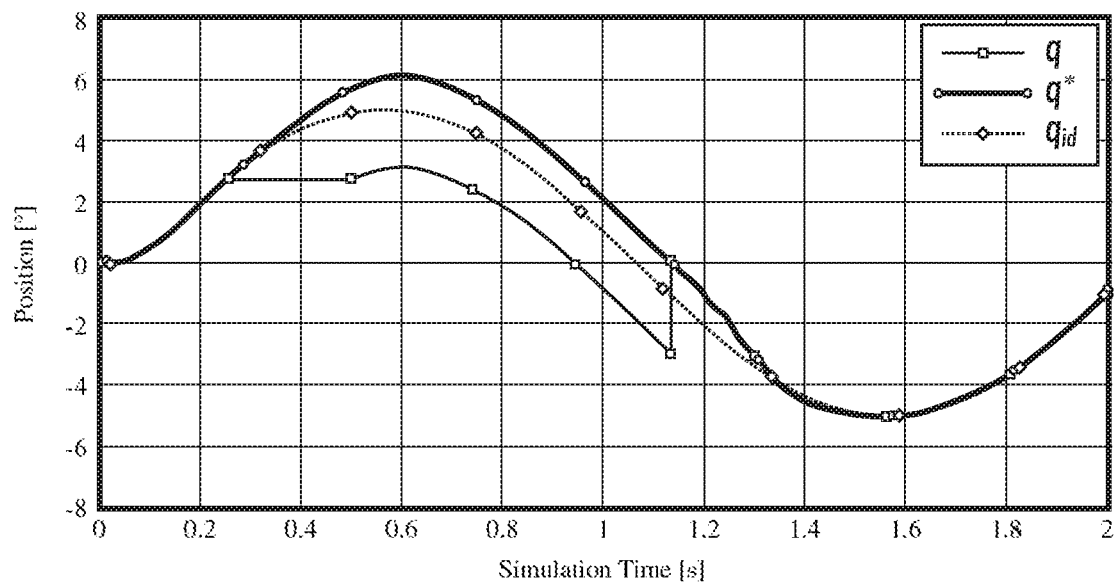
Fig. 3.18
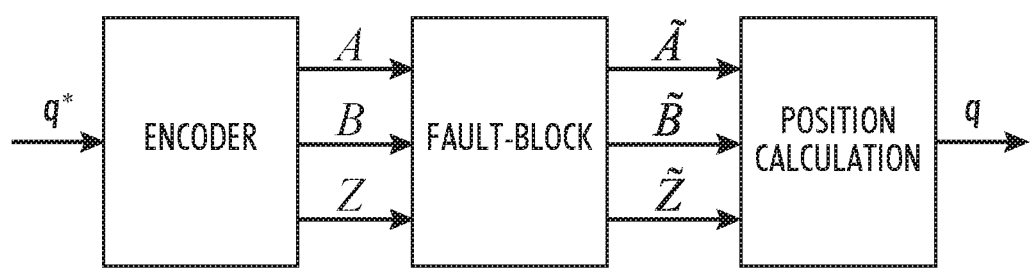
Fig. 3.19

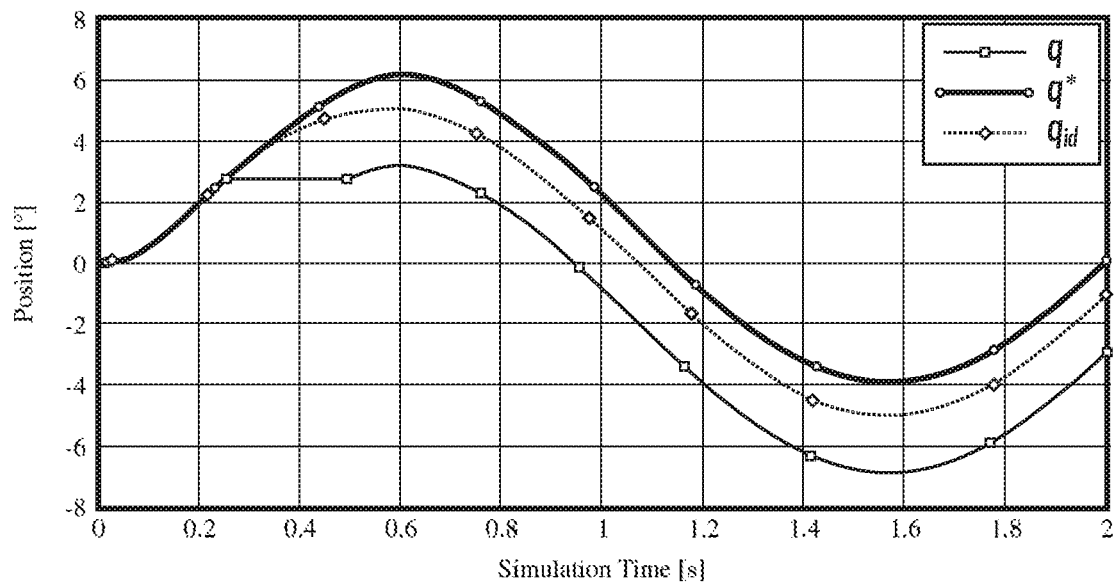
Fig. 3.20
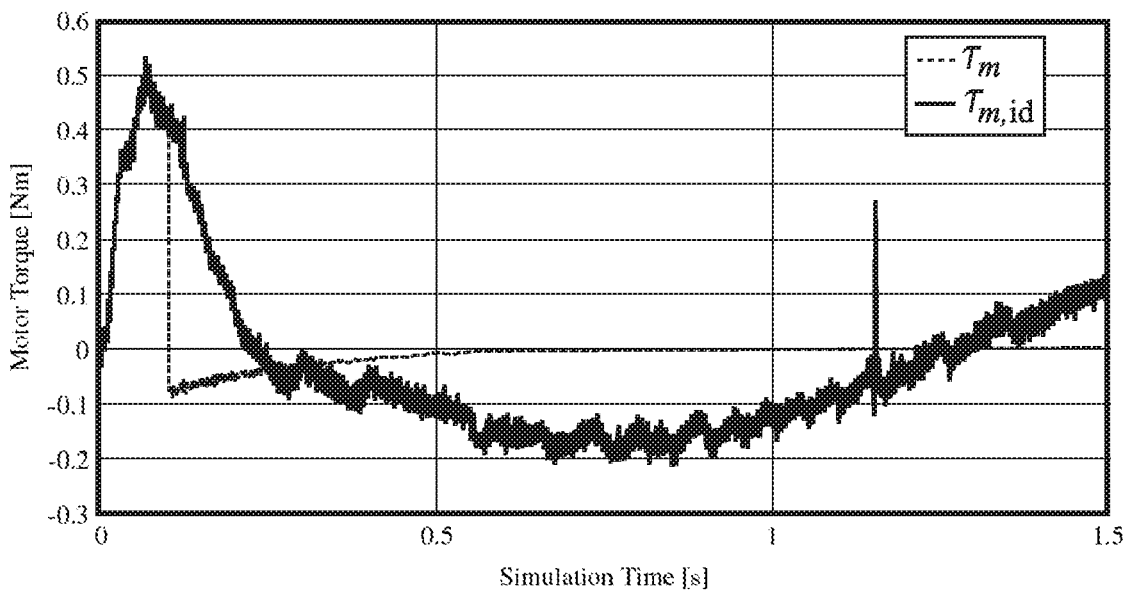
Fig. 3.21

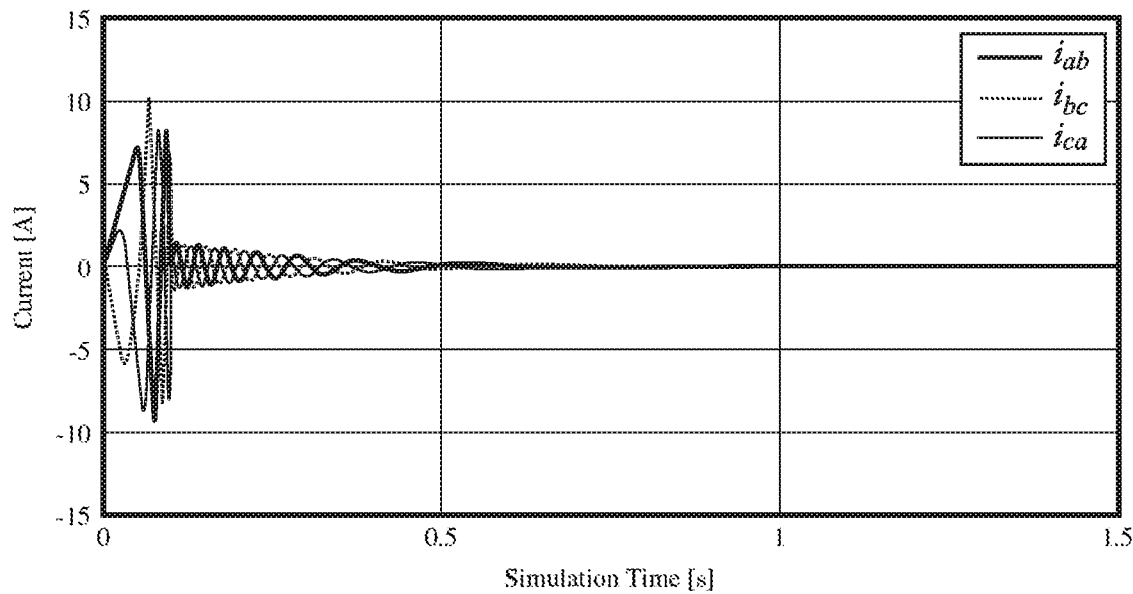
Fig. 3.22
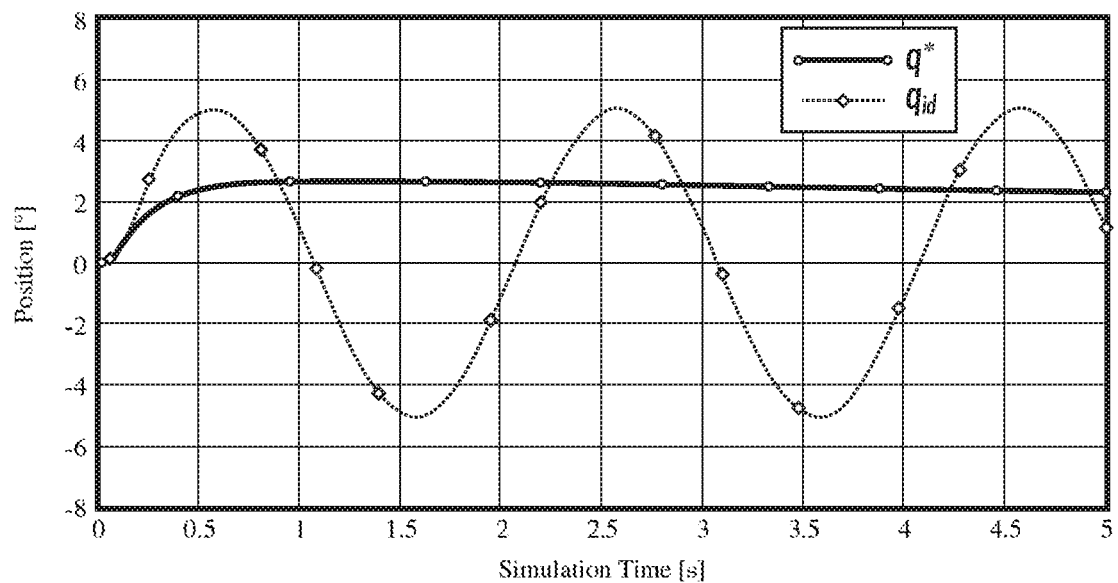
Fig. 3.23

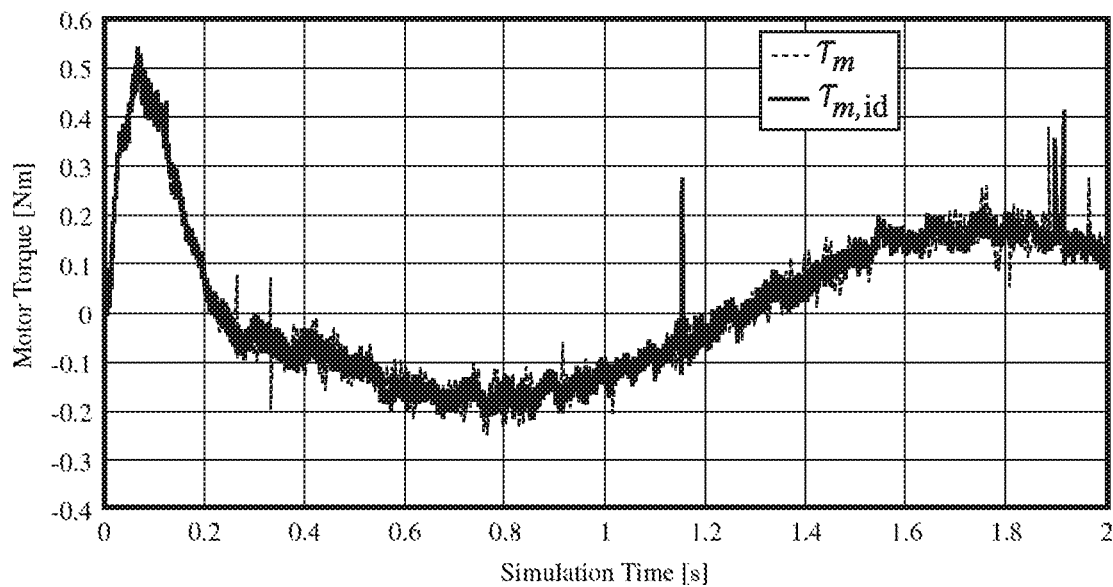
Fig. 3.24
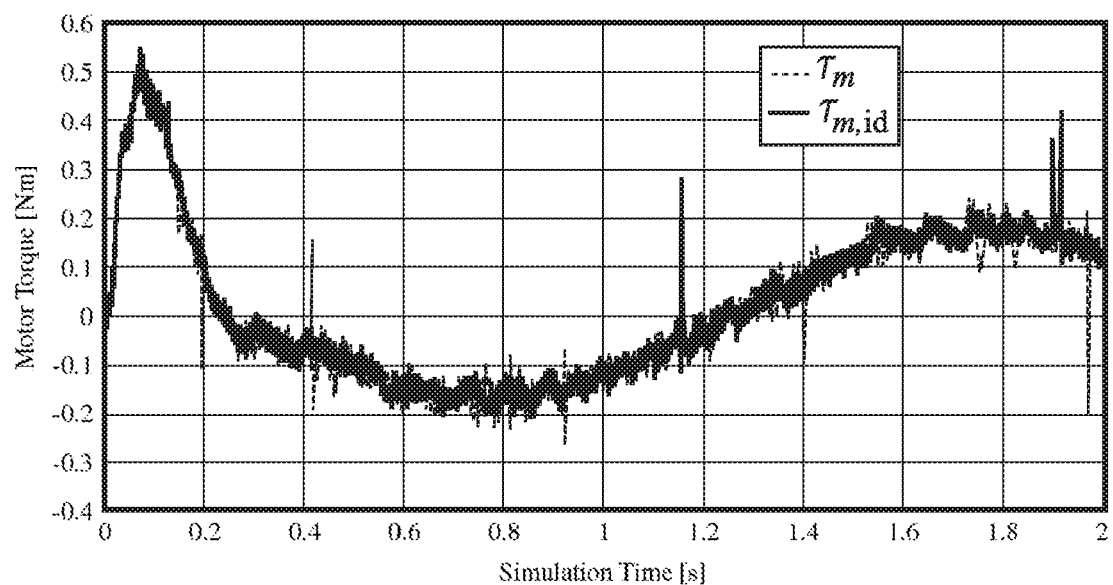
Fig. 3.25

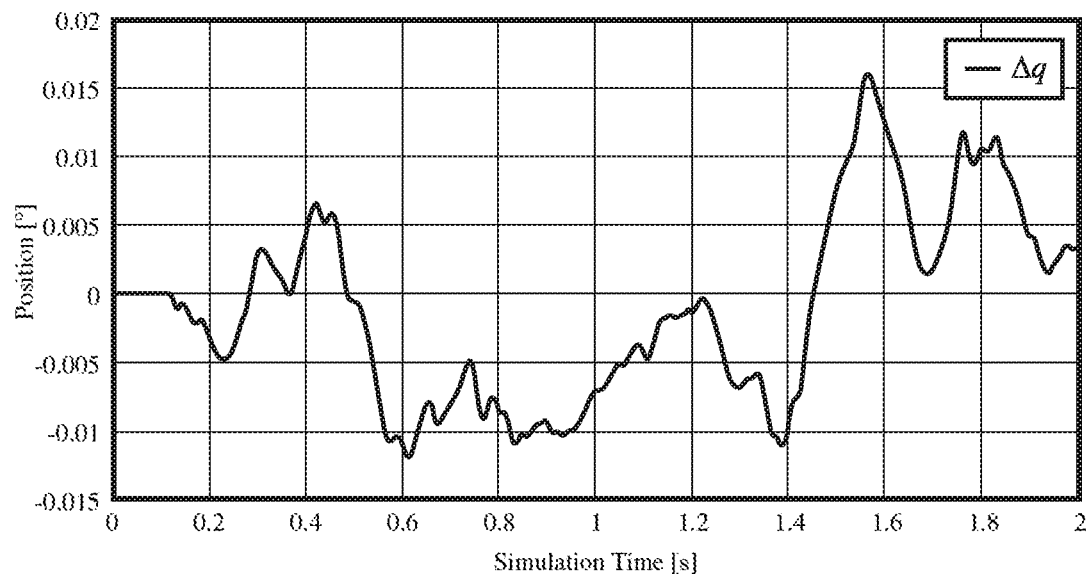
Fig. 3.26
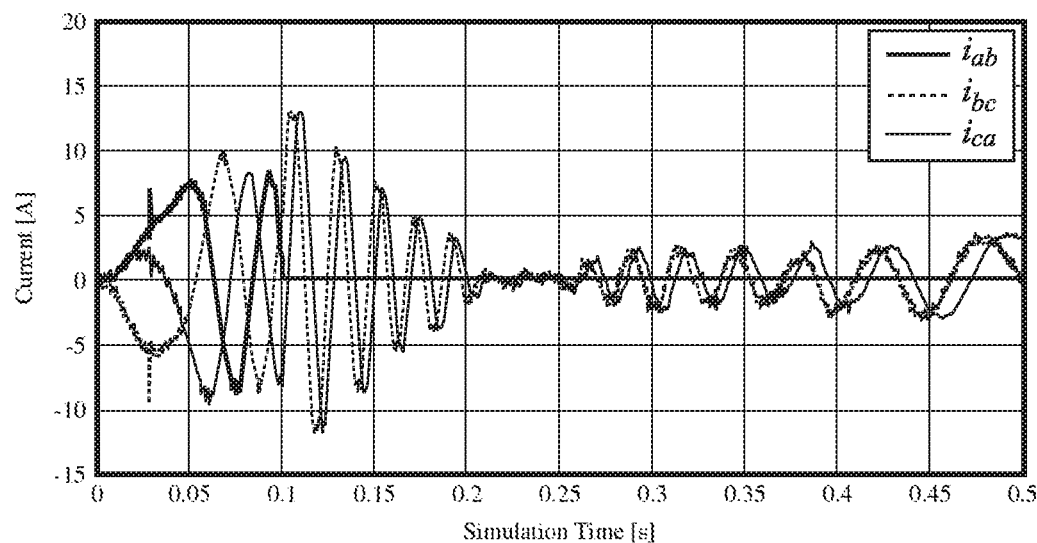
Fig. 3.27

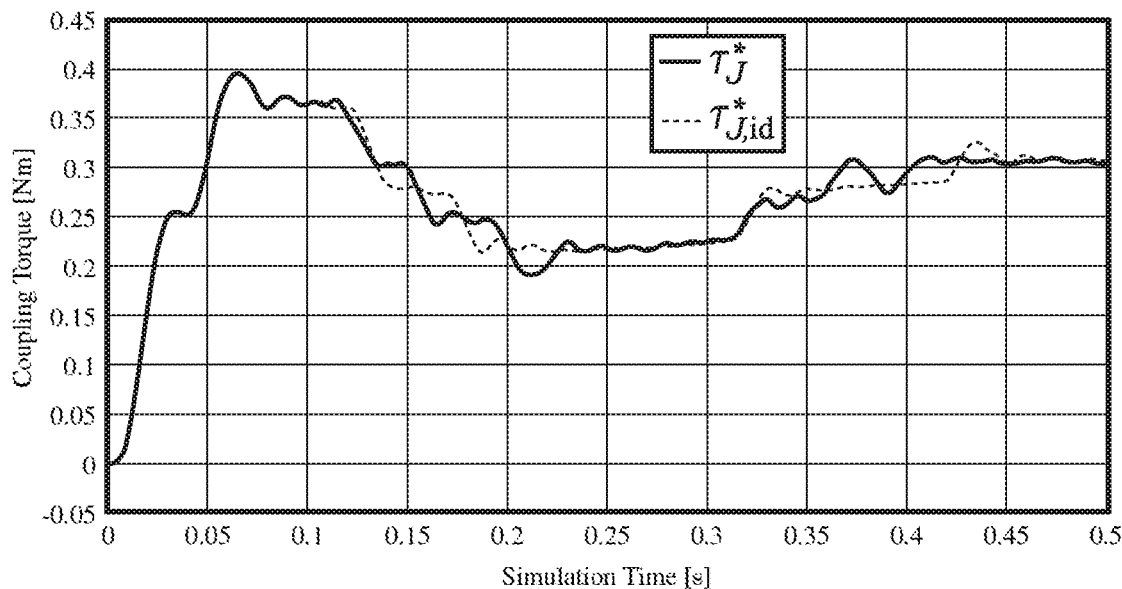
Fig. 3.28
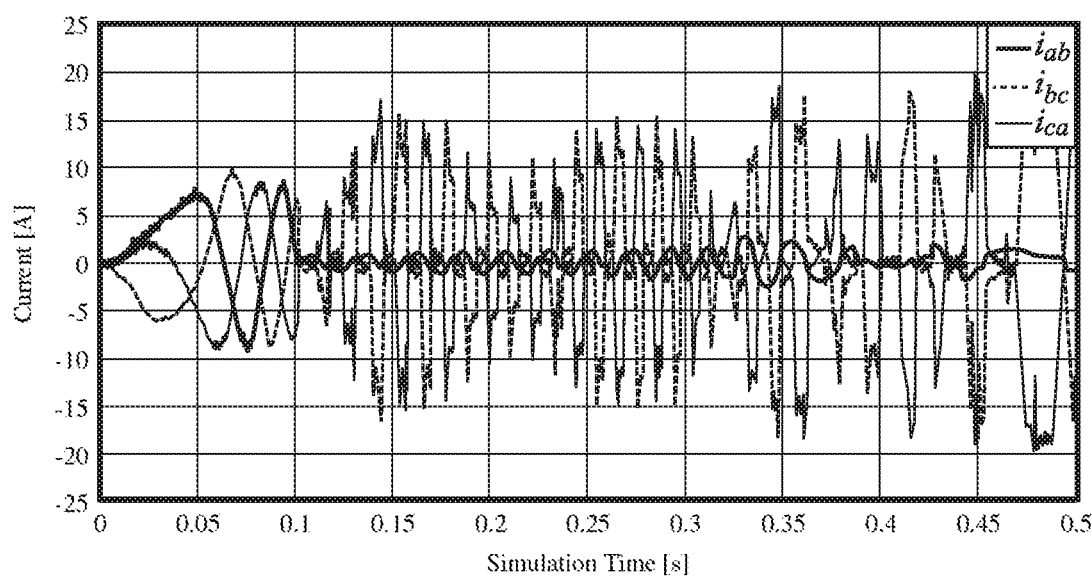
Fig. 3.29

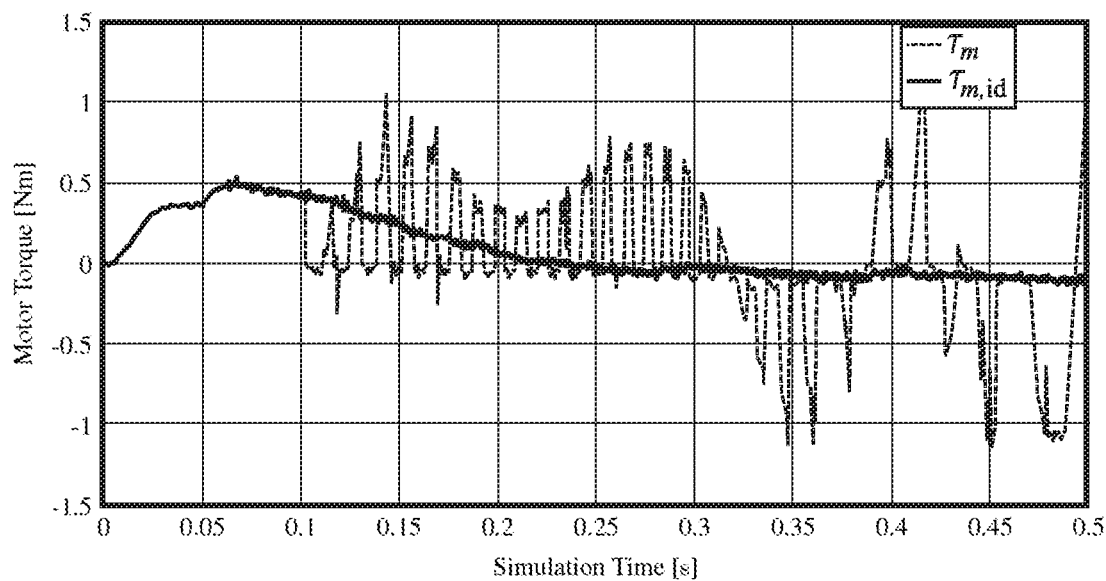
Fig. 3.30
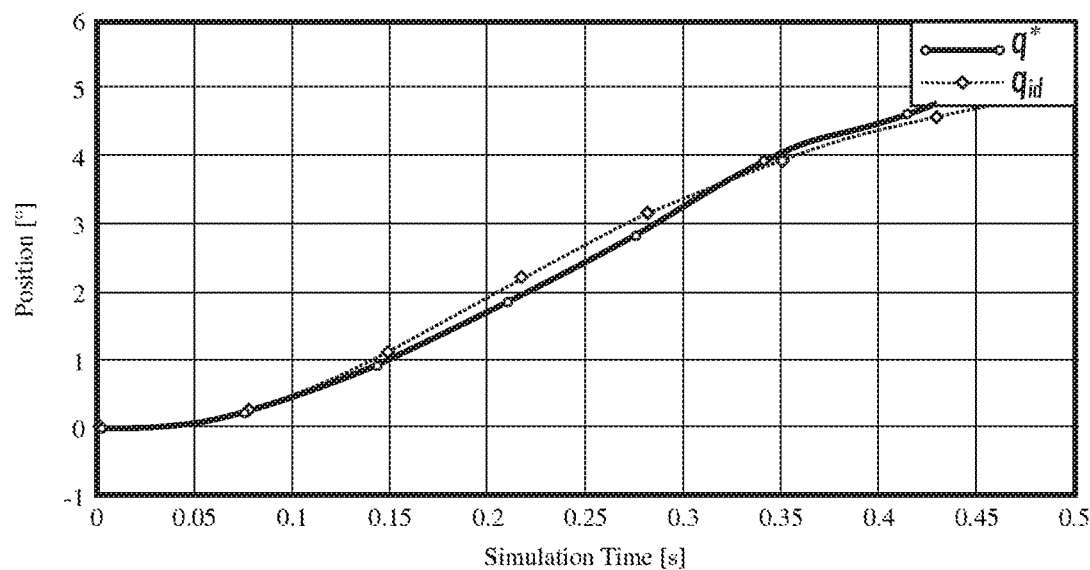
Fig. 3.31

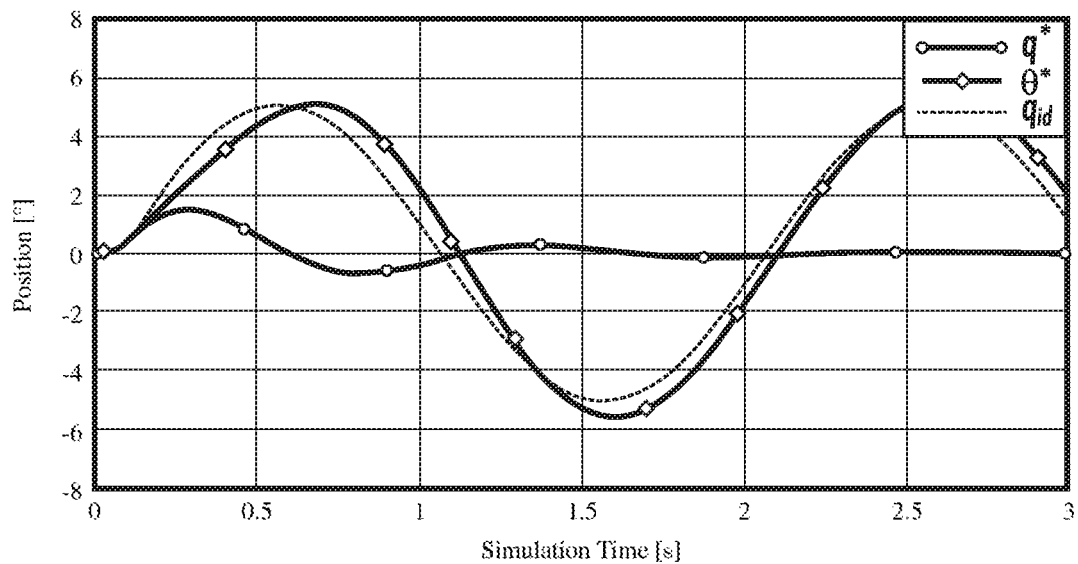
Fig. 3.32
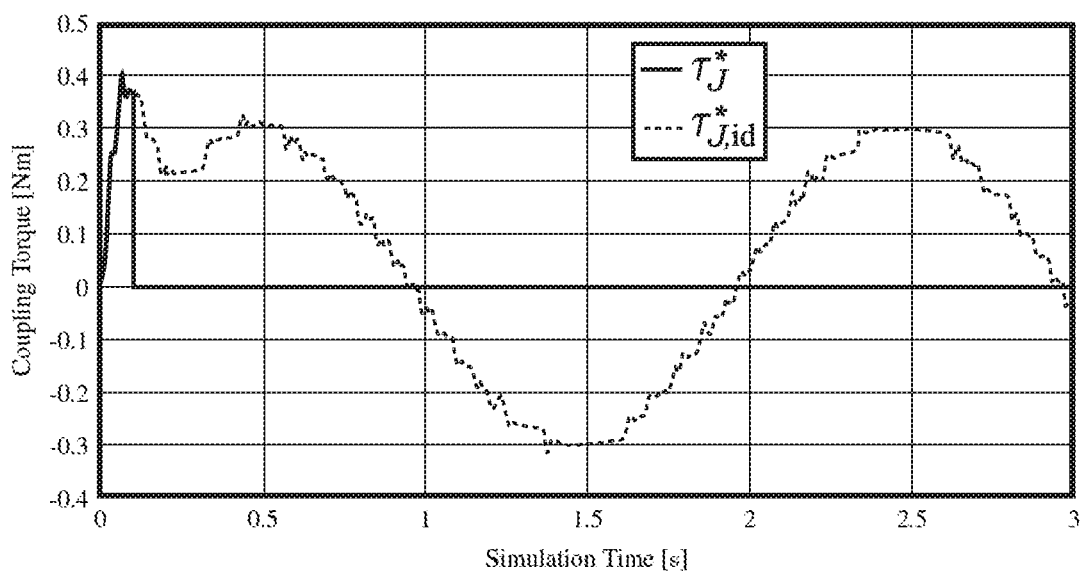
Fig. 3.33

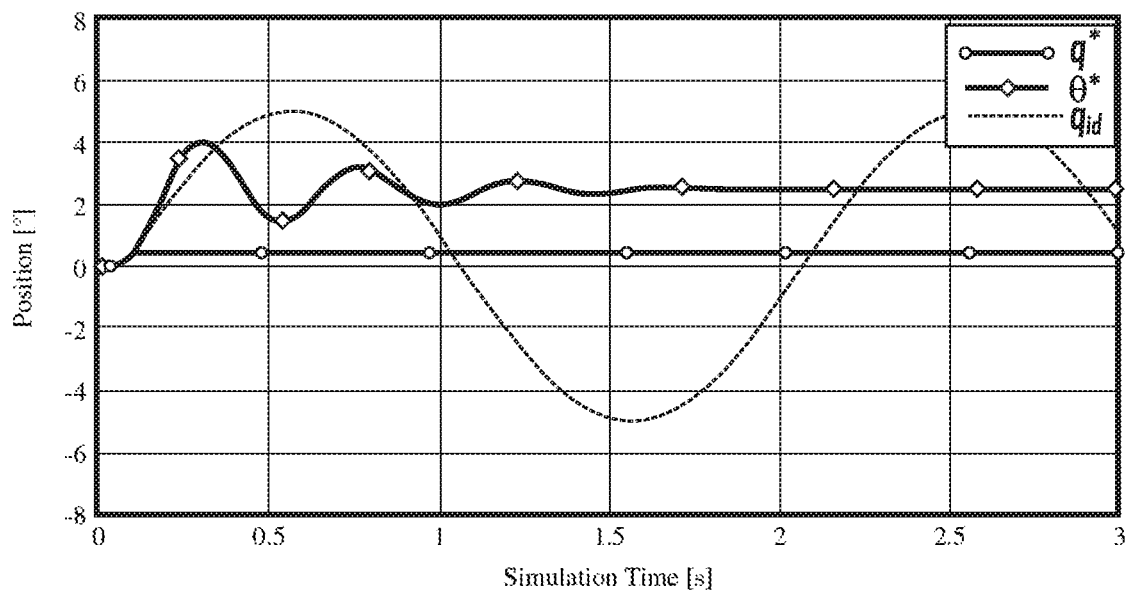
Fig. 3.34
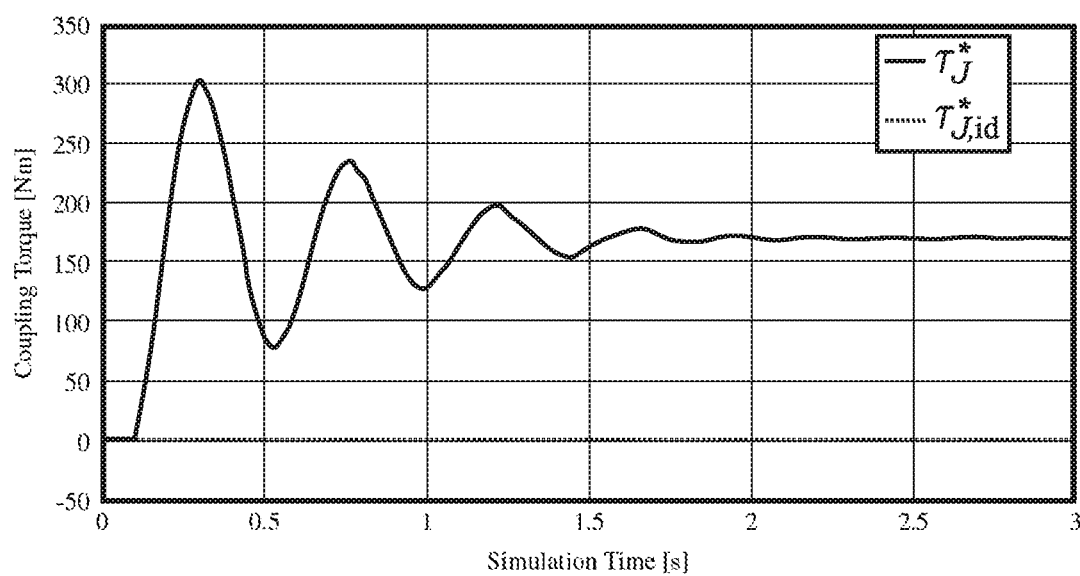
Fig. 3.35

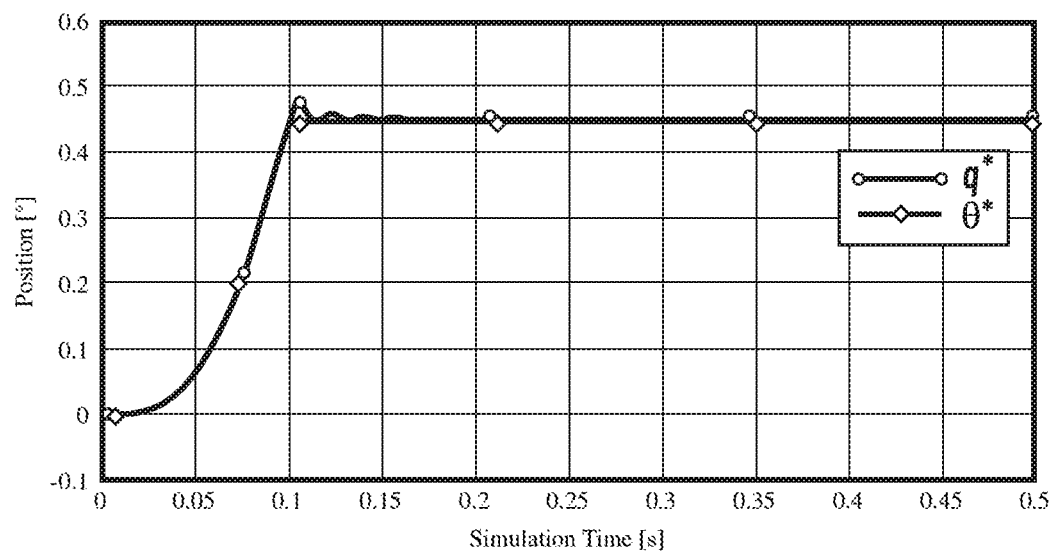
Fig. 3.36
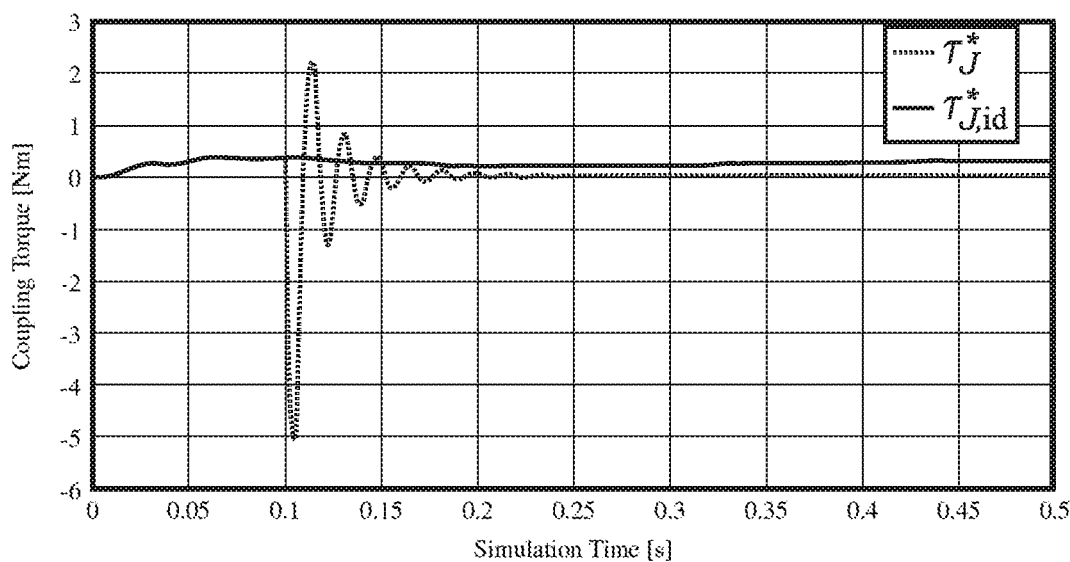
Fig. 3.37

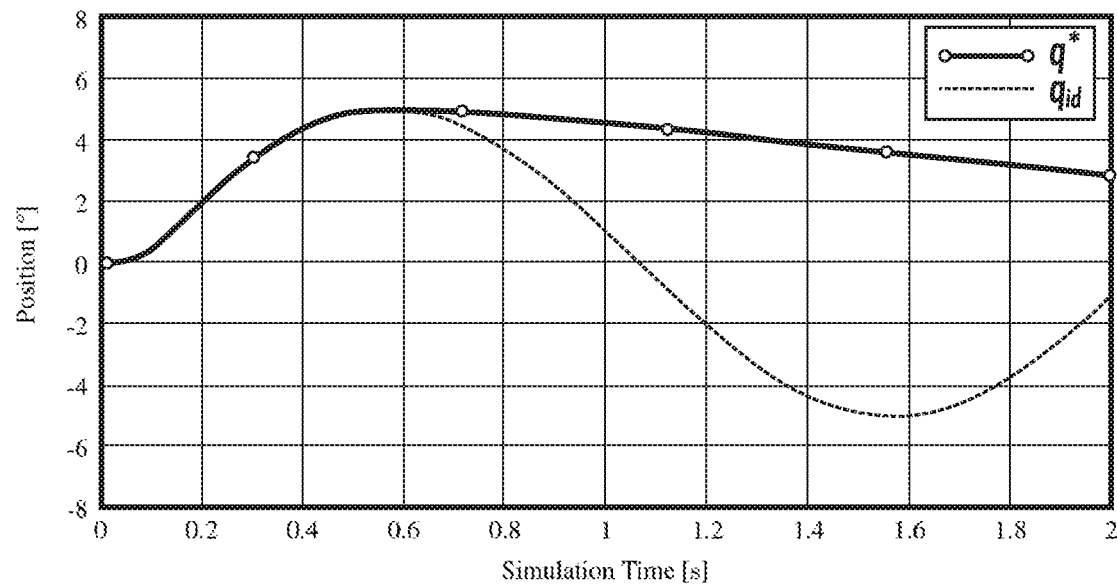
Fig. 3.38
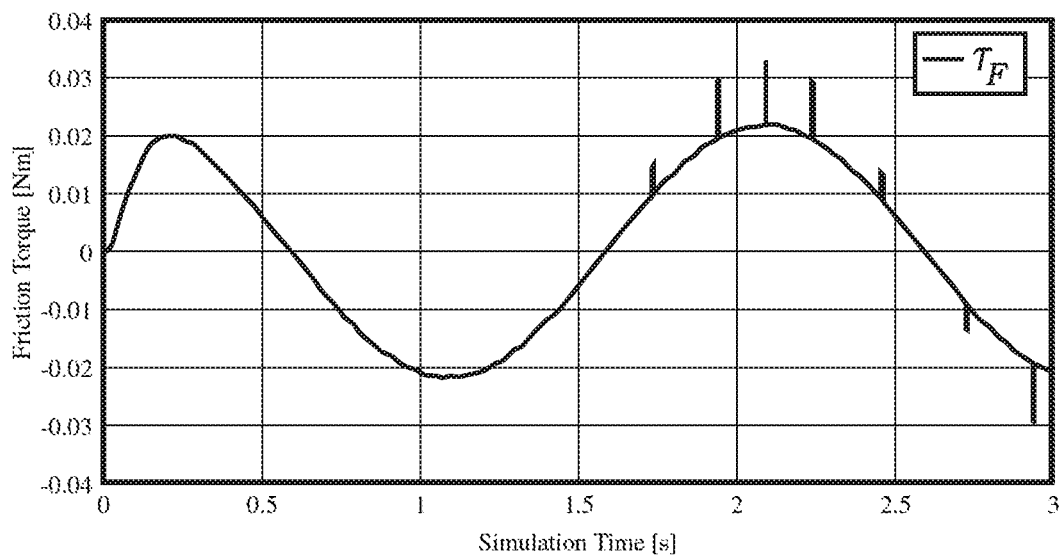
Fig. 3.39

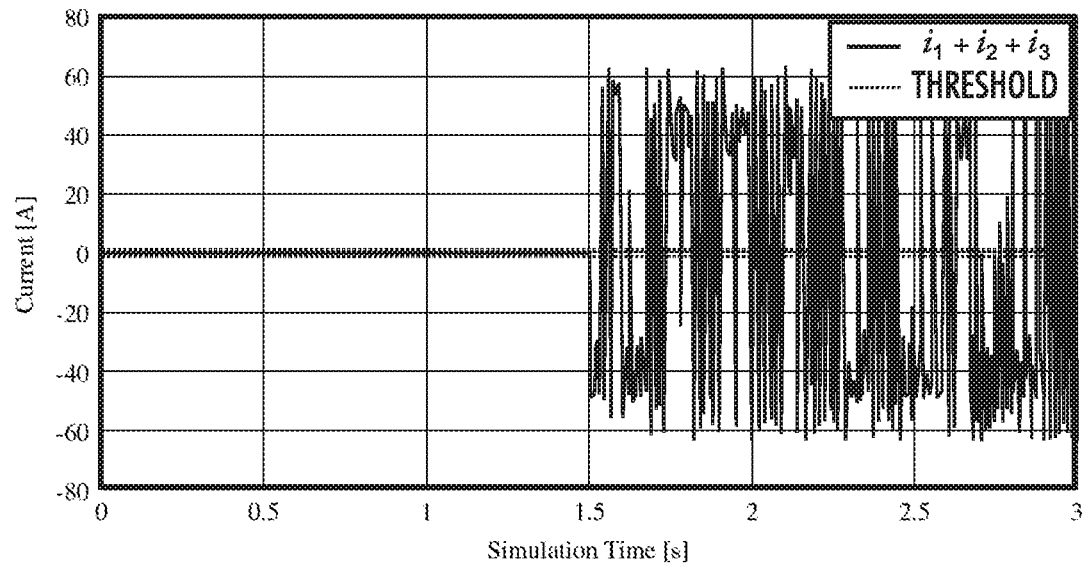
Fig. 4.1
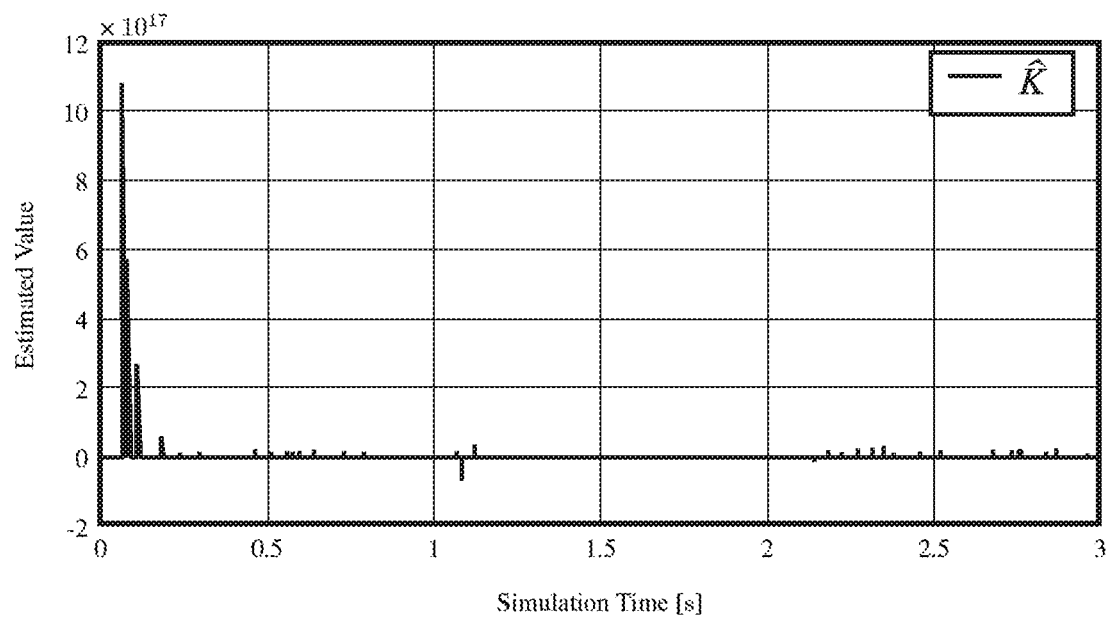
Fig. 4.2

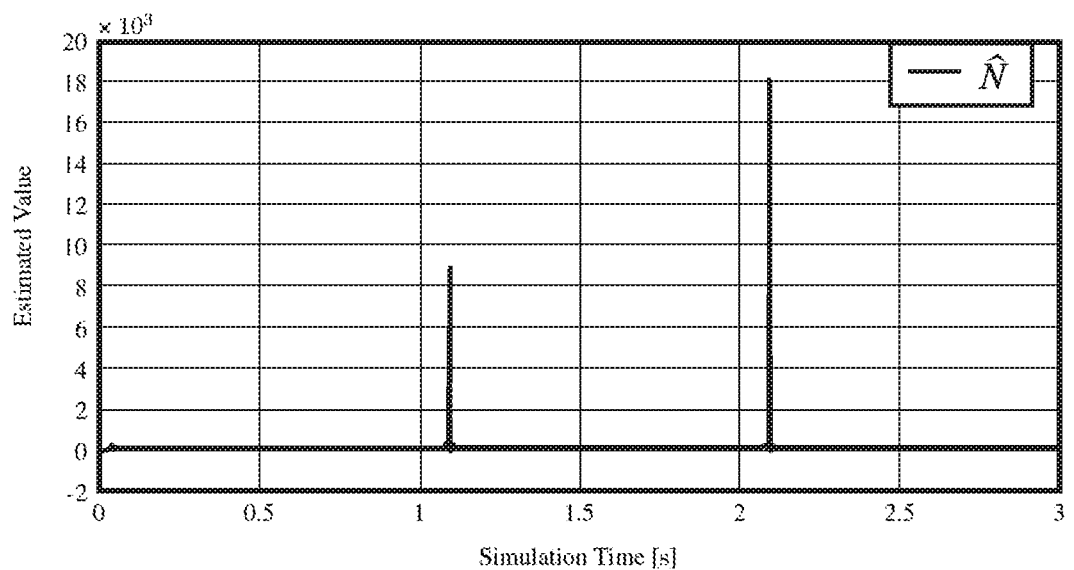
Fig. 4.3
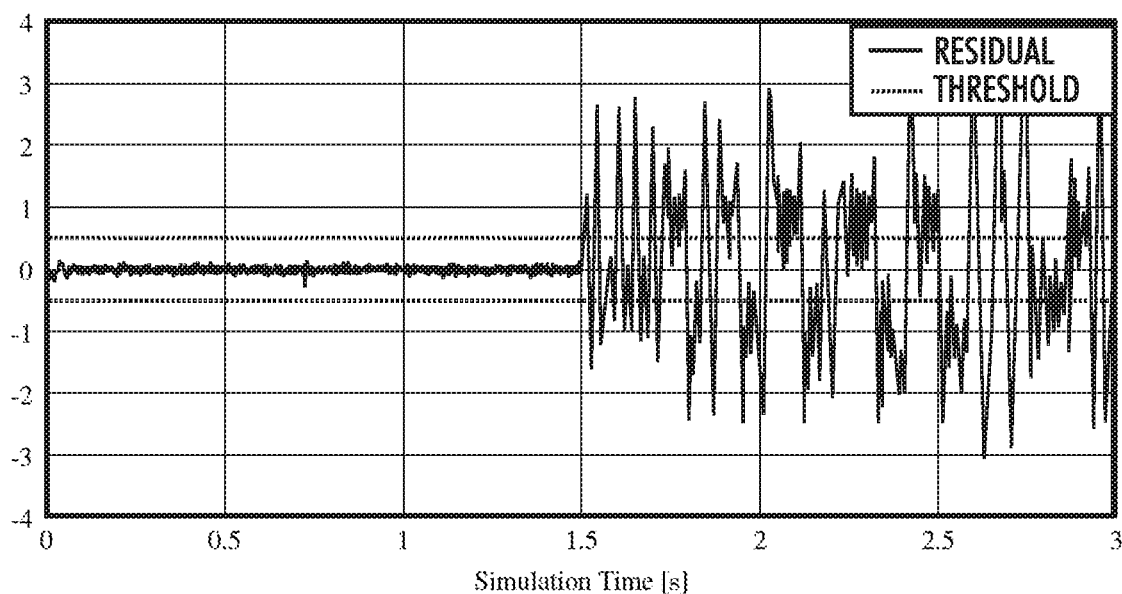
Fig. 4.4

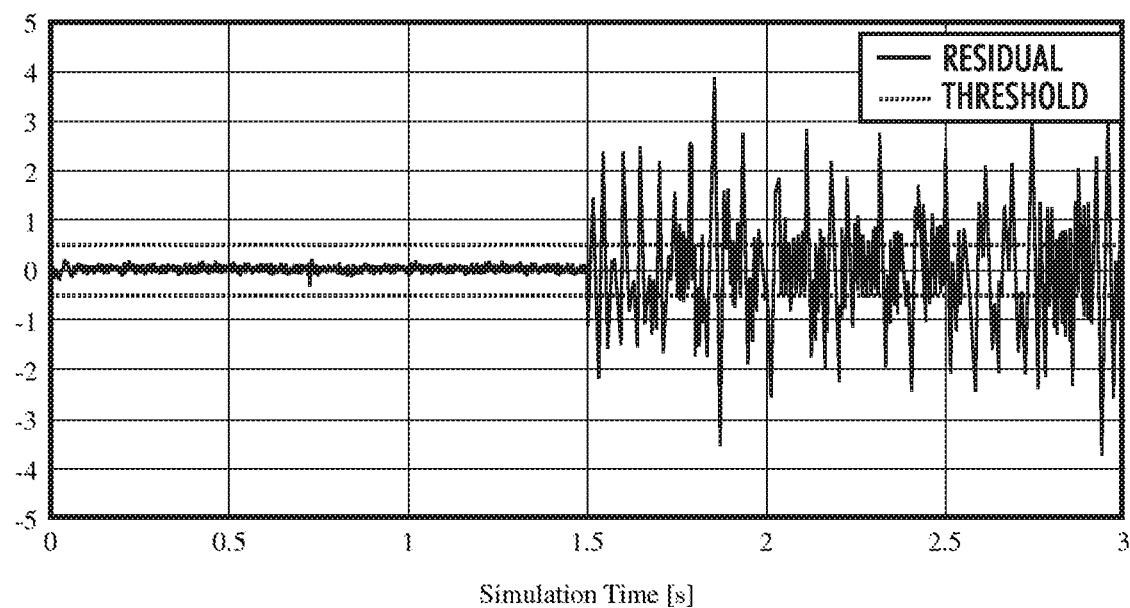
Fig. 4.5
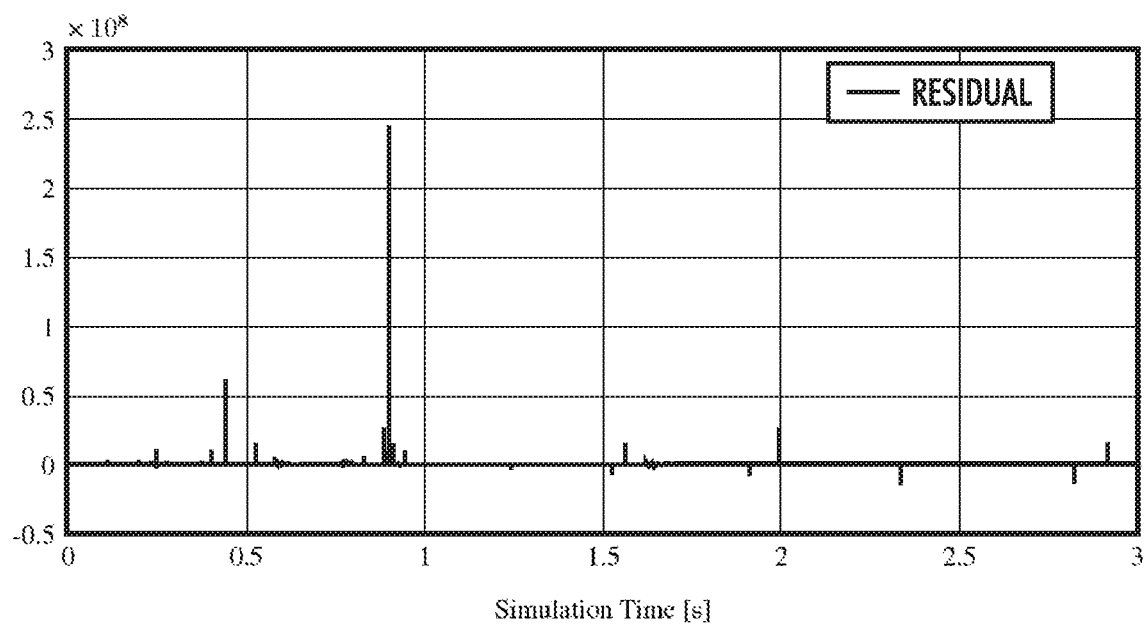
Fig. 4.6

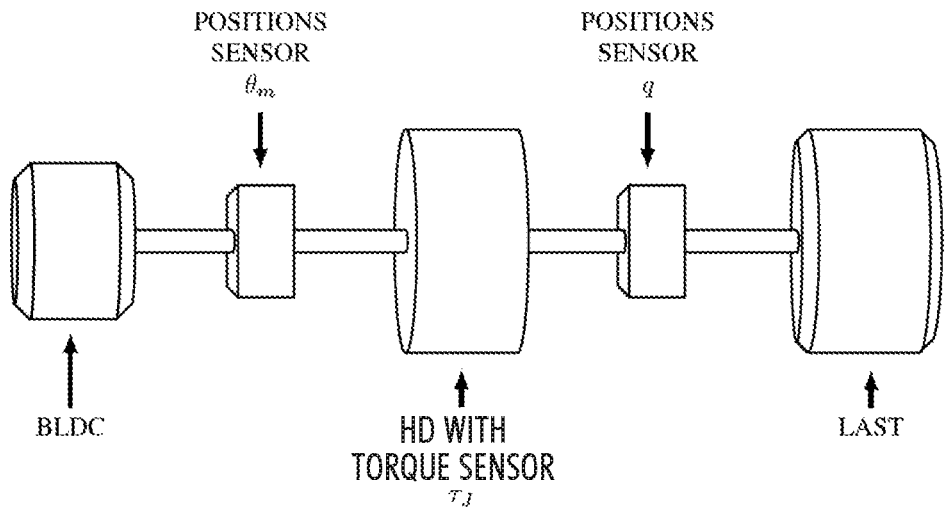
Fig. 5.1
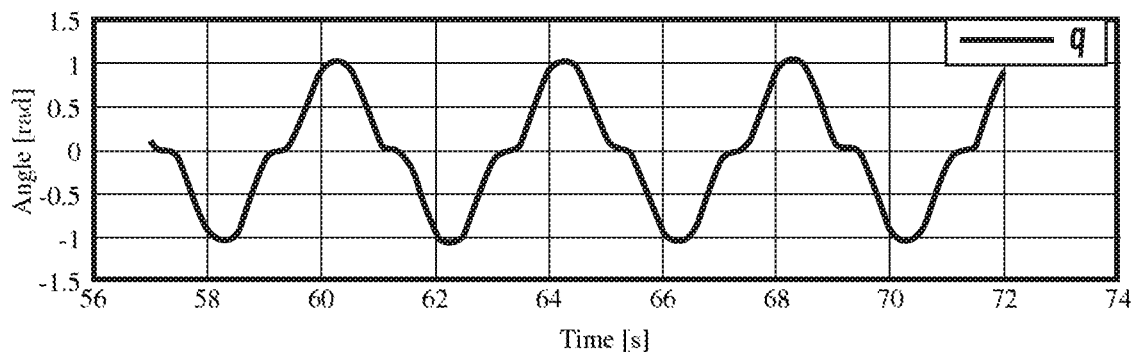
Fig. 5.2
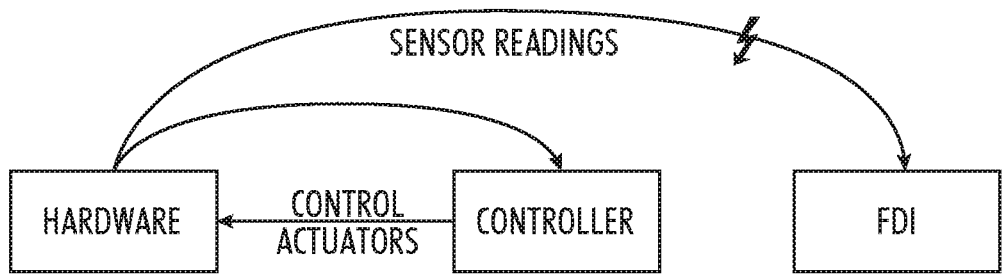
Fig. 5.3

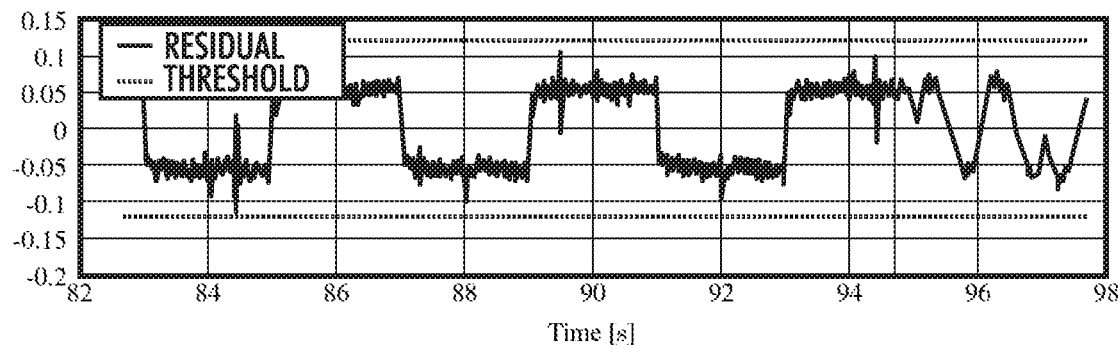
Fig. 5.4
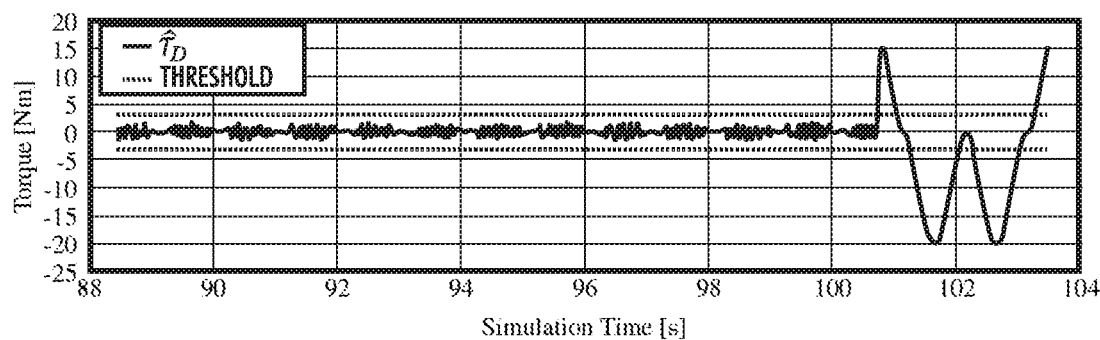
Fig. 5.5A
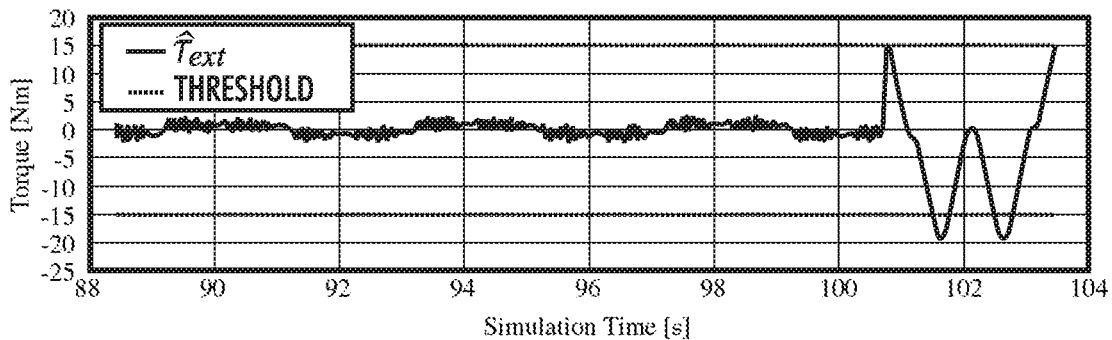
Fig. 5.5B

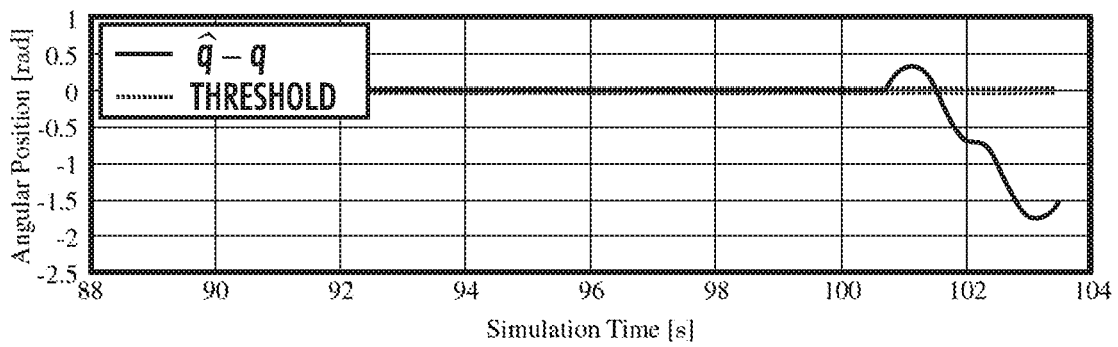
Fig. 5.5C
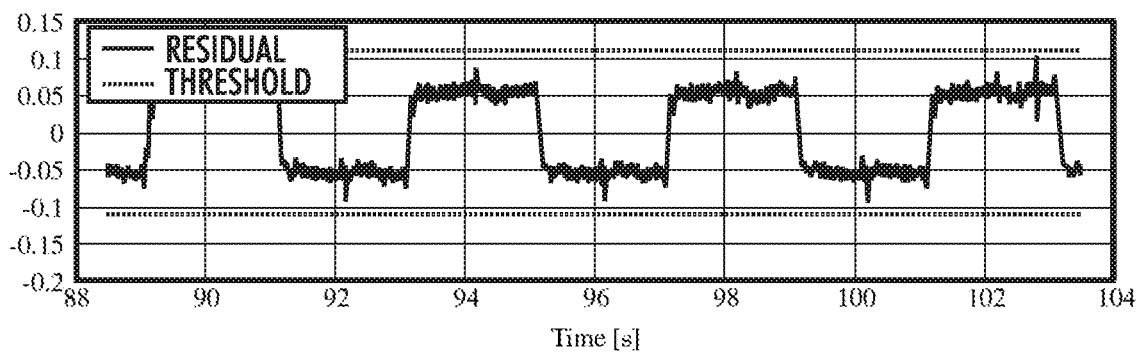
Fig. 5.6A
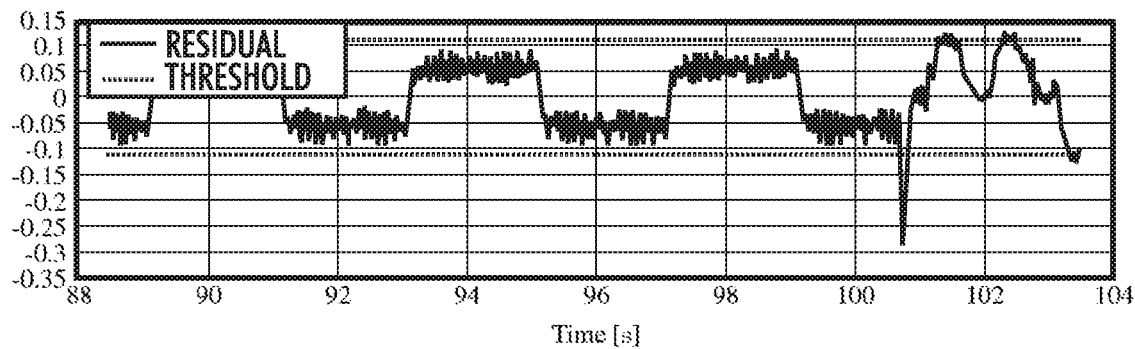
Fig. 5.6B
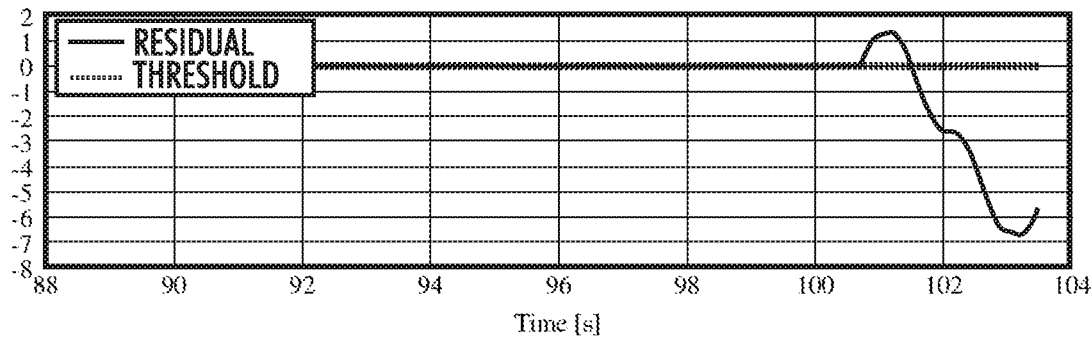
Fig. 5.6C

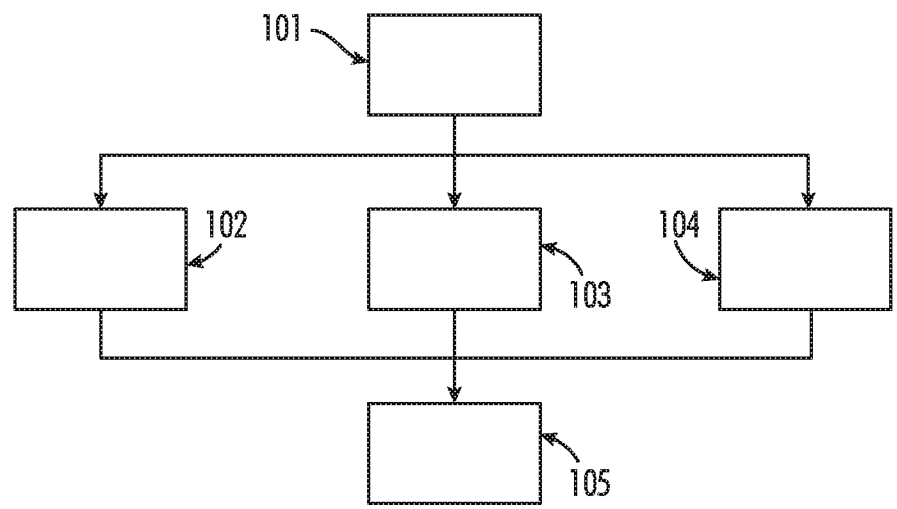
Fig. 6.1
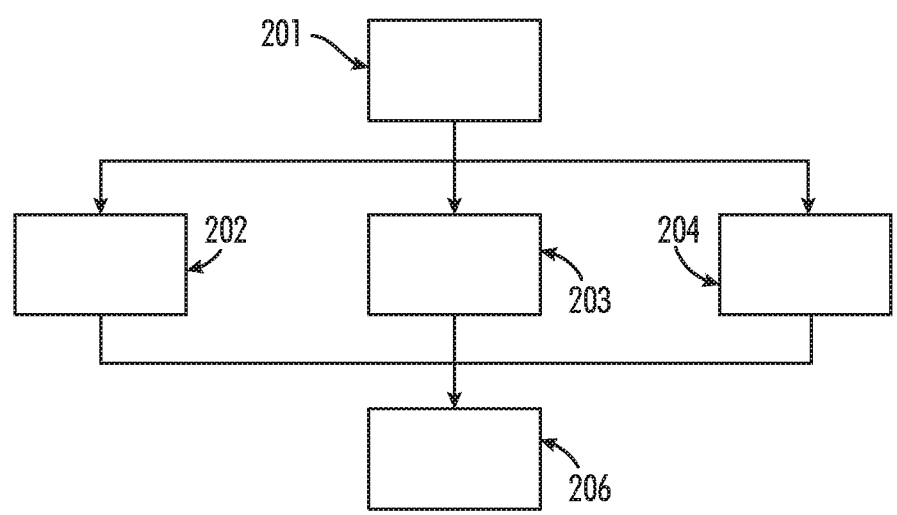
Fig. 6.2

METHOD AND DEVICE FOR OPEN-LOOP/CLOSED-LOOP CONTROL OF AN ACTUATOR-DRIVEN ROBOT JOINT

RELATED APPLICATIONS

This application is a U.S. national phase application, claiming priority under U.S.C. 371 to PCT application PCT/DE2016/000219, filed on May 21, 2016, claiming priority to German national application 10 2015 108 097.4, filed on May 21, 2015, the contents of the these applications incorporated by reference as if fully set forth herein in their entirety.

FIELD AND BACKGROUND OF INVENTION

The invention relates to a method and a device for the control of an actuator-driven robot joint.

Previous attempts to solve problems in the field include: WO2014/036138; US2014/201571; EP1600833; and, WO2007/057390.

BRIEF DESCRIPTION OF THE DRAWINGS

In the drawings (by FIG. number):
1.1 Diagram of fault detection, diagnosis and management
1.2 Diagram of state observers
1.3 Diagram of an output observers
1.4 Diagram of minimization of equation error
1.5 Diagram of minimization of the output error during parameter estimation
1.6 Diagram of a stepped arrangement of band-pass filters
2.1 Graphic representation of an abrupt fault
2.2 Graphic representation of a drifting fault
2.3 Graphic representation of an intermittent fault
2.4 Quantized signal with quantization noise
2.5 Single Peaks
2.6 Signal noise
2.7 Schematic of a three-phase inverter
2.8 Schematic of various inverter faults
3.1 Schematic of a flexible robot joint
3.2 General structure of a joint simulation
3.3 Possible switching states of the inverter
3.4 Physical model of the joint simulation
3.5 Measurement of a BEMF
3.6 Diagram of a BLDC in delta connection
3.7 Encoder signals and calculated position
3.8 Motor and coupling position compared with the reference position (no faults)
3.9 Motor and coupling velocity (no faults)
3.10 Joint torque (no faults)
3.11 Line currents (no faults)
3.12 Diagram of signal manipulation for general sensor faults
3.13 Signal flow chart of sensor reading manipulation
3.14 Measured position q and real position q* with fault "amplification"
3.15 Measured position q and real position q* with fault "offset"
3.16 Measured position q and real position q* with fault "noise"
3.17 Measured position q and real position q* with faults "hold" and "shutdown"
3.18 Measured position q and real position q* with the error "increment skip"
3.19 Diagram of measurement value sensor manipulation
3.20 Measured position q and real position q* with the error "loss of A"
3.21 Motor torque $T_m$ with the inverter fault "shutdown"
3.22 Phase currents with the inverter fault "shutdown"
3.23 Coupling position q* with the inverter fault "shutdown"
3.24 Motor torque $T_m$ with the inverter fault "single switch open"
3.25 Motor torque $T_m$ with the inverter fault "single switch closed"
3.26 Position error $\Delta q = q^* - q_{id}$ with the inverter fault "single switch closed"
3.27 Phase currents with the error "phase break"
3.28 Joint torque with the error "phase break"
3.29 Phase currents with the error "phase-to-phase short"
3.30 Motor torque $T_m$ with the fault "phase-to-phase short"
3.31 Coupling position q* with the fault "phase-to-phase short"
3.32 Positions $\theta^*$ and q* with gear train break
3.33 Joint torque during gear train break
3.34 Positions $\theta^*$ and q* with blocked joint
3.35 Torque during blocked joint
3.36 Positions $\theta^*$ and q* with blocked motor
3.37 Torque of the joint with blocked motor
3.38 Position q* with increased friction
3.39 Friction torque with torque ripples
4.1 Sum of the currents with the fault "shutdown" in $i_1$
4.2 Estimated stiffness $\hat{K}$ with no active faults
4.3 Estimated gear transmission ratio $\hat{N}$ with no active faults
4.4 Residual of a parity equation without isolation of sensor signals
4.5 Residual of a parity equation and active faults (isolation of $i_1$)
4.6 Residual of the parity equation with isolated $\theta_m$ with no active faults
5.1 Design of a flexible joint prototype
5.2 Output-side position q of the prototype in fault-free operation following a test trajectory
5.3 Diagram of the connection of the FDI to the test structure
5.4 Residual of the parity equation without isolation of sensor signals, with the fault "shutdown $i_q$"
5.5 Observer signals with the fault "sensor $q_m$ joint prototype unplugged"
5.6 Residuals of the parity equations with faults "sensor $q_m$ joint prototype unplugged"
6.1 Schematic process sequence of a proposed method
6.2 Schematic design of a proposed device Further advantages, features and details can be found in the following description, in which—possibly with reference to the drawing—at least one embodiment is described in detail. Components that are the same, similar or functionally equivalent are provided with the same reference sign.

DESCRIPTION OF EMBODIMENTS OF THE INVENTION

The problem addressed by the invention is that of indicating a method and a device for the open-loop/closed-loop control of an actuator-driven robot joint, wherein a cost-effective, robust fault detection function with single fault protection should be possible during operation of the robot joint.

The invention arises from the features of the independent claims. Advantageous developments and configurations are the subject matter of the dependent claims. Further features, possible applications and advantages of the invention are found in the description that follows as well as in the explanation of the embodiments of the invention that are shown in the illustrations. To the extent that section headings are used, they should not be construed as necessarily limiting, A first aspect of the invention relates to a method for the open-loop/closed-loop control of a robot joint that is driven by an electric motor, wherein said robot joint has a current sensor that comprises first sensor electronics for detecting a first operating current $i_{k,1}(t)$ of the electric motor, where k=1, 2, . . . , a first position sensor for detecting a drive position $\theta_m(t)$ of a drive train of the robot joint, a second position sensor for detecting an output position q(t) of an output train of the robot joint, and a first torque sensor for detecting a torque $\tau_J(t)$ in the drive train, wherein the electric motor is controlled by open-loop/closed-loop control on the basis of a pre-determined target control variable $\tau_m(t)$. The term "sensor electronics" is to be understood in the present case to mean sensor, measurement and communications electronics.

The proposed method includes the following steps, in one step, the measured values $\theta_m(t), i_{k,1}(t), \tau_J(t), q(t)$ are provided.

In a further step, the first fault detector checks for the presence of a fault, and the presence of a fault is detected when the measured values $\theta_m(t), i_{k,1}(t), \tau_J(t), q(t)$ and/or their time derivatives do not satisfy prescribed first threshold conditions. Advantageously, at least the first and the second time derivatives of the respective measured values are calculated. The first threshold conditions can involve the measured values $\theta_m(t), i_{k,1}(t), \tau_J(t), q(t)$, time derivatives thereof and/or the (filtered, interpolated, observed, etc.) values derived from them.

In a further step, the second fault detector checks for the presence of a fault, and a fault is detected on the basis of the measured values $\theta_m(t), i_{k,1}(t), \tau_J(t), q(t)$ of a process model-based method, wherein the process model is a prescribed mathematical dynamic model of the robot joint, and wherein a fault is detected when parameters of the model, residuals between variables reconstructed by the process model and the measured variables and/or parameters calculated within the model fail to satisfy prescribed second threshold conditions. Depending on the process model-based method, it is possible to use e.g. time derivatives of the measured values $\theta_m(t), i_{k,1}(t), \tau_J, q(t)$ and/or variables derived from the measured values $\theta_m(t), i_{k,1}(t), \tau_J(t), q(t)$ and/or their time derivatives. To determine whether a fault exists, one or more of the measured values $\theta_m(t), i_{k,1}(t), \theta_J(t), q(t)$ may also remain unused, depending on the process model.

In a further step, either the measured values $\theta_J(t)$ are provided to a third fault detector, which detects the presence of a fault on the basis of a signal-based method, wherein a fault is detected when signal variables such as amplitudes and/or characteristic frequencies of the measured values $\tau_J(t)$ fail to satisfy prescribed third threshold values, or a torque sensor or else redundantly designed sensor electronics in the first torque sensor detect a torque $\tau_{J,2}(t)$ in the output train, and a fourth fault detector detects a fault when a comparison of $\tau_{J,1}(t)$ and $\tau_{J,2}(t)$ does not satisfy fourth threshold conditions, insofar as the robot joint has a second torque sensor or a first torque sensor with redundantly designed sensor electronics, if is advantageous when only the evaluation of the torques $\tau_{J,1}(t)$ and $\tau_{J,2}(t)$ takes place in this step.

In a further step, whenever a fault is detected by one of the fault detectors provided on the robot joint, a warning signal is generated and/or the electric motor is actuated with control variables $\tau_m^F(t)$ that control the robot joint in a predetermined fault condition FZ, and/or a mechanical mechanism is activated to brake a movement of the robot joint, in the latter case, the braking can be active or be carried out by safety brakes.

Advantageously, the warning signal is emitted visually and/or acoustically.

An advantageous development of the proposed method is distinguished in that the first current sensor has second sensor electronics, which are redundant to the first sensor electronics, to determine a second operating current $i_{k,2}(t)$ of the electric motor, where k=1, 2, . . . , wherein a fault is detected by a fifth fault detector when a comparison of $i_{k,1}(t)$ and $i_{k,2}(t)$ does not satisfy fifth threshold conditions.

Advantageously, some or all of the fault detectors linked to the robot joint sensors are arranged and configured such that one of each type of detected fault (in particular types of faults that can be found in the description that follows) is identified.

Advantageously, the control variables $\tau_m^F(t)$ and/or the fault condition FZ depend upon the type of detected fault F. For example, different fault conditions FZ can be defined for different types of faults, or the control variables $\tau_m^F(t)$ can be defined differently for different types of faults F, in other words, a reaction can be defined that depends on the type of detected fault.

Advantageously, the second fault detector uses a parameter estimate on the basis of the model and/or a state variable observer and/or a Kalman filter and/or an "extended" Kalman filter and/or an "unscented" Kalman filter and/or a fault detection function on the basis of parity equations (in particular as they are indicated in the description that follows) and/or a disturbance variable observer and/or a reduced state variable observer to detect faults, although disturbance variable observers are basically nothing more than state observers. It is especially preferred that the second fault detector employs a combination of parity equations and one or more state observers to detect faults, as can be seen in the description that follows.

Advantageously, the third fault detector uses a fast Fourier transform and/or a power density spectrum and/or a modal analysis and/or correction analysis and/or a neuronal network and/or a statistical estimator for fault detection.

The invention further relates to a computer system with a data processing device, wherein said data processing device is designed such that a method, as described above, is carried out on the data processing device.

Moreover, the invention relates to a digital storage medium with electronically readable control signals, wherein the control signals can interact with a programmable computer system in such a way that a method is carried out, as described above.

The invention additionally relates to a computer program product with program code, which is saved on a machine-readable carrier, for carrying out a method, as described above, when the program code is run on a data processing device.

The invention also relates to a computer program with program codes for carrying out the method, as described above, when the program is running on a data processing device.

The invention further relates to a device for the open-loop/closed-loop control of a robot joint that is driven by an electric motor, wherein said robot joint has a current sensor with first sensor electronics for identifying a first operating current $i_{k,1}(t)$ of the electric motor, where k=1, 2, a first position sensor for detecting a drive position $\theta_m(t)$ of a drive train of the robot joint, a second position sensor for detecting an output position q(t) of an output train of the robot joint, and a first torque sensor for detecting a torque $\tau_{J,1}(t)$ in the output train, wherein the electric motor is under the open-loop/closed-loop control of an open- and closed-loop control unit on the basis of a pre-determined target control variable $\tau_m(t)$. The proposed device includes an interface for providing the measured values $\theta_m(t), i_{k,1}(t), \tau_J(t), q(t)$; a first fault detector for testing for the presence of a fault, wherein the first fault detector is designed such that the presence of a fault is detected when the measured values $\theta_m(t), i_{k,1}(t), \tau_J(t)$, q(t) and/or time derivatives thereof fail to satisfy prescribed first threshold conditions; in a further step, the second fault detector checks for the presence of a fault, and a fault is detected on the basis of the measured values $\theta_m(t), i_{k,1}(t), \tau_J(t), q(t)$ of a process model-based method, wherein the process model is a prescribed mathematical dynamic model of the robot joint, and wherein a fault is detected when parameters of the model, residuals between variables reconstructed by the process model and the measured variables $\theta_m(t), i_{k,1}(t), \tau_J(t), q(t)$ and/or parameters calculated within the model fail to satisfy prescribed second threshold conditions.

Furthermore, the device comprises either a third fault detector for testing for the presence of a fault, wherein the third fault detector is designed such that the presence of a fault is detected on the basis of the measured values $\tau_J(t)$ and a signal-based method, wherein a fault is detected when amplitudes and/or characteristic frequencies of the measured values $\tau_J(t)$ fail to satisfy prescribed third threshold conditions, or a second torque sensor for detecting a torque $\tau_{J,2}(t)$ in the output train and a fourth fault detector for testing for the presence of a fault, wherein the fourth fault detector is designed such that the presence of a fault is detected on the basis of the measured values $\tau_{J,3}(t)$ and $\tau_{J,2}(t)$, wherein a fault is detected when a comparison of $\tau_{J,1}(t)$ and $\tau_{J,2}(t)$ does not satisfy fourth threshold conditions. The open- and closed-loop control unit of the device is configured such that, whenever a fault is detected by one of the available fault defectors, a warning signal is generated and/or the electric motor is actuated with control variables $\tau_m^F(t)$ that control the robot joint in a predetermined fault condition FZ, and/or a mechanical mechanism is activated to brake a movement of the robot joint.

Advantages and advantageous developments of the proposed device arise from the analogous and logical transfer of the above statements made with regard to the proposed method.

The invention further relates to a robot manipulator with a device as described above. Finally, the invention relates to a robot with a device as described above.

The proposed device permits single fault protection during the detection of faults while the robot joint is in operation, and permits reactions to be triggered whenever a fault is detected, such as on the mechanical level (e.g. "activate mechanical brakes" or "initiate a controlled stop") and on the software level, in particular the multimodal communication of a fault state to a user. The proposed device is advantageously employed in the robot joints of robots, especially in humanoid systems, manipulators, flying systems or potentially heterogeneous multi-robot systems that are linked to one another by means of a data cloud and a corresponding database. Each of these systems is equipped with a number >1 of different and/or independent sensors per driving unit (electric motor).

A preferred configuration of the robot joint comprises the following electromechanical drive units based on a torque sensor: a drive position sensor for detecting a drive position $\theta_m$, an output position sensor for detecting an output position q, a plurality of current sensors that are typically selected in accordance with the number of phases the motor has (choice of motor phases: e.g. 3) to detect the appropriate phase current $i_k$, and a torque sensor $\tau_J$. The invention allows for separate fault detection and isolation in each drive unit (electric motor) and thus naturally throughout the entire robot, in particular, the inventive concept permits the implementation of single fault protection without all sensors explicitly being dual-channel.

The objective of the fault detection is to recognize any inaccuracy in the robot-relevant mechanical and/or electrical and/or thermal variables and measured variables, such as motor position, joint torque, motor torque, motor current, output position, output acceleration, particularly resulting from changes to one and/or more observation variables. This inaccuracy can be caused by exactly one fault. The proposed device and the proposed method make it possible in particular to distinguish between fault-free nominal changes in the variables and corresponding fault-inducted changes with a high level of guaranteed certainty and robustness.

Fault-free changes include in particular noise or quantization and model inaccuracies in the data as well as intentional modifications to the variables, e.g. based on the desired rule behavior and especially the tracking performance of a position in the "position control" mode. The principle of fault recognition/fault detection is based on a comparison with at least one fault-free variable value. Said value could be provided by a second sensor (the same fundamental measured value, but not necessarily the same measuring principle), but this corresponds to the classic method in the prior art.

The following are suitable for the comparison with a fault-free variable value:
a) the use of prior knowledge about the behavior or the expected value range of a variable;
b) methods that include an estimate of the fault-free variable value and can thus be drawn upon for the comparison.

a) Prior Knowledge

The methods that utilize prior knowledge about the behavior or expected value range include in particular limitations on the expected fault-free value range of the variables (especially constant limitations, as described later in Section 4, though dynamic limitations are equally possible), b) Estimation Since single fault protection should be ensured, the comparison can be performed in particular with one or more estimated values that have been calculated using the other variables. As long as there is even one fault, the system must be able to recognize it by the fact that a difference exists between the measured and estimated variables and is being incorporated into the calculations for detection, it should be noted here that a direct differentiation does not necessarily have to be formed between the measured and the estimated value, and other practical mathematical/physical correlations can be utilized instead. According to a different preferred development, calculations can be used which indicate that there is a difference between the measured and the estimated values that does not trace back to a fault-free change in the variables (especially noise or intentional changes to the variables); in other words, a non-nominal cause.

Among the proposed estimation methods for fault-free variable values are especially observer and parity equations, which are described later in Section 4. Further alternative preferred estimation methods are based on covariance or correlation methods. Information theory-related backgrounds, such as the entropy or the measure of information gain, can be utilized as estimation methods according to one advantageous development. Each of these variables is basically a fault magnitude to be interpreted in the relevant context.

The fault defection as described requires either prior knowledge about the described sensors or calculations for the estimate of the described sensors.

Prior knowledge can be obtained in particular from data sheets/manufacturer's specifications and/or identification experiments under conditions that are as fault-free as possible. More complex methods, such as algorithms designed specifically for these purposes with or without the activation of robots, can likewise preferably be applied. The possibility also exists of calculating variables in parallel using model knowledge of the robot (see the embodiment below), in particular, two different calculating methods are employed for this purpose, but they reflect the at least approximately equivalent robot model.

Estimating one of the aforementioned sensor values using one or more other sensor values occurs in particular through the application of model knowledge about the particular robot joint. Important here is that the model equations are established/provided and transformed in such a way that the estimate of a specific sensor value is possible in each case without the measured values of the associated sensor thereby being incorporated directly or indirectly into the equation(s) of the estimate. This means in particular that other variables (dependent and independent on sensors as well as other sensor values) in the equation for the specific sensor value must be independent of the measured value of the specific variable to be estimated. According to an advantageous developments, it might also make sense to use and thus also permit multiple marginal independencies at the same time in order to ensure the single fault protection. The detection of faults can apparently be assigned to particular logical fault classes.

The underlying model of the respective robot joint for an observation does not have to be consistent for each observed variable, but should instead be adapted to the purpose at hand so that the necessary abstraction and efficiency/compactness of the representation is established in each case. This is especially relevant in the contact of the required computing time, in the Sections that follow, the joint friction model of the robot, as the preferred embodiment, will be sufficiently well described on the basis of different mathematical abstractions/models, The chosen model of fault detection determines the possibilities for fault isolation/fault classification and thereby allows the robot to make a corresponding amount of meaningful movement and/or software reactions.

Generally speaking, the more precisely and realistically the joint model is defined, the more precise the fault detection and isolation are, as well. However, an exact reproduction of the actual robot joint behavior can usually only be approximated. For this reason, a corresponding model is needed, which contains the most important robot joint properties regarding the objective of the fault defection, fault isolation and reaction. The following aspects in particular can be considered for this purpose:

1. combining significant inertial bodies into a rigid body (if possible);
2. combining significant elasticities in the system into resulting elasticities at sensible points (in particular assuming joint flexibility downstream of the gear train and not before, i.e. on the motor side);
3. Sensible assumptions about the kinematics of the robot, especially Denavit-Hartenberg conventions;
4. combining significant friction effects into a common torque vector rather than assigning each effect to its own inertial body or the like.

Based on a preferred embodiment, this shall be explained by means of the parity equations. Parity equations are generally better suited for systems afflicted by drift than constant thresholds typically from calculating the difference between two variables to be compared (primarily important in practice). Similar results can be found in the subsequent Sections for limit and parity equations, although only abrupt changes are represented. Basic methods that can be employed here include, for instance, the processes based in particular on "Generalized likelihood test for FDI in redundant sensor configurations" (Daly, Kevin C and Gai, Eliezer and Harrison, James V) and equations based in particular on "Springer Handbook of Robotics", chapter 13.1 "Robots with flexible joints", although they are adapted in such a way as to achieve the type of estimate described.

Preferred embodiments of the model equations (of the robot joint) underlying the fault detection according to the invention can be found, along with corresponding alternatives, in Section 4 in particular.

A central preferred embodiment for calculating variables in parallel shall now be presented for the calculation of the so-called joint torque r, for a multi-manipulator:

1. Left-side/output-side calculation:

$$M(q)*q''+c(q,q')+g(q)+\text{possibly} \tau\_ext \text{ or } \tau\_friction\_left+ \text{ or } \tau\_disturbance\_left$$

2. Drive-side calculation: B*theta"—tau_m (controller input)+possibly tau_friction_motor
3. Coupling the two equations with: tau_J=K*(theta-q)

The Signs are Defined as Follows:
 M(q): inertia or mass matrix of the manipulator as a function of the output position
 q": output acceleration
 c(q,q'): Coriolis vector of the manipulator
 g(q): gravitation vector of the manipulator
 tau_ext: external joint torque (e.g. due to a collision)
 tau_friction_link: output-side friction
 tau_disturbance_link: drive-side disturbance torque (e.g. gear ripple)
 B: motor inertia
 theta": motor acceleration
 tau_m: commanded motor torque (usually associated with the motor current via the motor constant)
 tau_friction_motor: motor-side frictional torque
 K: joint side matrix
 theta: motor position
 q: output position A particular assumption/restriction permits tau_J to be calculated redundantly/independently in two ways: Whenever particular variables, such as disturbance or frictional terms, or the genuine acceleration are not available, certain assessments can be made. This no longer allows an exact calculation of tau_J, but it is possible to calculate a range using one or more of the aforementioned possibilities in order to draw conclusions about the consistency of the actual measured joint torque tau_J. It is precisely this "quasi" dual-channel form that permits further (redundant) sensors to be omitted but to trust the actual measured value of the coupling torque as long as the measured torque does not exceed the aforementioned limits, which were established during the assessment.

In the best-case scenario, the fault can be isolated; otherwise fault classification is advantageously performed for further processing in the reaction of the robot. The fault isolation can then be established in particular by inverting the fault causality. The equations described in the fault recognition/fault detection are advantageously used to isolate the fault, or in other words to recognize its origin. The means in particular that the calculations identify deviations between the expected (by fault measurement or estimation) and the measured values. This does not necessarily involve a direct calculation of the difference, but rather the described calculations/mathematical-physical measurements that signal corresponding deviations and that are indicated by exceeding corresponding thresholds.

As has been described, the fault detection model that is selected determines the possibilities for fault isolation/fault classification and thereby, in turn, the particular logical reactions by the robot (activating the electric motor with a target control variable), in particular a controlled stop or switching to a pure independent estimated variable in the sensor feedback for the controller. Additionally, not only can the aforementioned sensors be faulty in the robot joint, but other sources of interference can also arise. The faults mentioned in Section 1, in particular, are relevant to the objective of fault defection, fault isolation and reaction. Of course, it remains certain that the more independent the fault measurement or estimation for a specific sensor value of all other disturbance variables (including fault sources apart from the other sensors), the easier the isolation is. In reality, however, the fault classes that are predominantly formed are those which may include only one of the described sensor failures but can also contain other fault sources. The described isolation method according to the invention can thus be applied equivalently to fault classes as they are described in Section 4 in particular.

The reaction by the robot to a fault message (by the appropriate activation of the electric motor of the joint) is based as far as possible on the isolation of a single sensor fault, otherwise on the report of the occurrence of a fault class.

In addition, further fault classes can be created which trigger the same reaction or reactions, in so doing, the fault or the message of a fault-related change to the robot joint-relevant variable can also be assigned to multiple disjoint fault classes, each of which triggers a reaction that is linked to the fault or selected by means of a corresponding planning component. In particular, two fault classes can be formed that each display faults in the drive (class 1) or in the output (class 2). The information indicating to which of the two classes a fault belongs is reported to the user or to the planning component. The user or planning component can then narrow down the fault based on this information alone. Possible Approaches to Isolating it can Typically be Organized into the Following Classes:

logical: Mutual exclusion or decision trees with threshold values based on observed or measured values, as well as prior know/ledge probability-based approaches (e.g. hidden Markov models, Gauss processes or the like).

heuristic approaches such as fuzzy logic.

Preferred Embodiments for this can be Found in Section 5:

For example, it can be seen in the table for the fault "shutdown theta_m" that no fault has been discovered as long as the calculation with the estimated variable theta_m is used (column "isolating theta_m"). The other three calculations that utilize the faulty value of theta_m "reject" the fault, and thus signal it This indicates that the fault here is in theta_m.

The described fault detection method according to the invention permits both the described fault isolation and fault classification and a reaction by the robot, which, if required, can also go beyond simple braking in the event of a fault. Since the fault and fault class are now known, a safety-related reaction in particular can also occur. This means that in the event of a high-risk or higher-risk fault, a reaction is selected and performed that minimizes said risk. This applies especially to the possible risk of personal injuries suffered during human-robot interactions, but also for damages to materials, in particular when sensor problems occur for which it is otherwise not possible to compensate (particularly by the described values for comparison like estimated values or alternative calculations). According to one preferred development, in high-risk or higher-risk cases, a mechanical reaction such as direct braking is triggered, which is a purely mechanical and/or controlled reaction or a combination of both, in other cases (depending on the sensor failure and risk), a slow deceleration or a controlled stop can be triggered.

If a replacement can be used (especially the temporary use of an estimated signal aided by other signals, use of a different controller), then, according to a preferred development, the operation continues (temporarily).

Additionally, it is possible to involve the user and to signal the fault to him or her (e.g. communication, emergency shut-off, red light, signal to the person). In this way, according to a preferred development, a fault can be signaled in general, but more precise information (exact fault, fault class, . . . ) can also be communicated. According to a preferred embodiment, this possibility can additionally be taken into consideration, or it can be considered alone. In both cases, the user can decide (at least in part) how to proceed. The more information available to the user and the less risky the fault, the more the user can make the decision independently.

In all cases, it is advantageous to have access to more exact information about the type of fault or the fault itself, since the number of possible reactions can then be logically reduced. Safety can be increased in the process, since possible risks can then be reduced in dependence upon the fault or fault class. This also applies in cases of user interactions because here, too, the range of possible reactions can be limited especially for less experiences robot operators thanks to the available information about the fault or fault classes. For instance, measures that increase risk might initially not be presented to the user at all.

In all cases described here, it should be noted that the reactions can be adapted to faults or fault classes as needed, depending on requirements (e.g. robot, application, attention to possible human-robot interactions).

In Sections 1-5, the concept of the invention will be presented again in greater detail and explained on the basis of concrete examples.

Section 1—Terms and Definitions

The Technical Committee on Fault Detection, Supervision and Safety for Technical Processes (SAFEPROCESS) of the International Federation of Automatic Control (IFAC) has compiled a list of commonly used terms on the subject of "Faults/Fault Detection, etc." and has established various definitions:

States and Signals

The various states and signals are defined as follows,

Fault

An unpermitted deviation of at least one characteristic property or parameter of the system from the acceptable/usual/standard condition.

Failure

A permanent interruption of the system's ability to perform a required function under specified operating conditions.

Malfunction

An intermittent irregularity in the fulfillment of a system's desired function.

Error

A deviation between a measured or computed value (of an output variable) and the true, specified or theoretically correct value.

Disturbance

An unknown (and uncontrolled) input acting on a system.

Perturbation

An input acting on a system, which results in a temporary departure from the current state.

Residual

A fault indicator, based on a deviation between measurements and model equation-based computations, Symptom A change of an observable quantity from normal behavior.

Functions

The monitoring and management of the system behavior can be achieved with the aid of various functions.

Fault Detection

Determination of the faults present in a system and the time of detection.

Fault Isolation

Determination of the kind, location and time of detection of a fault. Follows fault detection.

Fault Identification

Determination of the size and time-variant behavior of a fault. Follows fault isolation.

Fault Diagnosis

Determination of the kind, size, location and time of detection of a fault. Follows fault detection. Includes fault isolation and identification.

Monitoring

A continuous real-time task of determining the conditions of a physical system, by recording information, recognizing and indicating anomalies in the behavior.

Supervision

Monitoring a physical system and taking appropriate actions to maintain the operation in the case of faults.

Protection

Means by which a potentially dangerous behavior of the system is suppressed if possible, or means by which the consequences of a dangerous behavior are avoided.

Models

Depending on the relationships among the system variables, the underlying system model can be described in various ways.

Quantitative Model

The use of static and dynamic relationships among system variables and parameters in order to describe a system's behavior in quantitative mathematical terms.

Qualitative Model

The use of static and dynamic relationships among system variables and parameters in order to describe a system's behavior in qualitative mathematical terms. For example, using causalities or if-then rules.

Diagnostic Model

A set of static or dynamic relations which link specific input variables—the symptoms—to specific output variables—the faults.

Analytic Redundancy

The use of two or more (but not necessarily identical) ways to determine a variable, wherein one of the ways uses a mathematical process model in an analytic form.

System Properties

It is possible to make statements not only about individual states and signals of a system but also about the entire system.

Reliability

The ability of a system to function under stated conditions, within a given scope, during a given period of time. Measure: mean time between failures (MTBF), with the rate of failure A (e.g. failures per year), so that the following is true:

$$MTBF = \frac{1}{\lambda}$$

Safety

The ability of a system not to cause danger to persons, equipment or the environment.

Availability

The probability that a system or equipment will operate satisfactorily and effectively at any point of time. A measure is obtained by means of $$A = \frac{MTTBF}{MTBF + MTTR}$$

With the mean time to repair (MTTR=1/µ) and the repair rate µ.

Dependability

A form of availability that has the property of always being available when required. It is the degree to which a system is operable and capable of performing its required function at any randomly chosen time during its specified operating time, provided that the item is available at the start of the period. The dependability is given by $$D = \frac{T_V}{T_V + T_R}$$

$T_v$ is the available time and $T_R$ the required time.

Strategies for Fault Detection and Classification

FIG. 1.1 shows a diagram depicting fault detection, fault diagnosis and fault management. Normally, the following three-point plan is used for fault detection and the correct reaction:
1. Fault detection
2. Fault Diagnosis
3. Reaction to Faults (Fault Management)

This three-stage plan can be implemented by various approaches. The following Section 2 demonstrates the most common methods.

Model-Based Fault Detection

Model-based methods require knowledge about the underlying model in order to detect irregularities. For example, it can involve a model with the physical structure of the robot or a model of a signal possessing particular properties, such as a particular standard deviation.

Process Model-Based Methods

Process model-based methods usually require a dynamic process model in the form of a mathematical structure with particular parameters. It is implemented with the aid of measurements of the input variables UJt) and the output variables Y_(t) of the system, Parity Equations Based on knowledge about the structure of a linear mathematical model with an order of n, the state equations can be set up as follows:

$$\dot{x}(t)=Ax(t)+Bu(t), \quad (1.1)$$

$$y(t)=Cx(t) \quad (1.2)$$

Applying (1.1) in (1.2) and ρ-th differentiation (ρ≤n) results in equations (1.3) and (1.4). The optimal ρ can be determined by an observability test.

$$\begin{bmatrix} y(t) \\ \dot{y}(t) \\ \ddot{y}(t) \\ \vdots \end{bmatrix} = \begin{bmatrix} C \\ CA \\ CA^2 \\ \vdots \end{bmatrix} x(t) + \begin{bmatrix} 0 & 0 & 0 & \ldots \\ CB & 0 & 0 & \ldots \\ CAB & CB & 0 & \ldots \\ \vdots & \vdots & \vdots & \ddots \end{bmatrix} \begin{bmatrix} u(t) \\ \dot{u}(t) \\ \ddot{u}(t) \\ \vdots \end{bmatrix} \quad (1.3)$$

$$Y(t) = Tx(t) + QU(t) \quad (1.4)$$

In the non-linear case, equation (1.4) is multiplied with matrix W, wherein W must satisfy the condition $$WT=Q. \quad (1.5)$$

With this step, equation (1.4) becomes independent of the state vector $x(t)$, which can be unknown. The parity relationship continues with $$r(t)=WY(t)-WQU(t). \quad (1.6)$$

In cases where there are no faults, the parameters do not change. A fault can therefore be detected by observing the so-called residual r(t):

r(t)=0→fault-free
r(t)≠0→a fault has occurred.

As a result of lesser effects, such as noise or other uncertainties, the equation in the fault-free instance can also be expanded to r(t)≈0.

State and Output Observers

As the name suggests, a classic state observer can detect faults by recognizing changes in the state variables $\Delta x_i$. The process model is defined as:

$$\dot{x}(t)=Ax(t)+Fv(t)+Lf_L(t) \quad (1.7)$$

$$y(t)=Cx(t)+Nn(t)+Mf_M(t), \quad (1.8)$$

where v(t) and n(t) represent interference signals and $f_L(t)$ and $f_M(t)$ are additive fault signals.

Furthermore, the resulting equations for state observers (cf. FIG. 1.2) yield $$\dot{\hat{x}}(t)=A\hat{x}(t)-Bu(t)+He(t), \quad (1.9)$$

$$e(t)=y(t)-C\hat{x}(t), \quad (1.10)$$

Similarly to the parity equations, residuals are required to detect the occurrence of a fault. For state observers, they can be described with $\Delta x(t)=x(t)-x0(t)$, $e(t)$ or $r(t)=We(t)$.

In the case of multi-output processes, special arrangements of the observer are advisable. For instance, an observer can be operated by a sensor signal. The other signals are reconstructed in the process and are compared with the measured signals. This permits individual sensor faults to be recognized. Moreover, it is also possible to operate a bank of observers, driven by all outputs. Each observer is thus designed for a concrete fault signal and is driven by all output signals. The bank of observers can likewise be excited by individual output signals, wherein each observer uses only one sensor signal, and estimated output signals, in turn, are compared with the measured signals. A further possibility is that of driving the bench of observers in such a way that all but one of the output signals are used. Multiple faults can likewise be detected in this way. A different approach is the use of fault-sensitive filters. In this case, the feedback H is chosen such that particular fault signals $f_L(f)$ change in a particular direction and fault signals $f_M(f)$ in a particular plane.

If the input is unknown or the reconstruction of the state variables x(t) is not of interest, then output observers are especially well-suited. A linear transformation leads to new state variables $\xi(t)=T_1 x(t)$ and observer equations (cf. FIG. 1.3).

Required equations for the transformation are:

$$T_1 A - A_\xi T_1 = H_\xi C, \quad (1.13)$$

$$B_\xi = T_1 B, \quad (1.14)$$

$$T_1 V = 0, \quad (1.15)$$

$$C_\xi T1 - T_2 C = 0. \quad (1.16)$$

Resulting residuals r(t) are given by:

$$r(t)=C_\xi \xi(t)-T_2 M f_M(t). \quad (1.17)$$

The residuals appear to be independent of x(t) and u(t) and are dependent only upon $f_L(t)$ and $f_M(t)$.

Identification and Parameter Estimation

In the use case, the parameters are often only partly known or are completely unknown. However, if a simple model structure is available, then parameters can be estimated by measuring input and output signals. In this case, there are essentially two approaches; minimizing the equation error and minimizing the output error.

To minimize the equation error (cf. FIG. 1.4), it is defined as follows:

$$e(t)=y(t)-\psi^T(t)\Theta. \quad (1.18)$$

equivalent to:

$$e(s)=\hat{B}(s)u(s)-\hat{A}(s)y(s). \quad (1.19)$$

Following a scan for the discrete time $k=t/T_0=0, 1, 2 \ldots$, with scanning time $T_0$, the following results for the sum of the smallest error squares [17]

$$V = \sum_{k=1}^{N} e^2(k) = \underline{e}^T \underline{e} \quad (1.20)$$

with $$\frac{dV}{d\Theta} = 0 \quad (1.21)$$

Since this method is linear, the parameters can be determined directly. The estimation can be carried out either non-recursively $$\hat{\underline{\Theta}}(N)=|\underline{\Psi}^T\underline{\Psi}|^{-1}\Psi^T\underline{y} \quad (1.22)$$

or recursively $$\hat{\underline{\Theta}}(k+1)=\hat{\underline{\Theta}}(k)+\underline{\gamma}(k)e(k+1) \quad (1.23)$$

With the above, they can be approximated. For minimizing the output error (FIG. 1.5), the output error $$e'(t)=y(t)-y_M(\hat{\Theta},t) \quad (1.24)$$

is required with model output:

$$y_M(\hat{\Theta}, s) = \frac{\hat{B}(s)}{\hat{A}(s)} u(s) \quad (1.25)$$

Since e'(t) is non-linear, it is not possible to make a direct calculation of the parameter estimation $\hat{\Theta}$. Therefore, the loss function (1.20) is minimized by numerical optimization methods. However, this translates into higher computing times. FIG. 1.5 shows a diagram of the minimization of the output error during parameter estimation.

Signal Model-Based Methods

No knowledge of the underlying process model is needed for signal model-based methods. Only the system output y(t) is analyzed, in systems with periodic output, it is assumed that the output signals consist of a usable portion yu(t) and a noise portion n(t).

$$y(t)=yu(t)+n(t) \quad (1.26)$$

The useable signal should be analyzed, although it is assumed that the mean value of the noise is 0 and the two signals are uncorrelated. According to the theory of Fourier series, each periodic signal can be expressed by the superposition of harmonic components.

$$y_u(t) = \sum_{v=1}^{N} y_{0v} e^{-d_v t} \sin(\omega_v t + \varphi_v) \quad (1.27)$$

Every component is defined by the amplitude $y_{0v}$, the frequency $\omega_v$, the phase angle $\phi_v$ and den attenuation factor $d_v$. Determining these parameters can already provide a first indication of a faulty signal. Further methods for identifying anomalies in known signal models will be described below.

Band-Pass Filters

Band-pass filters can also be employed for fault detection in order to make certain that the output signal remains in a particular frequency range. They can be used both in analog and in digital form. Some filter arrangements additionally allow the power spectrum to be observed. In this instance, the signal is squared and integrated to calculate the average power. The RMS amplitude is obtained by taking the square root. FIG. 1.6 shows the diagram of a stepped filter arrangement.

Spectral Analysis (Fast Fourier Transform)

By means of the fast Fourier transform (FFT), the spectra of signals can be examined for faults.

Maximum Entropy Estimation

This method is similar to spectral analysis, if, however, only a few of the frequencies are of interest, then this method leads to more precise results than FFT.

Others

Deviations from the normal behavior of a system can also be recognized by other methods. For example, changes in the average value or the variance of a random signal indicate faults, or parameter changes in a static probability density function change suddenly [35], Fault Diagnosis Methods The problem of fault diagnosis is that of more precisely determining the type, extent, location and time of a detected fault. If several symptoms change in different ways for a particular fault, then classification methods can be applied that are based on changes in the symptom vectors. Commonly used classification methods are geometric spacing and probability methods, artificial neural networks or "fuzzy clustering". If more is known about the relationships between the symptoms and faults, then diagnostic decision models, such as a decision tree, may also be employed. Relationships can then be expressed by simple IF-THEN rules. Examples of "approximate reasoning" methods include probable thinking and thinking with artificial neural networks.

Section 2—Faults in a Flexible Robot Joint

Robot systems are subjected to various external influences, such as heat, moisture or electromagnetic radiation. Internal problems can likewise arise, such as leaks, inadequate lubrication or short circuits. These can bring about changes to internal process parameters or state variables, which often results in a fault behavior by the robot. As has previously been mentioned, these changes are called faults. Hereafter, a series of possible faults in a flexible robot joint will be presented along with an attempt at categorization.

Fault Categorization

Faults can be categorized on the basis of either their form, their time behavior or their extent.

Form

The form of a fault can be either systematic or random, if the structure and parameters of a system are known, then a systematic fault can be predicted. These also include faults that represent a consequence of another fault or that simply occur after a particular amount of time (wear). Random faults can occur at any time and are not predictable.

Time Behavior

Various time behavior patterns represent another variant of categorization. A rough distinction can be made here between abrupt and drifting faults. An abrupt, or graduated, fault suddenly exhibits its full extent and can then be considered constant (FIG. 2.1), while a drifting fault slowly expresses itself in a more and more pronounced way (FIG. 2.2). A special form of the abrupt fault is the intermittent fault, which can intermittently experiences lapses and can vary its amplitude when it resumes (FIG. 2.3). An example would the classic loose contact.

Extent

Categorizing by extent is very simple. The effects of a fault can act either inside (local) or outside (global) a system, in robot systems, a local extent would merely be an increase in temperature in the interior that influences the inner components, while a fault with global extent inhibit the robot's interaction with its environment.

Accumulation of Possible Faults

A non-exhaustive list of possible faults that can occur in a robot joint is provided below.

Bearing Wear

In every concept of mechanical actuators, bearings play a significant role, such as in transferring rotational energy to other components with as little loss as possible, in this example, rotational axes are held exactly in position to permit concentric rotations. For the view of fault analysis, bearings represent the most common source of disturbances in robot systems. 51% of all disturbances in alternative current motor systems can be traced back to faults involving bearings. The following faults can occur:

Bearing wear: Since the components in a bearing rub against each other, abrasions in these locations are unavoidable. They may be barely visible to the naked eye, but they can have grave consequences for the system. Wear and fear can become evident during operation in the form of vibrations and thus also increased noise in various sensors, a reduction in transferred torque or speed or torque ripples. The wear is accelerated by insufficient or missing lubrication, overloads, jolts, foreign particles or poor joint design.

Bearing fracture: Components such as the bearing cage or the inner or outer ring can fracture under high mechanical loads. The effects are essentially the same as with wear and tear, but to a far greater extent, including a complete blockage of the joint.

Gear Train Faults

In robot joints, gear trains are employed to translate the faster movements of the motor into movements of the next member that are slower but have stronger torque. Because of their compact design, harmonic drives (HD) are often used. Possible gear train faults include:

Wave Generator Bearing Wear: As was previously mentioned, evidence of wear can also make itself felt in HD wave generators.

Ratcheting Effect: The ratcheting effect generally occurs when maximum torque has been exceeded. In this instance, a brief lapse in torque occurs, and the circular spine and flex spine are displaced relative to each other by a few teeth. This is comparable to a small offset between the drive and output sides. If the effect occurs more often, the teeth can become deformed, which leads to vibrations or even breakage of the flex spine.

Flex Spine Breakage: When the admissible maximum torque is exceeded, the flex spine can break, which prevents the transfer of power via the gear train.

Cable Breakage

Electronic components frequently do not function properly or at all when cables are broken or improperly plugged in. In this case, signals can be lost or the components switch off due to an inadequate power supply.

BLDC Faults

Brushless direct current (BLDC) is often employed in robotics thanks to numerous advantages. Aside from the mechanical faults already addressed, these other faults can occur:

Side Streams: In cases of poor insulation, additional streams can flow between a phase of the BLDC and its housing. This is manifested in increased phase streams, and the phase streams no longer add up to zero. In the worst cases, other components, such as the current sensors, can be damaged or people in the vicinity of the machine can be injured by a short circuit.

Phase Break: Material damage, triggered by mechanism or thermal stress or excessively high currents, can result in the breakage of a phase of the motor, which is equivalent to free-wheeling. As a result, only two of the three phases are operational, and this causes a reduction in the generated torque and an increase in torque ripples. Occasionally, a suspected phase break is just a loose cable.

Shorted Coil: A shorted coil is a short circuit between two turns in a coil of a phase, between the windings of two coils of a phase or between two coils of different phases.

Phase-to-Phase Short In a phase-to-phase short, a short circuit occurs between two phases of the motor. This can prevent the motor from starting up.

Faults in an ADC

Each real process that is to be measured happens in the analog world. In order to render the signal useful to be utilized by microcontrollers or DSPs, analog-to-digital converters (ADC) are needed. These can either be integrated into the processor or the sensors or exist as an autonomous component. The disadvantage of ADCs lies in the unavoidable quantization noise (FIG. 2.4). For this reason, an adequate resolution must always be selected.

A probable fault for an ADC would be the loss of a bit. In so doing, the ADC loses control over one or more bits at the output. Said bits then remain in their state (HIGH or LOW). This leads to a permanent offset or to the skipping of several quantization steps.

General Sensor Faults

Some faults can occur in all sensors, regardless of what is being measured. Only the cause of the fault can vary from sensor to sensor.

Single Peaks: A single sample can suddenly adopt an arbitrary value that differs significantly from the other values (FIG. 2.5).

Noise gain: A signal can experience noise (in addition to quantization noise) as a result of electromagnetic radiation or other influences. This means that the signal fluctuates around the actual value within a particular range (FIG. 2.8).

Constant Faults: A constant fault is permanent and most probably due to the incorrect calibration or installation of the sensor. The value of the signal in this instance has a false offset or a false amplification.

Faults in the Current Sensors

As a rule, there is one current sensor for each of the three phases of the BLDC. In addition to the general sensor faults, they can also burn out. This completely destroys a sensor and is caused by excessively high temperatures or currents in the system.

Faults in the Position Sensors

The following faults are possible in position sensors of this type:

Creeping Shift in Position: If the sensor has been installed poorly, it can slowly slip, which causes a drifting offset. This process is facilitated by vibrations and sharp impacts.

Quantization Effects: Strictly speaking, quantization noise is not a fault. Nevertheless, since it can exert a major influence on the system and other components (controller, etc.), it should be noted at this point.

A position sensor with an incremental encoder usually draws upon the three signals "A," "B" and "Z". If one or more of these signals is lost (especially "A" or "B"), the sensor emits incorrect values. The temporary loss of the signals can also be caused, for example, by dirt on the increment disk.

Faults in the Torque Sensor

Owing to the great variety of designs for torque sensors, it is difficult to identify specific faults. General faults are addressed. A few are listed here as examples:

Positioning faults: if the sensor is installed incorrectly or its axes are not correctly aligned, the measurements will be inexact.

Exceeding the maximum torque: The sensor structure can either break or be deformed, which results in an offset or amplification of the values (softening/hardening of material).

Faulty Voltage Source

The following may be out of order for a voltage source:

Noise gain: The supply voltage can likewise produce noise. If the noise is too strong, electronic components can be damaged by overvoltage or temporarily stop working due to an undersupply of power. Normally, though, the supply voltage is considered constant.

Complete failure: If the voltage source fails, none of the electronic components will function, the emergency brakes will engage and the robot will come to a standstill.

Faults in the Inverter

The inverter controls the current flow through the BLDC. Without restricting the inventive concept, the present discussion involves a three-phase inverter. It consists of two branches, each with a switch for the upper and the lower part. MOSFETs are typically used as the switches (FIG. 2.7). The following errors can occur:

Inverter Shutdown: A total failure of the inverter (FIG. 2.8*a*) causes all of the switches to remain open and prevents a current from flowing. Thus the motor cannot be controlled.

Single switch open: One of the switches remains open permanently (FIG. 2.8*b*). Although the motor can be operated, it produces erratic torque. This presents a problem primarily when starting the motor.

Single phase short circuit: One of the switches remains closed permanently (FIG. 2.8*c*). This is a severe fault. The very high currents can even cause the rotor magnets to become demagnetized.

Balanced short circuit: Three of the switches remain closed, either all of the upper switches or all of the lower switches (FIG. 2.8*d*). Excessively high currents can occur here, too, but this fault is less severe than the single phase short circuit. The motor can still be operated.

Single phase open circuit: A MOSFET is missing here (FIG. 2.8*e*). A phase can now be operated in only one direction.

Section 3—Simulation of a Robot Joint

The present document considers FDI on the joint level. Therefore, a single joint, as schematically portrayed in FIG. 3.1, should be examined, Modelling of a Flexible Robot Joint The joint in question is a Simulink model and can be roughly divided into the controller, the physical model and the sensor system (FIG. 3.2). Some signals in these simulations exist both a "real" values and as "measured" values, if both versions of a variable are mentioned in the same context, then the "real" value with marked with "*" to avoid confusion. For instance, $\theta^*_m$ refers to the actual position of the motor, and $\theta_m$ is the measured variant, i.e. the output of the position sensor. Since the controller is not particularly important here, is will not be described in detail; reference is made instead to the prior art. It calculates only the required torque of the motor in order to track one of the trajectories given to it. The sensor outputs are available to it for this purpose. The controller indicates how the inverter must switch in order to operate the motor at the desired torque. These switching states are expressed as the vector $$S=[s_1,s_2,s_3]^T$$

with possible states as shown in FIG. 3.3.

The physical model is divided into the inverter, a model of the BLDC and a mechanical model (FIG. 3.4). The inverter is a three-phase inverter that, as described in FIG. 2.7, is configured as a Simscape model. The inverter model sends the calculated phase voltages $v_{ab}$, $v_{bc}$ and $v_{ca}$ to the BLDC model, which is implemented as a delta connection. The induced voltages $e_{ab}$, $e_{bc}$ and $e_{ca}$ are calculated with the aid of the "real" speed $\dot{\theta}^*_m$ and position $\theta^*_m$ of the motor:

$$e_{pahse}(\theta_e)=\dot{\theta}^*_m k_m \lambda_{phase}(\theta_e) \tag{3.1}$$

with the electrical angle $$\theta_e = p\theta_m \bmod 2\pi \tag{3.2}$$

wherein p represents the number of pole pairs. The standardized BEMF $A_{phase}$ is the result of previous measurements on a real motor (FIG. 3.5). With known parameters L (inductance) and R (resistance) as well as the induced voltages, the phase currents $i_{ab}$, $i_{bc}$ and $i_{ca}$ can then be calculated. The line currents, that will be measured subsequently, are formed from $$i^*_{line} = \begin{bmatrix} i^*_1 \\ i^*_2 \\ i^*_3 \end{bmatrix} = \begin{bmatrix} 1 & 0 & -1 \\ -1 & 1 & 0 \\ 0 & -1 & 1 \end{bmatrix} \begin{bmatrix} i_{ab} \\ i_{bc} \\ i_{ca} \end{bmatrix}. \tag{3.3}$$

The BLDC model also provides the motor torque $$\tau_m = k_m i_{phase}^T \lambda_{phase} + \tau_C \tag{3.4}$$

with the torque constant $k_m$ and cogging torque $r_c$. The cogging torque depends only upon $\Theta_m$ and can be found in a loop-up table that has been filled out with measurement results before hand.

The mechanical model calculates the motor position $\theta^*_m$ and speed $\dot{\theta}^*_m$, the coupling position $q^*$ and speed $\dot{q}^*$ as well as the coupling torque $\tau^*_J$. Since the joint always starts in the zero position, the motor position and speed can be calculated with $$\ddot{\theta}^*_m = \frac{1}{B_m}\left(\tau_m - \frac{\tau^*_J}{N} - \frac{\tau_D}{N} - \tau_f\right) \tag{3.5}$$

with motor inertia $B_m$ in motor coordinates, gear transmission ratio N, damping torque $t_D$ $$\tau_D = d\left(\frac{\dot{\theta}^*_m}{N} - \dot{q}\right) \tag{3.6}$$

with damping constant d and the friction torque $T_f$. For the output side, the equation $$\ddot{q}^* = \frac{1}{M}(\tau^*_J + \tau_D - \tau_f - \tau_{ext}) \tag{3.7}$$

applies, with output-side inertia M. The external torque rexf consists of the gravitational torque $T_g$ and the load torque $T_L$.

The friction model is based on a Lund-Grenoble model [1] and can be expressed with y $$\tau_f = \sigma_0 z + \sigma_1 \dot{z} + \sigma_2 \dot{\theta}^*_m, \tag{3.8}$$

-continued $$\dot{z} = \dot{\theta}_m^* - \sigma_0 \frac{|\dot{\theta}_m^*|}{g(\dot{\theta}_m^*)}, \quad (3.9)$$

$$g(\dot{\theta}_m) = \tau_C + (\tau_S - \tau_C)e^{-(\dot{\theta}_m^*/\dot{\theta}_m^*)^2} \quad (3.10)$$

With the above, they can be approximated. The joint torque is calculated with the aid of the rigidity coefficients $a_1$, $a_2$ and $a_3$ as well as the equations $$\tau_J^* = a_1(\Delta\theta) + a_2(\Delta\theta)^3 + a_3(\Delta\theta)^5 + \tau_h, \quad (3.11)$$

$$\dot{\tau}_h = -\alpha|\Delta\dot{\theta}|\tau_h + A\Delta\dot{\theta}, \quad (3.12)$$

$$\Delta\theta = \frac{\theta_m^*}{N} - q^*. \quad (3.13)$$

$T_h$ is the hysteresis torque with coefficients A and a (according to [10]).

The "real" values are fed into the sensor models and are calculated in the mechanical and the BLDC model. Implemented include inter alia two position sensors, which use the positions q* and θ* to determine from the positions q and $\theta_m$ as well as the measured speeds q̇ and θ̇*. These two sensors utilize an encoder model according to [14]. In this case, an incremental encoder is simulated, which emulates two signals A and B, which are offset from each other by 90°, as a function of their positions. In this way, both the current position and then direction of movement can be determined, in addition, an index signal Z is also generated, which signals a zero crossing in the joint. A further implemented sensor is the torque sensor, which measures the "real" τ*$_J$ and emits τ$_J$. In so doing, additional noise is first added, and the signal is then quantized and saturated. Finally, the line currents $i_1^*$, $i_2^*$ and $i_3^*$ are measured. This course of action is congruent with that of the torque sensor.

A trajectory is provided to the controller that is supposed to track the joint. Hereafter, this is defined as $$q_{id} = 5\sin\left(\frac{t}{2}2\pi\right),$$

with reference position $q_{id}$ in [°] and time t. The controller attempts to minimize the deviation $\Delta q = q_{id} - q$.

The motor position in the drive-side coordinates θ is defined as $$\theta = \frac{\theta_m}{N} \quad (3.15)$$

with gear transmission ratio N. FIG. 3.7 shows encoder signals and calculated positions, in a faulty run with run time t=3 s, the outputs of the physical model appear as shown in FIGS. 3.8, 3.9, 3.10 and 3.11. In this instance, θ and q are nearly congruent. As a result of inertia, delays and adjustments by the controller, the current position always lags slightly behind the desired position. The noise in the sensor system is selected to be so low here that no difference from the actual values can be discerned with the naked eye.

Fault Modelling

To be able to test fault detection in the simulation, faults were implemented in Simulink. All of the faults can be set to a "parameter script" and can be activated and deactivated at any time. The controller remains untouched, whereas faults are integrated into the physical and sensor models. Hereafter, the index id (e.g. in $q_{id}$) stands for ideal and describes the progress of a variable in a fault-free case.

Sensor Faults

FIG. 3.12 shows a diagram of signal manipulation for general sensor faults. Fault blocks in the sensor are located directly behind the sensor models (FIG. 3.12). Measured results are manipulated and subsequently forwarded to the controller. A diagram of the signal manipulation is shown in FIG. 3.13.

General Sensor Faults

Amplification: The sensor value is multiplied by a particular value. FIG. 3.14 shows a faulty position sensor q with an amplification of 2 for 0.5 s≤t<1.5 s, q is the sensor value, q* the "real" position and the position without faults, q* deviates from $q_{id}$ since the controller is performing calculations with incorrect values.

Offset: Adding or subtracting a particular value from the measured sensor value. For example, a faulty position sensor q with an offset of 0.02 rad for 0.5 s≤t<1.5 s (FIG. 3.15).

Noise gain: Further noise is added on top of normal noise applied by the sensor. A noise gain is then set. If the set value is 0, then only the additional noise disappears, but not the standard noise. An example is given in FIG. 3.18 with a noise gain (amplified by a factor of 1) for 0.5 s≤t<2 s.

Hold/Shutdown: Depending on the controller's settings, the loss of connection to a sensor can be treated in two different ways. Either the measured sensor value is set to 0 ("shutdown") or it holds the last valid value until the connection has been reestablished and a new valid value is detected ("hold"). This can be observed in the example of a faulty position sensor q (FIG. 3.17) with hold active for 0.5 s≤t<0.75 s and shutdown active for 1.5 s≤t<1.75 s.

The diagram above (FIG. 3.13) is used for every sensor in the model. Due to their specific characteristics, additional faults were implemented for certain sensors.

Position Sensors

Increment Skip As was previously explained, position sensors can also skip increments. When this fault is active, no further changes can be detected in the position signal. When this fault is deactivated, an offset remains on the signal. A positive flank on signal Z resets this offset. FIG. 3.18 shows this fault for 0.25 s≤t<0.5 s.

Normally, not as many increments are skipped at once, but the effect of this fault is illustrated more clearly in this way.

Loss of signals A, B or Z: in addition to the standard fault block, a further fault block is implemented in the position sensors, it intercepts signals A, B and Z and sends them on only if there is no active fault. FIG. 3.20 shows the loss of A 0.25 s≤t<0.5 s. In contrast to "hold," the offset that occurs is not reset by Z.

Current Sensors

No additional faults were implemented for the current sensors. Each of the general sensor faults can be individually set for each of the current sensors.

Torque Sensor

Except for the general sensor faults, no additional faults were created for this sensor.

Faults in the Inverter

The following faults were included for the inverter:

Shutdown All switches are open. This fault is sketched in FIG. 2.8a). FIGS. 3.21, 3.22 and 3.23 show the effects of the fault on the joint. The system does not come to an immediate stop. Owing to the remaining kinetic energy and gravity, the joint slowly stops swinging until it returns to the zero position. The joint is braked only by friction $r_f$ and by BEMF-induced motor torque $r_m$. The induced currents are represented in FIG. 3.22 for t≥0.1 s.

Single open: A switch remains open, as described in FIG. 2.8b). This fault can be adjusted for any of the six MOSFETs. The behavior of the joint is not significantly affected here; cf, FIG. 3.24, in which MOSFET one remains open for r t≥0.1 s.

Single closed: One of the switches remains closed. This effects of this fault on the system are barely visible to the naked eye. FIGS. 3.25 and 3.26 show the impact of this fault for t≥0.1 s.

Balanced closed: Three of the six switches remain closed (either the upper or the lower switches). The outcome does not differ much from fault "single switch closed".

Single short: One of the MOSFETs is bridged. This fault is largely equivalent to the fault "single switch closed".

Balanced short: Three of the six MOSFETs are bridged. The fault is equivalent to "balanced closed"

Single idle: One of the MOSFETs is completely decoupled, which leads to free-wheeling at this position. This fault is thus equivalent to "single switch open" (apart from the free-wheeling diode). No additional effects are observable for this fault.

BLDC Faults

The BLDC faults that are implemented include the following:

Phase Break: One of the phase currents is set to 0, FIG. 3.27 displays the outcome of the break of phase 1 for t≥0.1 s. Only small deviations can be observed in the joint torque (FIG. 3.28).

Phase-to-Phase Short Two of the three phases are bridged. This creates three possible combinations. In the model, this fault is implemented in the inverter. FIGS. 3.29, 3.29, 3.31 and 3.30 display the effects of this fault ($v_{ab}$=0) for t≥0.1 s. When the fault in this example is active, the phase current $i_{ab}$ is only generated by the BEMF.

Mechanical Faults

Mechanical faults include:

Gear train break: The motor and the rest of the joint are completely decoupled. The coupling torque $t_j^*$ and the damping torque $r_D$ equal 0. The joint oscillates around the zero position, damped by friction $T_f$. In FIGS. 3.32 and 3.33, the gear train brakes after 0.1 s.

Blocked joint: The joint speed is set to 0, and the gear train acts like spring that acts against the motor. The result is very high coupling torque. Such high torques can also quickly break the gear train. Normally, this scenario is not detected by FDI, but is instead covered by collision detection. FIGS. 3.34 and 3.35 show the joint blocked for t≥0.1 s.

Blocked Motor: The motor speed is set at 0. Blocking the motor brings the entire joint to a standstill. Since the gear train acts like a spring, the joint continue to oscillate for a short time, however. In FIGS. 3.38 and 3.37, the motor is blocked for t≥0.1 s.

Friction gain: Increasing the friction results in higher currents, since the motor needs more power to move the joint at the same speed. In FIG. 3.38, the friction is increased 100-fold for t≥0.5 s.

Torque ripples: In the simulation, torque ripples are portrayed as increases in the friction, depending on the motors position. The position and range of the ripple can be adjusted. FIG. 3.39 shows torque ripples for t≥1.5 s.

Section 4—Implementation of FDI Methods in the Simulation

The objective here is to detect the implemented faults in the robot joint simulation that were described previously. Various approaches to doing so are possible, for which numerous sensor signals are available. These sensor signals encompass the outputs of position sensors $\theta_m$ and q as well as the current sensors $i_1$, $i_2$ and $i_3$, and the torque sensor $T_J$. The possibility also exists that some signals can be tapped from the controller, since the controller and the fault detection should be implemented later on the same chip. The following parameters are used for fault detection in the simulation (Tab. 4.1):

| Description | Variable |
|---|---|
| Gear transmission ratio | N |
| Joint stiffness | K |
| Drive-side inertia | $B_m$ |
| Output-side inertia | M |
| Observer gain (friction observer) | $L_f$ |
| Damping constant | d |
| Supply voltage | $U_{dc}$ |
| Number of pole pairs (BLDC) | p |
| Inductance of the motor | L |
| Mutual inductance | $M_{ind}$ |
| Torque constant | $k_m$ |
| Shape of BEMF (standardized) | $\lambda(\theta_m)$ |

The methods presented are chosen to be as simple as possible and should therefore save resources, so that no disturbances or lags occur in the controller when they are running on the same DSP.

Limit Checking

The simplest and most resource-friendly method is limit checking, in this method, it is determined whether the value of a sensor signal y is within a threshold value ε. When the ε exceeds or falls below the threshold, a fault is signaled.

$$\varepsilon_{y,min} < y < \varepsilon_{y,min} \qquad (4.1)$$

It is often unnecessary to impose both a lower limit and an upper limit, and they one can establish a threshold for the quantity of the sensor signal, $$|y| < \varepsilon. \qquad (4.2)$$

The sensor signals checked in this instance are the signals from the individual current sensors $i_k$ ($\forall k \in \{1, 2, 3\}$), the torque $T_J$ and the drive-/output-side velocities $\dot{\theta}$ and $\dot{q}$, each with its own threshold value:

$$|i_k| < \varepsilon_{i_{line}} \qquad (4.3)$$

$$|\tau_J| \le \varepsilon_{\tau_J} \qquad (4.4)$$

$$|\dot{q}| < \varepsilon_q \qquad (4.5)$$

$$|\dot{\theta}| < \varepsilon_\theta \qquad (4.6)$$

Positions θ and q are not directly checked, since they are given as absolute angles and are therefore not bound to the range of ±360°. A further characteristic of the system is that all of the line currents sum up to zero.

$$i_1 + i_2 + i_3 = 0 \qquad (4.7)$$

Due to noise in the sensor signals, the sum will not be exactly zero, of course, and another threshold can be defined for fault detection.

$$|i1 + i2 + i3| < \varepsilon_{iline,sum} \qquad (4.6)$$

Each threshold value must be individually adapted and depends on the intensity of the noise and on the measurement range and the underlying physical model. These settings are intended to ensure that a false alarm is not triggered when there is no fault ("zero false positive"), but also so that any faults that do occur are reliably detected ("zero false negative").

Limit-checked values Detected faults q' noise gain (sensor q) amplification (sensor q) offset (sensor q) shutdown (sensor q)

θ* noise gain (sensor $\theta_m$) amplification (sensor $\theta_m$) offset (sensor $\theta_m$) shutdown (sensor $\theta_m$)

$T_J$ blocked joint $i_{line}$ reliable detection sum $i_{line}$ noise gain (any current sensor) amplification (any current sensor) offset (any current sensor) hold-shutdown (any current sensor)

Obviously, these simple methods are not suitable for the detection of every kind of fault. However, since they do not use many resources, they can be a useful addition to more complicated detection methods. Nevertheless, some faults can be detected suing these rudimentary methods. Among other things, abrupt changes in the position signals are detected. When the torque was checked, only the fault "blocked joint" could be detected. This represents a simple version of collision detection. Most faults in the current sensors can also be detected with the aid of the sum of the currents. The table above presents a list of detected faults for each sensor signal checked for threshold values.

Parameter Estimation

Once the underlying process model of the joint is known, some process parameters can be estimated and compared with previously measured or set values. A process model can be described as follows:

$$y(t) = \Psi^T(t)\Theta \quad (4.9)$$

The estimated parameters are thus:

$$\hat{\Theta} = [\Psi^T\Psi]^{-1}\Psi^T y \quad (4.10)$$

To detect possible faults, a residual is built for every parameter $\Theta$ with $$r = \hat{\Theta} - \Theta \quad (4.11)$$

Once again, if a threshold ε is exceeded, a fault is signaled.

$$|r| < \varepsilon \quad (4.12)$$

In the present model of a joint, it is difficult to identify an equation for most parameters that can be solved easily and without significant effort. Since the resources in a real robot are limited, only two very simple parameters were selected to demonstrate the principle below. Estimated parameters are the robot's stiffness $$\hat{K} = \tau_J \left(\frac{\theta_m}{N} - q\right)^{-1} \quad (4.13)$$

with the gear transmission ratio $$\hat{N} = \theta_m \left(\frac{\tau_J}{K} + q\right)^{-1} \quad (4.14)$$

The estimated parameters K and N"*, in turn, must be within a predefined range around the known "real" parameters.

$$|\hat{K} - K| < \varepsilon_K \quad (4.15)$$

$$|\hat{N} - N| < \varepsilon_N \quad (4.16)$$

The selected parameters are not suitable for fault detection in this case. Since a division is made here by the noisy signals, an estimation of the parameters is also very noisy (cf. FIG. 4.2 and FIG. 4.3). In some circumstances, choosing other parameters for estimation would be significantly more complex and could be too computationally intensive for the hardware later on.

Observer

Another possible means for fault detection is that of observing a state for which one does not have a value for comparison. These observers are well-suited to FDI in moments when the faults undergo extreme changes over the course of the observation or when, as a result of the fault, the observed value assumes values that are no longer consistent with the known physical model.

The observed states include:

the damping torque $r_D$ the motor torque $T_m$ the friction torque $T_f$ and the external torque $T_{ext}$ Observation of the damping torque $t_d$ is achieved with $$\hat{\tau}_D = d\left(\frac{\theta_m}{N} - \dot{q}\right) \quad (4.17)$$

with damping constant d. A d/q transformation is required to calculate the motor torque. For this we need the electrical position $\theta_{74}$ of the motor and the phase currents $i_{phase}$. With the number of pole pairs p, the following is calculated for the electric position $\theta_e$ $$\theta_e = (p\theta_m) \bmod 2\pi. \quad (4.18)$$

$$i_{phase} = \begin{bmatrix} i_{ab} \\ i_{bc} \\ i_{ca} \end{bmatrix} = \begin{bmatrix} 1 & 0 & -1 \\ -1 & 1 & 0 \\ -1 & -2 & 0 \end{bmatrix}^{-1} \begin{bmatrix} i_1 \\ i_2 \\ i_3 \end{bmatrix} \quad (4.19)$$

The phase currents $i_{phase}$ are transformed to $i_d$ and $i_q$ (d/q-transformation). The motor torque $\hat{\tau}_m$ can then be expressed as $$\hat{\tau}_m = k_m i_q \quad (4.20)$$

with torque constant $k_m$.

The friction torque $\tau_f$ can be observed with $$\hat{\tau}_f = L_f(\int(\hat{\tau}_m - \tau_J - \hat{\tau}_f)dt - B_m \dot{\theta}_m) \quad (4.21)$$

With L as the observer gain, $B_m$ as the motor inertia, $T_J$ as the measured coupling torque and $\dot{\theta}_m$ m as the measured velocity, $\hat{\tau}_m$ results from the observer of the motor torque.

Drawing upon the friction observer and the damping torque observer, the external torque can also be observed.

$$\hat{\tau}_{ext} = \tau_J + \hat{\tau}_D - \hat{\tau}_f - M\ddot{q} \quad (4.22)$$

The acceleration q" can be obtained by a derivation of the measured velocity q'. Since the position signal thus has to be derived twice to get the acceleration, a very precise, low-noise position sensor is required, since excessive noise otherwise renders q is unusable. This naturally does not pose a problem during the simulation. If no additional load is applied to the joint, the external torque is determined exclusively by the gravity torque, which is brought about by the robot's own weight alone.

Another approach to detecting faults is to observe the sensor signals themselves and compare them with the measured values. The output-side position can be observed with $$\hat{q} = \frac{\theta_m}{N} - \frac{\tau_J}{N} \quad (4.23)$$

If no fault occurs, the residual r should fail within a particular range of values.

$$|q\hat{} - q| < \varepsilon_q \quad (4.24)$$

When equation 4.24 is employed, it is not necessary to observe $\theta_m$ and $T_J$, as well. Due to the strong dependencies among these three values, the residual will signal a fault as soon as any of these signals is faulty. Finally, only the line currents $i_1$, $i_2$ and $i_3$ remain to be observed. This is slightly more difficult and also requires the signal S from the controller, which switches the inverter and with which the phase voltages $v_{phase}$ can be calculated (cf. FIG. 3.3).

$$v_{phase} = \begin{bmatrix} v_{ab} \\ v_{bc} \\ v_{ca} \end{bmatrix} = S \begin{bmatrix} 1 & -1 & 0 \\ 0 & 1 & -1 \\ -1 & 0 & 1 \end{bmatrix} U_{dc} \quad (4.25)$$

The BEMF $v_{BEMF}$ is likewise needed; it is measured beforehand, standardized and saved as $\lambda(\theta_m)$ in a look-up table.

$$v_{BEMF} = \dot{\theta}_m k_m \lambda(\theta_m) \quad (4.26)$$

$k_m$ is the torque constant of the motor. The phase currents $i_{ab}$, $i_{bc}$ and $i_{ca}$ are calculated by solving the state-space:

$$\dot{x} = Ax + Bu \quad (4.27)$$

$$y = Cx + du \quad (4.28)$$

$$x = \hat{i}_{phase} = \begin{bmatrix} i_{ab} \\ i_{bc} \\ i_{ca} \end{bmatrix} \quad (4.29)$$

$$u = (v_{phase} - v_{BEMF}) \quad (4.30)$$

$$A = \begin{bmatrix} \frac{-R}{L - M_{ind}} & 0 & 0 \\ 0 & \frac{-R}{L - M_{ind}} & 0 \\ 0 & 0 & \frac{-R}{L - M_{ind}} \end{bmatrix} \quad (4.31)$$

$$B = \begin{bmatrix} \frac{1}{L - M_{ind}} & 0 & 0 \\ 0 & \frac{1}{L - M_{ind}} & 0 \\ 0 & 0 & \frac{1}{L - M_{ind}} \end{bmatrix} \quad (4.32)$$

$$C = \begin{bmatrix} 1 & 0 & 0 \\ 0 & 1 & 0 \\ 0 & 0 & 1 \end{bmatrix} \quad (4.33)$$

$$d = 0 \quad (4.34)$$

Die beobachleten Strome $i_{line}$ sind somit $$\hat{i}_{line} = \begin{bmatrix} 1 & 0 & -1 \\ -1 & 1 & 0 \\ 0 & -1 & 1 \end{bmatrix} \hat{i}_{phase} \quad (4.35)$$

Here, too, when there is no fault the residuals should move within a particular range.

$$|\hat{i}_k - i_k| < \varepsilon_{i_{line} obs} \forall k \in \{1,2,3\} \quad (4.36)$$

It has been seen in practice that the observers presented here for Tm and Tf are not particularly well-suited for the detection of faults. However, they are needed for the observation of other states. The observer of the external torque is good only for collision detection (blocked joint). By contrast, the observers of joint position the observation of position q and the currents in$_{ne}$ are more promising. In the simulation, every fault of the two position sensors could be detected using equation 4.24. All of the tested faults of the BLDC, the current sensors and the inverter could likewise be discovered by means of 4.38.

TABLE

List of detected faults by observer methods

| Observed Value | Detected Value |
|---|---|
| $T_m$ | no reliable detection |
| $T_D$ | every fault of position sensor θm |
|  | every fault of position sensor q |
|  | collision |
|  | gear train break |
| $T_f$ | no reliable detection |
| $T_{ext}$ | sudden changes in position signal q |
|  | collision |
| q | every fault of position sensor q |
|  | every fault of position sensor θm |
| $i_{line}$ | every fault of the current sensors |
|  | every fault of the inverter |
|  | every fault of the BLDC |

Parity Equations and Isolation of Individual Sensor Signals

This method is based on the theory of parity equations combined with observers. The underlying model provides (4.37)

$$B_m \ddot{\theta}_m + \frac{\tau_J}{N} + \frac{\hat{\tau}_D}{N} + \hat{\tau}_f - \hat{\tau}_m = 0. \quad (4.37)$$

Due to various uncertainties, another valid value range with a threshold ε is introduced. (4.38)

$$B_m \ddot{\theta}_m + \frac{\tau_J}{N} + \frac{\hat{\tau}_D}{N} + \hat{\tau}_f - \hat{\tau}_m < \epsilon \quad (4.38)$$

Dependencies among individual summands of equation 4.38 and the sensor outputs are provided in the table below.

|  |  | Summands of the Parity Equation | | | | |
|---|---|---|---|---|---|---|
|  |  | $\theta_m$ | $\tau_J$ | $\tau_D$ | $\tau_f$ | $\tau_m$ |
| Sensor signals | $\theta_m$ | X | — | X | X | X |
|  | q | — | — | X | — | — |
|  | $\tau_J$ | — | X | — | X | — |
|  | $i_1$ | — | — | — | X | X |
|  | $i_2$ | — | — | — | X | X |
|  | $i_3$ | — | — | — | X | X |

The table shows dependencies among summands of the parity equation and sensor signals without isolation of the individual signals. Hereafter, each sensor signal is isolated and replaced by an observer. The idea is that the residuals of the various parity equations that thus result possess different dependencies to the sensor signals. Based on the change in residuals, a fault can thus not only be detected but also roughly located. If, for example, all residuals but one indicate a fault, this leads one to suspect that the fault lies in a signal that is isolated in the unaltered residual. Sometimes, though, a residual indicates a fault although the faulty signal is isolated. This can be attributed to side-effects that are triggered by a faulty signal in the controller. Even without isolating any signals, faults can be detected (see FIG. 4.4) with the aid of (4.38). In the simulation, it is possible to use this equation to detect rapid changes in position signal q, which lead to a high velocity q' for a short time. All tested faults the position sensor $\theta_m$ and the current sensors could be detected, as could strong noise, false amplification or offset of signal $T_J$, a phase-to-phase short, a blocked motor and a collision.

Isolation of Line Currents

The following relation is true for the currents:

$$i_1 + i_2 + i_3 = 0. \tag{4.39}$$

Therefore each current can be replaced with the other two using $$\hat{i}_1 = -i_2 - i_3 \tag{4.40}$$

$$\hat{i}_2 = -i_1 - i_2 \tag{4.41}$$

$$\hat{i}_3 = -i_1 - i_2 \tag{4.42}$$

This leads to three different versions of the current vector $\hat{i}_{line}$ $$\begin{bmatrix} \hat{i}_1 \\ i_2 \\ i_3 \end{bmatrix}, \begin{bmatrix} i_1 \\ \hat{i}_2 \\ i_3 \end{bmatrix}, \begin{bmatrix} i_1 \\ i_2 \\ \hat{i}_3 \end{bmatrix} \tag{4.43}$$

The residual can now be calculated as shown in equation 4.38.

$$\varepsilon > B_m \ddot{\theta}_m + \frac{\tau_J}{N} + \frac{\hat{\tau}_D}{N} + \hat{\tau}_f - \hat{\tau}_m \tag{4.44}$$

$$\hat{\tau}_m = k_m \hat{i}_q \tag{4.45}$$

wherein $\hat{i}_q$ is calculated by the d/q transformation of $\hat{i}_{line}$. Sudden changes in the signal q can likewise be detected here, as can any fault on position sensor $\theta_m$, any fault on the current sensors and false amplification or offset on the torque sensor $T_J$. Phase-to-phase short circuits, a blocked motor and a collision are likewise detectable. As was stated earlier, the residual also signals faults in the signal $i_1$ although it is isolated. This can be traced back to the fact that the faulty signal triggers side-effects in the controller, to which the residual then reacts (cf. FIG. 4.5).

Isolation of the Position Signal q

The position signal can be replaced with $$\hat{q} = \frac{\theta_m}{N} - \frac{\tau_J}{K} \tag{4.46}$$

The velocity q can be obtained via derivation of the observed position q^, which yields the parity equation $$\varepsilon > B_m \ddot{\theta}_m + \frac{\tau_J}{N} + \frac{\hat{\tau}_D}{N} + \hat{\tau}_f - \hat{\tau}_m, \tag{4.47}$$

führt, mit $$\hat{\tau}_D = d\left(\frac{\theta_m}{N} - \dot{q}\right). \tag{4.48}$$

The friction torque $T_f$ and the motor torque $T_m$ are obtained using equations 4.21 and 4.20. With the isolation of q, the dependencies between the residual and the sensor signals also change (cf. the table below). In spite of everything, the results of this simulation match the results above in this case, as well. Even faults in signal q could be detected, since the controller apparently reacted strongly enough.

Isolation of Position Signals $\theta_m$

Position $\theta_m$ can be replaced by $$\hat{\theta}_m = N\left(q + \frac{\tau_J}{K}\right). \tag{4.49}$$

The velocity $\hat{\dot{\theta}}_h$, and the acceleration $\hat{\ddot{\theta}}_m$ can be obtained by deriving the observed position $\hat{\theta}_m$ and current $\hat{i}_q$ via the d/q transformation of $i_1$, $i_2$, $i_3$ and the observed position $\hat{\theta}_m$. The parity equation then is defined as $$\varepsilon > B_m \hat{\ddot{\theta}}_m + \frac{\tau_J}{N} + \frac{\hat{\tau}_D}{N} + \hat{\tau}_f - \hat{\tau}_m \tag{4.50}$$

where $$\hat{\tau}_D = d\left(\frac{\hat{\dot{\theta}}_m}{N} - q\right) \tag{4.51}$$

$$\hat{\tau}_m = k_m \hat{i}_q \tag{4.52}$$

$$\hat{\tau}_f = L_f\left(\int (\hat{\tau}_m - \tau_J - \hat{\tau}_f) dt - B_m \hat{\dot{\theta}}_m\right) \tag{4.53}$$

TABLE

Dependencies among summands of the parity equation and sensor signals with isolation of the output-side position q

| | | Summands of the Parity Equation | | | | |
|---|---|---|---|---|---|---|
| | | $\ddot{\theta}_m$ | $\tau_J$ | $\tau_D$ | $\tau_f$ | $\tau_m$ |
| Sensor signals | $\theta_m$ | X | — | X | X | X |
| | q | — | — | — | — | — |
| | $\tau_J$ | — | X | X | X | — |
| | $i_1$ | — | — | — | X | X |
| | $i_2$ | — | — | — | X | X |
| | $i_3$ | — | — | — | X | X |

The simulation uses a gear transmission ratio N of 160, which, together with equation 4.49, leads to the observed position $\theta_m$ having significantly lower resolution than the actual signal. These increased uncertainties are also replicated in deviations $\hat{\dot{\theta}}_m$ and $\hat{\ddot{\theta}}_m$. Therefore, the residual is unusable in this case. Even when there are no faults, a greater than 25% probability of false alarms arises (FIG. 4.6).

Isolation of the Torque $T_J$

When isolating torque sensor $T_J$, the torque is approximated with $$\hat{\tau}_J = K\left(\frac{\theta_m}{N} - q\right) \quad (4.54)$$

The residual is then $$\varepsilon > B_m \ddot{\theta}_m + \frac{\hat{\tau}_J}{N} + \frac{\hat{\tau}_D}{N} + \hat{\tau}_f - \hat{\tau}_m \quad (4.55)$$

where $$\hat{\tau}_f = L_f(\int(\hat{\tau}_m - \tau_J - \hat{\tau}_f)dt - B_m \dot{\theta}_m). \quad (4.56)$$

This version of the residual basically reacts as in the isolation of a current sensor or position q. The faults detected are the same.

TABLE

Dependencies among summands of the parity equation and sensor signals with isolation of the drive-side position sensor.

| | | Summands of the Parity Equation | | | | |
|---|---|---|---|---|---|---|
| | | $\ddot{\theta}_m$ | $\tau_J$ | $\tau_D$ | $\tau_f$ | $\tau_m$ |
| Sensor signals | $\theta_m$ | — | — | — | — | — |
| | q | X | — | X | X | X |
| | $\tau_J$ | X | X | X | X | X |
| | $i_{line}$ | — | — | — | X | X |

TABLE

Dependencies among summands of the parity equation and sensor signals with isolation of $\tau_J$

| | | Summands of the Parity Equation | | | | |
|---|---|---|---|---|---|---|
| | | $\ddot{\theta}_m$ | $\tau_J$ | $\tau_D$ | $\tau_f$ | $\tau_m$ |
| Sensor signals | $\theta_m$ | X | X | X | X | X |
| | q | — | X | X | X | — |
| | $\tau_J$ | — | — | — | — | — |
| | $i_{line}$ | — | — | — | X | X |

Section 5—Evaluation of Fault Detection Methods on a Flexible Robot Joint Prototype In order confirm the simulation results, the fault detection methods presented here were tested on a flexible robot joint prototype. FIG. 5.1 shows an underlying joint design for this purpose.

The prototype of the flexible robot joint is a joint with one degree of freedom. The generated torque is transmitted to the next link by a BLDC via an HD at a transmission ratio N (cf. FIG. 5.1). The employed sensors are a motor-side position sensor $\theta_m$, a n output-side position sensor q and a torque sensor $T_J$, which is integrated into the HD and which measures the torque in output-side coordinates. A second motor is installed on the output side and it simulates a constant load. This design is controlled by a digital signal processor (DSP), the circuit board of which also accommodates current sensors that can aid in reading out the motor current. Since the DSP already calculates $i_q$ (following the d/q transformation), this current is also used for the detection of faults instead of the phase currents. Ail sensor signals are transmitted by the DSP to a further PC, which plots them and, in turn, returns to the DSP a trajectory that should be traveled. Three different angles of the output-side link are given as trajectories (cf. FIG. 5.2). These points are traveled successively in a soft curve.

TABLE

List of parameters required for testing the fault detection methods on a joint prototype

| Description | Variable |
|---|---|
| Gear transmission ratio | N |
| Joint stiffness | K |
| Drive-side inertia | $B_m$ |
| Output-side inertia | M |
| Observer gain (friction torque) | $L_f$ |
| Damping constant | d |
| Torque constant | $k_m$ |

FDI Methods Tested on the Joint Prototype

In an effort to validate the fault detection methods, most of the approaches presented in Section 4 have also been implemented on the prototype of the flexible robot joint. First of all, limit checking is tested. Here, the velocities $\dot{q}$ and $\dot{\theta}_m$ as well as the torque $\tau_J$ are monitored. However, the current $i_q$ is checked instead of the phase currents. Observers are also implemented, beginning with an observer for the motor torque $$\hat{\tau}_m = k_m i_q \quad (5.1)$$

with torque constant $k_m$. Additionally, the friction torque $$\hat{\tau}_f = L_f(\int(\hat{\tau}_m - \tau_J - \hat{\tau}_f)dt - B_m \dot{\theta}_m), \quad (5.2)$$

is observed, with observer gain $L_f$, as is the damping torque $$\hat{\tau}_D = d\left(\frac{\dot{\theta}_m}{N} - \dot{q}\right) \quad (5.3)$$

with damping constant d and the external torque $$\hat{\tau}_{ext} = \tau_J + \hat{\tau}_D - \hat{\tau}_f - M\ddot{q} \quad (5.4)$$

Furthermore, the output-side position q is also approximated using $$\hat{q} = \frac{\theta_m}{N} - \frac{\tau_J}{N}. \quad (5.5)$$

When operating with a fault, the estimated position $\hat{q}$ should not deviate significantly from the measurements of the actuation position sensor, $$|\Delta q| = |\hat{q} - q| < \epsilon$$

Once again, the parity equation is the basis for the sensor isolation method.

$$\left| B_m \ddot{\theta}_m + \frac{\tau_J}{N} + \frac{\hat{\tau}_D}{N} + \hat{\tau}_f - \hat{\tau}_m \right| < \epsilon \quad (5.7)$$

This method of sensor isolation (or parity equations) is carried out essentially as was described previously. The only exception is that the isolation of the phase currents was not realized because, instead of this current, the method uses current $i_q$ for the fault detection. The fault detection functions independently and does not feed the acquired knowledge back to the controller (cf. FIG. 5.3), Tested Faults In a simulation, it is possible to execute almost every fault with little effort, yet performing a fault simulation in the hardware entails some restrictions. For this reason, only selected faults are tested on the joint prototype. Covering all possible faults would exceed the scope of the present report. Sensor faults are implemented on the software side by first manipulating the incoming sensor signals and then evaluating them with FDI. These manipulated signals are not returned to the controller, however. FIG. 5.3 again shows how sensor signal manipulation functions. Incoming signals include the two positions q and $\theta_m$, the joint torque $\tau_J$ and the current $i_q$. For each of these signal, an offset and an amplification can be set, and the fault "shutdown" sets the signal to 0. On the hardware side, the fault "shutdown" is likewise triggered simply by pulling the plugs of the sensors (except for the current sensor). In this case, even the controller receives a faulty signal. Moreover, increased friction is created by slowing down the motor by means of an external force. Disadvantages of the "real" hardware faults are that it is difficult to identify the exact time when the fault occurred or to measure the quality of the disturbance (e.g. friction torque in Nm). A list of the tested faults can also be found in the table below.

TABLE

List of faults tested on the joint prototype, with location of test. Hardware faults also affect the controller.

| | Realized in | |
| --- | --- | --- |
| Fault | software | hardware |
| shutdown q/$\theta_m$/$\tau_J$ | X | X |
| shutdown $i_q$ | X | — |
| amplify q/$\theta_m$/$\tau_J$/$i_q$ | X | — |
| offset q/$\theta_m$/$\tau_J$/$i_q$ | X | — |
| friction gain | — | X |

Results of the Tests on the Joint Prototype

Tests carried out with the FDI methods on the real joint produced similar results to the simulation before. Faults that could be detected by limit checking are shown in the table below. Rapid changes in the values of the positions lead to brief peaks in the corresponding velocities. Naturally, the detection also depends on when the fault occurred, if, for instance, the plug is pulled out of the position sensor while the joint is already in zero position, then of course no fault is displayed.

Regarding the observers, none of the tested faults could be detected with the observers for motor torque and friction. Increasing the friction did not trigger an alarm in the associated observer, since the threshold was set very high.

Using the damping torque observer, all of the faults in the position sensors could be detected. The same goes for the external torque observer as well as the observed position q̂ (or Δq=q̂−q), the only difference being that, by observing the external torque, unplugging of the $T_J$ plug is detected instead of the pulled-out plug of $\theta_m$, and the observer q recognizes these two cases. The signals from the observers for damping torque $T_D$, external torque $T_{ext}$ and Δq with the fault "unplug the plug from the position sensor q" are also portrayed in FIG. 5.5.

Once again, the use of parity equations, combined with observers, has proven to be the most promising approach. Using equation 5.7 and every available sensor signal, it was possible to detect a shutdown and an offset fault in position sensors q and $\theta_m$, as well as an amplification fault q, $\theta_m$ and $i_q$. Increased friction and unplugging sensors $\theta_m$ and $\tau_J$ additionally triggered an alarm. As expected, the residual with an isolated position sensor q does not react to faults in this sensor. The same applies to the equation with an isolated $\theta_m$, which likewise does not react to faults in sensor $\theta_m$. Not included here, though, is the fault "unplugged sensor $\theta_m$," which makes it impossible for the controller to correctly supply power to the motor. So these faulty currents then trigger an alarm after all. A summary of the detected faults for the various parity equations can be found in Tab. 5.5. The residuals for the fault "unplug position sensor q" are shown in FIG. 5.6.

TABLE

List of faults on the robot joint detected by limit checking

| | Detection Method: Limit Check of | | | |
| --- | --- | --- | --- | --- |
| Fault | $\dot{q}$ | $\dot{\theta}_m$ | $\tau_J$ | $i_q$ |
| shutdown q | X* | — | — | — |
| shutdown $\theta_m$ | — | X* | — | — |
| shutdown $i_q$ | — | — | — | — |
| shutdown $\tau_J$ | — | — | — | — |
| amplify q | X* | — | — | — |
| amplify $\theta_m$ | — | X* | — | — |
| amplify $i_q$ | — | — | — | — |
| amplify $\tau_J$ | — | — | — | — |
| offset q | X* | — | — | — |
| offset $\theta_m$ | — | X* | — | — |
| offset $i_q$ | — | — | — | — |
| offset $\tau_J$ | — | — | — | — |
| unplug q | X* | — | — | — |
| unplug $\theta_m$ | — | X* | — | — |
| unplug $\tau_J$ | — | — | X | — |
| friction gain | — | — | — | — |

X* Brief spike, then false negative

TABLE

List of faults on the robot joint detected by observers

| | Detection Method: Observer | | | | |
| --- | --- | --- | --- | --- | --- |
| Fault | $\tau_m$ | $\tau_f$ | $\tau_D$ | $\tau_{ext}$ | q |
| shutdown q | — | — | X | X | X |
| shutdown $\theta_m$ | — | — | X | X | X |
| shutdown $i_q$ | — | — | — | — | — |
| shutdown $\tau_J$ | — | — | — | — | — |
| amplify q | — | — | X | X* | X |
| amplify $\theta_m$ | — | — | X | X | X |
| amplify $i_q$ | — | — | — | — | — |
| amplify $\tau_J$ | — | — | — | — | — |
| offset q | — | — | X* | X* | X |

TABLE-continued

List of faults on the robot joint detected by observers

Detection Method: Observer

| Fault | $\tau_m$ | $\tau_f$ | $\tau_D$ | $\tau_{ext}$ | q |
|---|---|---|---|---|---|
| offset $\theta_m$ | — | — | X* | X* | X |
| offset $i_q$ | — | — | — | — | — |
| offset $\tau_J$ | — | — | — | — | — |
| unplug q | — | — | X | X | X |
| unplug $\theta_m$ | — | — | X* | — | X |
| unplug $\tau_J$ | — | — | — | X | X |
| friction gain | — | — | — | — | — |

X* Brief spike, then false negative

TABLE

List of faults on the robot joint detected by parity equations

Detection Method: Parity Equation

| Fault | no isolation | isolating q | isolating $\theta_m$ | isolating $\tau_J$ |
|---|---|---|---|---|
| shutdown q | X* | — | X | X |
| shutdown $\theta_m$ | X | X | X | X |
| shutdown $i_q$ | — | — | — | — |
| shutdown $\tau_J$ | — | — | — | — |
| amplify q | X | — | X | X |
| amplify $\theta_m$ | X | X | — | X |
| amplify $i_q$ | X | X | X | X |
| amplify $\tau_J$ | — | — | — | — |
| offset q | X* | — | X* | X |
| offset $\theta_m$ | X* | X* | — | X |
| offset $i_q$ | — | — | — | — |
| offset $\tau_J$ | — | — | — | — |
| unplug q | — | — | X | X |
| unplug $\theta_m$ | X | X | X | X |
| unplug $\tau_J$ | X | X | X | — |
| friction gain | X | X | X | X |

X* Brief spike, then false negative

LIST OF ABBREVIATIONS

ADC Analog to digital converter
BEMF Back electromotive force
BLDC Brushless direct current motor
DSP Digital signal processor
FDI Fault detection and isolation
FFT Fast Fourier transform
HD Harmonic drive
IFAC International Federation of Automatic Control
MOSFET Metal-oxide-semiconductor field-effect transistor
MTBF Mean time between failures
MTTR Mean time to repair
RMS Root mean square
SAFEPROCESS Technical Committee on Fault Detection, Supervision and Safety for Technical Processes FIG. 6.1 shows a schematic process sequence of a proposed method for the open-loop/closed-loop control of a robot joint that is driven by an electric motor, wherein said robot joint has a current sensor that comprises first sensor electronics for detecting a first operating current $i_{k,1}(t)$ of the electric motor, where k=1, 2, . . . , a first position sensor for detecting a drive position $\theta_m(t)$ of a drive train of the robot joint, a second position sensor for detecting an output position q(t) of an output train of the robot joint, and a first torque sensor for detecting a torque $\tau_{J,1}(t)$ in the drive train, wherein the electric motor is controlled by open-loop/closed-loop control on the basis of a pre-determined target control variable $\tau_m(t)$.

The method includes the following steps. In a first step 101, the measured values $\theta_m(t),i_{k,1}(t),\tau_J(t),q(t)$ are provided, in a second step 102, the first fault detector checks for the presence of a fault, and the presence of a fault is detected when the measured values $\theta_m(t),i_{k,1}(t),\tau_J(t),q(t)$ and/or their time derivatives do not satisfy prescribed first threshold conditions. In a third step 103, the second fault detector checks for the presence of a fault, and a fault is detected on the basis of the measured values $\theta_m(t),i_{k,1}(t),\tau_J(t),q(t)$ of a process model-based method, wherein the process model is a prescribed mathematical dynamic model of the robot joint, and wherein a fault is detected when parameters of the model, residuals between variables reconstructed by the process model and the measured variables and/or parameters calculated within the model fail to satisfy prescribed second threshold conditions, in a fourth step 104, the measured values $\tau_J(t)$ are provided to a third fault detector, which detects the presence of a fault on the basis of a signal-based method, wherein a fault is detected when signal variables such as amplitudes and/or characteristic frequencies of the measured values $\tau_J(t)$ fail to satisfy prescribed third threshold values. In a fifth step 105, whenever a fault is detected by one of the fault detectors provided on the robot joint, a warning signal is generated and is visually and acoustically emitted, and the electric motor is actuated with control variables $\tau_m^F(t)$, which control the robot joint in a predetermined fault condition FZ.

FIG. 6.2 shows a schematized design of a proposed device for the open-loop/closed-loop control of a robot joint that is driven by an electric motor, wherein said robot joint has a current sensor with first sensor electronics for identifying a first operating current $i_{k,1}(t)$ of the electric motor, where k=1, 2, . . . , a first position sensor for detecting an output position $\theta_m(t)$ of an output train of the robot joint, a second position sensor for detecting an operating position q(t) of a drive train of the robot joint, and a first torque sensor for detecting a torque $\tau_{J,1}(t)$ in the output train, wherein the electric motor is under the open-loop/closed-loop control of an open- and closed-loop control unit 206 on the basis of a pre-determined target control variable $\tau_{J,1}(t)$. The device includes an interface 201 for providing the measured values $\theta_m(t),i_{k,1}(t),\tau_J(t),q(t)$; a first fault detector 202 for testing for the presence of a fault, wherein the first fault detector 202 is designed such that the presence of a fault is detected when the measured values $\theta_m(t),i_{k,1}(t),\tau_J(t),q(t)$ and/or time derivatives thereof fail to satisfy prescribed first threshold conditions; and a second fault detector 203 for testing for the presence of a fault, wherein the second fault detector 203 is designed such that the presence of a fault is detected on the basis of the measured values $\theta_m(t),i_{k,1}(t),\tau_J(t),q(t)$, and a process model-based method is identified, wherein the process model is a prescribed mathematical dynamic model of the robot joint, and wherein a fault is detected when parameters of the model, residuals between variables reconstructed by the process model and the measured variables $\theta_m(t),i_{k,1}(t),\tau_J(t),q(t)$ and/or parameters calculated within the model fail to satisfy prescribed second threshold conditions; and a third fault detector 204 for testing for the presence of a fault, wherein the third fault detector 204 is designed such that the presence of a fault is detected on the basis of the measured values $\tau_J(t)$ and a signal-based method, wherein a fault is detected when signal variables, such as amplitudes and/or characteristic frequencies, of the measured values $\tau_J(t)$ fail to satisfy prescribed third threshold conditions. The open- and closed-loop control unit 206 is configured such that, whenever a fault is detected by one of the available fault detectors 202-204, a warning signal is generated and/or the electric motor is actuated with control variables that control the robot joint in a predetermined fault condition FZ, and/or a mechanical mechanism is activated to brake a movement of the robot joint.

The invention claimed is:

1. A method for the open-loop/closed-loop control of a robot joint that is driven by an electric motor, wherein said robot joint has a current sensor that comprises first sensor electronics for detecting a first operating current $i_{k,1}(t)$ of the electric motor, where k=1, 2, . . . , a first position sensor for detecting an operating position $\theta_m(t)$ of a drive train of the robot joint, a second position sensor for detecting an output position q(t) of an output train of the robot joint, and a first torque sensor for detecting a torque $\tau_{J,1}(t)$ in the drive train, wherein the electric motor is controlled by open-loop/closed-loop control on the basis of a pre-determined target control variable $\tau_m(t)$, having the following steps:

providing the measured values $\theta_m(t), i_{k,1}(t), \tau_J(t), q(t)$, checking for the presence of a fault by the first fault detector, which detects the presence of a fault when the measured values $\theta_m(t), i_{k,1}(t), \tau_J(t), q(t)$ and/or their time derivatives do not satisfy prescribed first threshold conditions, and checking for the presence of a fault by the second fault detector, which detects a fault on the basis of the measured values $\theta_m(t), i_{k,1}(t), \tau_J(t), q(t)$ of a process model-based method, wherein the process model is a prescribed mathematical dynamic model of the robot joint, and wherein a fault is detected when parameters of the model, residuals between variables reconstructed by the process model and the measured variables and/or parameters calculated within the model fail to satisfy prescribed second threshold conditions, and either providing the measured values $\tau_J(t)$ to a third fault detector, which detects the presence of a fault on the basis of a signal-based method, wherein a fault is detected when signal variables such as amplitudes and/or characteristic frequencies of the measured values $\tau_J(t)$ fail to satisfy prescribed third threshold values, or calculating a torque $\tau_{J,2}(t)$ in the output train by means of a second torque sensor or redundantly designed sensor electronics of the first torque sensor, and detecting a fault by means of a fourth fault detector when a comparison of $\tau_{J,1}(t)$ and $\tau_{J,2}(t)$ does not satisfy fourth threshold conditions, whenever a fault is detected by one of the fault detectors provided on the robot joint, generating a warning signal and/or actuating the electric motor with control variables $\tau_m^F(t)$, which control the robot joint in a predetermined fault condition FZ, and/or activating a mechanical mechanism to brake a movement of the robot joint.

2. The method according to claim 1, wherein the warning signal is emitted visually and/or acoustically.

3. The method according to claim 1, wherein one type of the detected faults is identified by each of the first fault detector and the second fault detector.

4. The method according to claim 1, wherein the control variables $\tau_m^F(t)$ and/or the fault condition FZ depend upon the type of detected fault F.

5. The method according to claim 1, wherein the second fault detector uses a parameter estimate based on the model and/or a state variable observer and/or a Kalman filter and/or a fault detection function on the basis of parity equation to detect faults.

6. The method according to claim 1, wherein the third fault detector uses a fast Fourier transform and/or a power density spectrum and/or a modal analysis and/or correction analysis and/or a neuronal network and/or a statistical estimator for fault detection.

7. The method according to claim 1, wherein the first current sensor has second sensor electronics, which are redundant to the first sensor electronics, to determine a second operating current $i_{k,2}(t)$ of the electric motor, where k=1, 2, . . . , wherein a fault is detected by a fifth fault detector when a comparison of $i_{k,1}(t)$ and $i_{k,2}(t)$ does not satisfy fifth threshold conditions.

8. A computer system, comprising:

a data processing device, programmed to carry out a method for the open-loop/closed-loop control of a robot joint that is driven by an electric motor, wherein said robot joint has a current sensor that comprises first sensor electronics for detecting a first operating current $i_{k,1}(t)$ of the electric motor, where k=1, 2, . . . , a first position sensor for detecting an operating position $\theta_m(t)$ of a drive train of the robot joint, a second position sensor for detecting an output position q(t) of an output train of the robot joint, and a first torque sensor for detecting a torque $\tau_{J,1}(t)$ in the drive train, wherein the electric motor is controlled by open-loop/closed-loop control on the basis of a pre-determined target control variable $\tau_m(t)$, the method further including the steps of providing the measured values $\theta_m(t), i_{k,1}(t), \tau_J(t), q(t)$, checking for the presence of a fault by the first fault detector, which detects the presence of a fault when the measured values $\theta_m(t), i_{k,1}(t), \tau_J(t), q(t)$ and/or their time derivatives do not satisfy prescribed first threshold conditions, and checking for the presence of a fault by the second fault detector, which detects a fault on the basis of the measured values $\theta_m(t), i_{k,1}(t), \tau_J(t), q(t)$ of a process model-based method, wherein the process model is a prescribed mathematical dynamic model of the robot joint, and wherein a fault is detected when parameters of the model, residuals between variables reconstructed by the process model and the measured variables and/or parameters calculated within the model fail to satisfy prescribed second threshold conditions, and either providing the measured values $\tau_J(t)$ to a third fault detector, which detects the presence of a fault on the basis of a signal-based method, wherein a fault is detected when signal variables such as amplitudes and/or characteristic frequencies of the measured values $\tau_J(t)$ fail to satisfy prescribed third threshold values, or calculating a torque $\tau_{J,2}(t)$ in the output train by means of a second torque sensor or redundantly designed sensor electronics of the first torque sensor, and detecting a fault by means of a fourth fault detector when a comparison of $\tau_{J,1}(t)$ and $\tau_{J,2}(t)$ does not satisfy fourth threshold conditions, whenever a fault is detected by one of the fault detectors provided on the robot joint, generating a warning signal and/or actuating the electric motor with control variables $\tau_m^F(t)$, which control the robot joint in a predetermined fault condition FZ, and/or activating a mechanical mechanism to brake a movement of the robot joint.

9. An apparatus, comprising:

a digital storage medium, wherein the digital storage medium interacts with a computer system programmed with a computer readable program code adapted to execute a method for the open-loop/closed-loop control of a robot joint that is driven by an electric motor, wherein said robot joint has a current sensor that comprises first sensor electronics for detecting a first operating current $i_{k,1}(t)$ of the electric motor, where k=1, 2, . . . , a first position sensor for detecting an operating position $\theta_m(t)$ of a drive train of the robot joint, a second position sensor for detecting an output position q(t) of an output train of the robot joint, and a first torque sensor for detecting a torque $\tau_{J,1}(t)$ in the drive train, wherein the electric motor is controlled by open-loop/closed-loop control on the basis of a pre-determined target control variable $\tau_m(t)$, the method further including the steps of providing the measured values $\theta_m(t), i_{k,1}(t), \tau_J(t), q(t)$, checking for the presence of a fault by the first fault detector, which detects the presence of a fault when the measured values $\theta_m(t), i_{k,1}(t), \tau_J(t), q(t)$ and/or their time derivatives do not satisfy prescribed first threshold conditions, and checking for the presence of a fault by the second fault detector, which detects a fault on the basis of the measured values $\theta_m(t), i_{k,1}(t), \tau_J(t), q(t)$ of a process model-based method, wherein the process model is a prescribed mathematical dynamic model of the robot joint, and wherein a fault is detected when parameters of the model, residuals between variables reconstructed by the process model and the measured variables and/or parameters calculated within the model fail to satisfy prescribed second threshold conditions, and either providing the measured values $\tau_J(t)$ to a third fault detector, which detects the presence of a fault on the basis of a signal-based method, wherein a fault is detected when signal variables such as amplitudes and/or characteristic frequencies of the measured values $\tau_J(t)$ fail to satisfy prescribed third threshold values, or calculating a torque $\tau_{J,2}(t)$ in the output train by means of a second torque sensor or redundantly designed sensor electronics of the first torque sensor, and detecting a fault by means of a fourth fault detector when a comparison of $\tau_{J,1}(t)$ and $\tau_{J,2}(t)$ does not satisfy fourth threshold conditions, whenever a fault is detected by one of the fault detectors provided on the robot joint, generating a warning signal and/or actuating the electric motor with control variables $\tau_m^F(t)$, which control the robot joint in a pre-determined fault condition FZ, and/or activating a mechanical mechanism to brake a movement of the robot joint.

10. A computer system, comprising:
a data processing device; and,
a machine-readable carrier having embodied thereon a computer program product with program code, for carrying out on the data processing device a method for the open-loop/closed-loop control of a robot joint that is driven by an electric motor, wherein said robot joint has a current sensor that comprises first sensor electronics for detecting a first operating current $i_{k,1}(t)$ of the electric motor, where k×1, 2, . . . , a first position sensor for detecting an operating position $\theta_m(t)$ of a drive train of the robot joint, a second position sensor for detecting an output position q(t) of an output train of the robot joint, and a first torque sensor for detecting a torque $\tau_{J,1}(t)$ in the drive train, wherein the electric motor is controlled by open-loop/closed-loop control on the basis of a pre-determined target control variable $\tau_m(t)$, the method further including the steps of providing the measured values $\theta_m(t), i_{k,1}(t), \tau_J(t), q(t)$, checking for the presence of a fault by the first fault detector, which detects the presence of a fault when the measured values $\theta_m(t), i_{k,1}(t), \tau_J(t), q(t)$ and/or their time derivatives do not satisfy prescribed first threshold conditions, and checking for the presence of a fault by the second fault detector, which detects a fault on the basis of the measured values $\theta_m(t), i_{k,1}(t), \tau_J(t), q(t)$ of a process model-based method, wherein the process model is a prescribed mathematical dynamic model of the robot joint, and wherein a fault is detected when parameters of the model, residuals between variables reconstructed by the process model and the measured variables and/or parameters calculated within the model fail to satisfy prescribed second threshold conditions, and either providing the measured values $\tau_J(t)$ to a third fault detector, which detects the presence of a fault on the basis of a signal-based method, wherein a fault is detected when signal variables such as amplitudes and/or characteristic frequencies of the measured values $\tau_J(t)$ fail to satisfy prescribed third threshold values, or calculating a torque $\tau_{J,2}(t)$ in the output train by means of a second torque sensor or redundantly designed sensor electronics of the first torque sensor, and detecting a fault by means of a fourth fault detector when a comparison of $\tau_{J,1}(t)$ and $\tau_{J,2}(t)$ does not satisfy fourth threshold conditions, whenever a fault is detected by one of the fault detectors provided on the robot joint, generating a warning signal and/or actuating the electric motor with control variables $\tau_m^F(t)$, which control the robot joint in a pre-determined fault condition FZ, and/or activating a mechanical mechanism to brake a movement of the robot joint.

11. A computer program product, comprising
a computer readable storage medium having embodied thereon program codes for carrying out a method for the open-loop/closed-loop control of a robot joint that is driven by an electric motor, wherein said robot joint has a current sensor that comprises first sensor electronics for detecting a first operating current $i_{k,1}(t)$ of the electric motor, where k=1, 2, . . . , a first position sensor for detecting an operating position $\theta_m(t)$ of a drive train of the robot joint, a second position sensor for detecting an output position q(t) of an output train of the robot joint, and a first torque sensor for detecting a torque $\tau_{J,1}(t)$ in the drive train, wherein the electric motor is controlled by open-loop/closed-loop control on the basis of a pre-determined target control variable $\tau_m(t)$, the method further including the steps of providing the measured values $\theta_m(t), i_{k,1}(t), \tau_J(t), q(t)$, checking for the presence of a fault by the first fault detector, which detects the presence of a fault when the measured values $\theta_m(t), i_{k,1}(t), \tau_J(t), q(t)$ and/or their time derivatives do not satisfy prescribed first threshold conditions, and checking for the presence of a fault by the second fault detector, which detects a fault on the basis of the measured values $\theta_m(t), i_{k,1}(t), \tau_J(t), q(t)$ of a process model-based method, wherein the process model is a prescribed mathematical dynamic-model of the robot joint, and wherein a fault is detected when parameters of the model, residuals between variables reconstructed by the process model and the measured variables and/or parameters calculated within the model fail to satisfy prescribed second threshold conditions, and either providing the measured values $\tau_J(t)$ to a third fault detector, which detects the presence of a fault on the basis of a signal-based method, wherein a fault is detected when signal variables such as amplitudes and/or characteristic frequencies of the measured values $\tau_J(t)$ fail to satisfy prescribed third threshold values, or calculating a torque $\tau_{J,2}(t)$ in the output train by means of a second torque sensor or redundantly designed sensor electronics of the first torque sensor, and detecting a fault by means of a fourth fault detector when a comparison of $\tau_{J,1}(t)$ and $\tau_{J,2}(t)$ does not satisfy fourth threshold conditions, whenever a fault is detected by one of the fault detectors provided on the robot joint, generating a warning signal and/or actuating the electric motor with control variables $\tau_m^F(t)$, which control the robot joint in a predetermined fault condition FZ, and/or activating a mechanical mechanism to brake a movement of the robot joint.

12. A device for the open-loop/closed-loop control of a robot joint that is driven by an electric motor, wherein said robot joint has a current sensor with first sensor electronics for identifying a first operating current $i_{k,1}(t)$ of the electric motor, where K=1, 2, a first position sensor for detecting an output position $\theta_m(t)$ of an output train of the robot joint, a second position sensor for detecting an operating position q(t) of a drive train of the robot joint, and a first torque sensor for detecting a torque $\tau_{J,1}(t)$ in the output train, wherein the electric motor is under the open-loop/closed-loop control of an open- and closed-loop control unit on the basis of a pre-determined target control variable $\tau_m(t)$, comprising:

an interface for providing the measured values $\theta_m(t), i_{k,1}(t), \tau_J(t), q(t)$;

a first fault detector for testing for the presence of a fault, wherein the first fault detector is designed such that the presence of a fault is detected when the measured values $\theta_m(t), i_{k,1}(t), \tau_J(t), q(t)$ and/or time derivatives thereof fail to satisfy prescribed first threshold conditions; and a second fault detector for checking for the presence of a fault, wherein said second fault detector is configured such that it detects a fault on the basis of the measured values $\theta_m(t), i_{k,1}(t), \tau_J(t), q(t)$ of a process model-based method, wherein the process model is a prescribed mathematical dynamic model of the robot joint, and wherein a fault is detected when parameters of the model, residuals between variables reconstructed by the process model and the measured variables $\theta_m(t), i_{k,1}(t), \tau_J(t), q(t)$ and/or parameters calculated within the model fail to satisfy prescribed second threshold conditions; and either a third fault detector for testing for the presence of a fault, wherein the third fault detector is designed such that the presence of a fault is detected on the basis of the measured values $\tau_J(t)$ and a signal-based method, wherein a fault is detected when signal variables such as amplitudes and/or characteristic frequencies of the measured values $\tau_J(t)$ fail to satisfy prescribed third threshold conditions, or a second torque sensor for detecting a torque $\tau_{J,2}(t)$ in the output train or redundantly designed sensor electronics of the first torque sensor for detecting a torque $\tau_{J,2}(t)$, and a fourth fault detector for testing for the presence of a fault, wherein the fourth fault detector is designed such that the presence of a fault is detected on the basis of the measured values $\tau_{J,1}(t)$ and $\tau_{J,2}(t)$, wherein a fault is detected when a comparison of $\tau_{J,1}(t)$ and $\tau_{J,2}(t)$ does not satisfy fourth threshold conditions, and wherein the open- and closed-loop control unit (206) is configured such that, whenever a fault is detected by one of the available fault detectors, a warning signal is generated and/or the electric motor is actuated with control variables $\tau_m^F(t)$ that control the robot joint in a predetermined fault condition FZ, and/or a mechanical mechanism is activated to brake a movement of the robot joint.

13. An apparatus, comprising:

a robot manipulator having a device for the open-loop/closed-loop control of a robot joint that is driven by an electric motor, wherein said robot joint has a current sensor with first sensor electronics for identifying a first operating current $i_{k,1}(t)$ of the electric motor, where K=1, 2, a first position sensor for detecting an output position $\theta_m(t)$ of an output train of the robot joint, a second position sensor for detecting an operating position q(t) of a drive train of the robot joint, and a first torque sensor for detecting a torque $\tau_{J,1}(t)$ in the output train, wherein the electric motor is under the open-loop/closed-loop control of an open- and closed-loop control unit on the basis of a pre-determined target control variable $\tau_m(t)$, wherein the device further includes an interface for providing the measured values $\theta_m(t), i_{k,1}(t), \tau_J(t), q(t)$;

a first fault detector for testing for the presence of a fault, wherein the first fault detector is designed such that the presence of a fault is detected when the measured values $\theta_m(t), i_{k,1}(t), \tau_J(t), q(t)$ and/or time derivatives thereof fail to satisfy prescribed first threshold conditions; and a second fault detector for checking for the presence of a fault, wherein said second fault detector is configured such that it detects a fault on the basis of the measured values $\theta_m(t), i_{k,1}(t), \tau_J(t), q(t)$ of a process model-based method, wherein the process model is a prescribed mathematical dynamic model of the robot joint, and wherein a fault is detected when parameters of the model, residuals between variables reconstructed by the process model and the measured variables $\theta_m(t), i_{k,1}(t), \tau_J(t), q(t)$ and/or parameters calculated within the model fail to satisfy prescribed second threshold conditions; and either a third fault detector for testing for the presence of a fault, wherein the third fault detector is designed such that the presence of a fault is detected on the basis of the measured values $\tau_J(t)$ and a signal-based method, wherein a fault is detected when signal variables such as amplitudes and/or characteristic frequencies of the measured values $\tau_J(t)$ fail to satisfy prescribed third threshold conditions, or a second torque sensor for detecting a torque $\tau_{J,2}(t)$ in the output train or redundantly designed sensor electronics of the first torque sensor for detecting a torque $\tau_{J,2}(t)$, and a fourth fault detector for testing for the presence of a fault, wherein the fourth fault detector is designed such that the presence of a fault is detected on the basis of the measured values $\tau_{J,1}(t)$ and $\tau_{J,2}(t)$, wherein a fault is detected when a comparison of $\tau_{J,1}(t)$ and $\tau_{J,2}(t)$ does not satisfy fourth threshold conditions, and wherein the open- and closed-loop control unit (206) is configured such that, whenever a fault is detected by one of the available fault detectors, a warning signal is generated and/or the electric motor is actuated with control variables $\tau_m^F(t)$ that control the robot joint in a predetermined fault condition FZ, and/or a mechanical mechanism is activated to brake a movement of the robot joint.

14. An apparatus, comprising:
a robot having a device for the open-loop/closed-loop control of a robot joint that is driven by an electric motor, wherein said robot joint has a current sensor with first sensor electronics for identifying a first operating current $i_{k,1}(t)$ of the electric motor, where K=1, 2, a first position sensor for detecting an output position $\theta_m(t)$ of an output train of the robot joint, a second position sensor for detecting an operating position q(t) of a drive train of the robot joint, and a first torque sensor for detecting a torque $\tau_{J,1}(t)$ in the output train, wherein the electric motor is under the open-loop/closed-loop control of an open- and closed-loop control unit on the basis of a pre-determined target control variable $\tau_m(t)$, wherein the device further includes
an interface for providing the measured values $\theta_m(t)$, $i_{k,1}(t),\tau_J(t),q(t)$;
a first fault detector for testing for the presence of a fault, wherein the first fault detector is designed such that the presence of a fault is detected when the measured values $\theta_m(t),i_{k,1}(t),\tau_J(t),q(t)$ and/or time derivatives thereof fail to satisfy prescribed first threshold conditions; and
a second fault detector for checking for the presence of a fault, wherein said second fault detector is configured such that it detects a fault on the basis of the measured values $\theta_m(t),i_{k,1}(t),\tau_J(t),q(t)$ of a process model-based method, wherein the process model is a prescribed mathematical dynamic model of the robot joint, and wherein a fault is detected when parameters of the model, residuals between variables reconstructed by the process model and the measured variables $\theta_m(t),i_{k,1}(t),\tau_J(t),q(t)$ and/or parameters calculated within the model fail to satisfy prescribed second threshold conditions; and
either a third fault detector for testing for the presence of a fault, wherein the third fault detector is designed such that the presence of a fault is detected on the basis of the measured values $\tau_J(t)$ and a signal-based method, wherein a fault is detected when signal variables such as amplitudes and/or characteristic frequencies of the measured values $\tau_J(t)$ fail to satisfy prescribed third threshold conditions, or a second torque sensor for detecting a torquer $\tau_{J,2}(t)$ in the output train or redundantly designed sensor electronics of the first torque sensor for detecting a torque $\tau_{J,2}(t)$, and a fourth fault detector for testing for the presence of a fault, wherein the fourth fault detector is designed such that the presence of a fault is detected on the basis of the measured values $\tau_{J,1}(t)$ and $\tau_{J,2}(t)$, wherein a fault is detected when a comparison of $\tau_{J,1}(t)$ and $\tau_{J,2}(t)$ does not satisfy fourth threshold conditions, and
wherein the open- and closed-loop control unit (206) is configured such that, whenever a fault is detected by one of the available fault detectors, a warning signal is generated and/or the electric motor is actuated with control variables $\tau_m^F(t)$ that control the robot joint in a predetermined fault condition FZ, and/or a mechanical mechanism is activated to brake a movement of the robot joint.

* * * * *